(12) United States Patent
Motoyama et al.

(10) Patent No.: US 7,500,003 B2
(45) Date of Patent: Mar. 3, 2009

(54) METHOD AND SYSTEM FOR USING VECTORS OF DATA STRUCTURES FOR EXTRACTING INFORMATION FROM WEB PAGES OF REMOTELY MONITORED DEVICES

(75) Inventors: Tetsuro Motoyama, Cupertino, CA (US); Avery Fong, Castro Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 1215 days.

(21) Appl. No.: 10/328,026

(22) Filed: Dec. 26, 2002

(65) Prior Publication Data

US 2004/0128365 A1  Jul. 1, 2004

(51) Int. Cl.
*G06F 15/16* (2006.01)
*G06F 15/173* (2006.01)
*G06F 17/00* (2006.01)

(52) U.S. Cl. ............... 709/227; 709/224; 709/217; 707/101; 707/102

(58) Field of Classification Search .......... 709/227, 709/217, 223, 224; 707/101, 102
See application file for complete search history.

(56) References Cited

U.S. PATENT DOCUMENTS

| | | | | |
|---|---|---|---|---|
| 5,857,194 A * | 1/1999 | Kelliher et al. | ............. | 707/101 |
| 6,317,848 B1 | 11/2001 | Sorens et al. | | |
| 6,430,553 B1 * | 8/2002 | Ferret | ............. | 707/3 |
| 6,430,711 B1 | 8/2002 | Sekizawa | | |
| 6,601,086 B1 * | 7/2003 | Howard et al. | ............. | 709/203 |
| 6,658,586 B1 * | 12/2003 | Levi | ............. | 714/4 |
| 6,826,553 B1 * | 11/2004 | DaCosta et al. | ............. | 707/1 |
| 6,889,264 B2 | 5/2005 | Clough et al. | | |
| 7,053,767 B2 | 5/2006 | Petite et al. | | |
| 2004/0128365 A1 | 7/2004 | Motoyama et al. | | |

OTHER PUBLICATIONS

U.S. Appl. No. 09/756,120, filed Jan. 9, 2001, Motoyama et al.
U.S. Appl. No. 09/953,358, filed Sep. 17, 2001, Motoyama et al.
U.S. Appl. No. 09/953,359, filed Sep. 17, 2001, Motoyama et al.
U.S. Appl. No. 09/975,935, filed Oct. 15, 2001, Motoyama et al.
U.S. Appl. No. 09/921,707, filed Aug. 6, 2001, Motoyama.
U.S. Appl. No. 10/068,861, filed Feb. 11, 2002, Motoyama et al.
U.S. Appl. No. 10/142,989, filed May 13, 2002, Motoyama et al.

(Continued)

*Primary Examiner*—Kevin Bates
(74) *Attorney, Agent, or Firm*—Oblon, Spivak, McClelland, Maier & Neustadt, P.C.

(57) ABSTRACT

In a communication system having one or more monitored devices communicatively coupled to a monitoring system, a method of obtaining status information of a monitored device is described. The method includes creating a communication session using HTTP protocol with the monitored device, ii) accessing a web page of the monitored device in order, to obtain information displayed on the web page, iii) parsing the displayed information using a first and second data structure vectors in order to obtain the status information of the monitored device, and iv) closing the communication session upon parsing all the information displayed on the web page or upon obtaining desired status information.

18 Claims, 38 Drawing Sheets

OTHER PUBLICATIONS

U.S. Appl. No. 10/162,402, filed Jun. 5, 2002, Motoyama.
U.S. Appl. No. 10/157,903, filed May 31, 2002, Motoyama et al.
U.S. Appl. No. 10/157,905, filed May 31, 2002, Motoyama et al.
U.S. Appl. No. 10/225,290, filed Aug 22, 2002, Motoyama.
U.S. Appl. No. 10/328,008, filed Dec. 26, 2002, Motoyama et al.
U.S. Appl. No. 10/328,026, filed Dec. 26, 2002, Motoyama et al.
U.S. Appl. No. 10/328,003, filed Dec. 26, 2002, Motoyama et al.
U.S. Appl. No. 10/328,026, filed Dec. 26, 2002, Motoyama et al.
U.S. Appl. No. 10/372,939, filed Feb. 26, 2003, Motoyama.
U.S. Appl. No. 10/328,026, filed Dec. 26, 2002, Motoyama et al.
U.S. Appl. No. 10/460,408, filed Jun. 13, 2003, Motoyama et al.
U.S. Appl. No. 10/460,150, filed Jun. 13, 2003, Motoyama et al.
U.S. Appl. No. 10/460,404, filed Jun. 13, 2003, Motoyama et al.
U.S. Appl. No. 10/460,151, filed Jun. 13, 2003, Motoyama et al.
U.S. Appl. No. 10/764,582, filed Jan. 27, 2004, Motoyama et al.
U.S. Appl. No. 10/764,467, filed Jan. 27, 2004, Motoyama et al.
U.S. Appl. No. 10/164,569, filed Jan. 27, 2004, Motoyama et al.
U.S. Appl. No. 10/764,527, filed Jan. 27, 2004 Motoyama et al.
U.S. Appl. No. 11/032,039, filed Jan. 11, 2005, Motoyama et al.
U.S. Appl. No. 11/032,192, filed Jan. 11, 2005, Motoyama et al.
U.S. Appl. No. 11/032,016, filed Jan. 11, 2005, Motoyama et al.
U.S. Appl. No. 11/032,063, filed Jan. 11, 2005, Motoyama et al.
U.S. Appl. No. 11/032,088, filed Jan. 11, 2005, Motoyama et al.
U.S. Appl. No. 11/153,543, filed Jun. 16, 2005, Motoyama et al.
U.S. Appl. No. 11/234,319, filed Sep. 26, 2005, Motoyama et al.
U.S. Appl. No. 11/234,322, filed Sep. 26, 2005, Motoyama et al.
U.S. Appl. No. 11/234,224, filed Sep. 26, 2005, Motoyama et al.
U.S. Appl. No. 11/234,323, filed Sep. 26, 2005, Motoyama et al.
U.S. Appl. No. 11/455,663, filed Jun. 20, 2006, Motoyama.
U.S. Appl. No. 11/517,363, filed Sep. 8, 2006, Motoyama et al.
U.S. Appl. No. 11/517,430, filed Sep. 8, 2006, Motoyama et al.
U.S. Appl. No. 11/517,362, filed Sep. 8, 2006, Motoyama et al.
U.S. Appl. No. 11/517,378, filed Sep. 8, 2006, Motoyama et al.
U.S. Appl. No. 11/517,428, filed Sep. 8, 2006, Motoyama et al.
U.S. Appl. No. 11/867,741, filed Oct. 5, 2007, Motoyama et al.
U.S. Appl. No. 11/940,785, filed Nov. 15, 2007, Motoyama et al.
U.S. Appl. No. 11/960,248, filed Dec. 19, 2007, Motoyama et al.
U.S. Appl. No. 12/062,146, filed Apr. 3, 2008, Motoyama et al.

* cited by examiner

| KEY VendorModelID | VALUE | |
|---|---|---|
| 100100 | KEY WebPage(string) | VALUE Vector of CKeyValueInfo |
| | /t_config.htm | |
| | /t_gen.htm | |
| | | |
| | | |

*FIG. 14*

| Pointer to CDevice Object | Pointer to CDevice Object | Pointer to CDevice Object | Pointer to CDevice Object | ---------- |
|---|---|---|---|---|

*FIG. 15*

IP Address — 1702

| sIPAddress | sVendor | sModel | nVendorModelID |
|---|---|---|---|
| 172.30.4.51 | Vendor1 | NC60 | 100100 |
| 172.30.4.52 | Vendor1 | N4025 | 100200 |
| 172.30.4.53 | Vendor2 | Model 9000 | 200100 |

KeyValue — 1704

| nVendorModelWebID | sKeyString | sValuePosition | sValueType | sDelimiter | ninLinePosition | nStdEnum |
|---|---|---|---|---|---|---|
| 100101 | Serial Number | 1 | char | | | 102 |
| 100101 | Machine Model | 1 | char | | | 101 — 1714 |
| 100103 | Black Toner | 1 | char | | | 700 |
| 100103 | Cyan Toner | 1 | char | | | 702 |
| 100201 | Serial Number | 1 | char | | | 102 |
| 100201 | Machine Model | 1 | char | | | 101 |
| 100203 | Toner | 1 | char | | | 700 |
| 200101 | Product Name | 0 | char | : | 1 | 101 — 1716 |
| 200101 | Printer Serial No. | 0 | char | : | 1 | 102 |
| 200103 | Black | 2 | Num | % | | 101 |

VendorModelWebPage — 1706

| nVendorModelWebID | sWebPage |
|---|---|
| 100101 | /configurationPage.htm |
| 100103 | /consumablePage.htm |
| 100201 | /configurationPage.htm |
| 100203 | /consumablePage.htm |
| 200101 | /Vendor2/first |
| 200103 | /Vendor2/second |

KeyEnumTable — 1708

| nStdEnum | sEnumDescription |
|---|---|
| 101 | Model |
| 102 | UniqueID |
| 700 | Black |
| 701 | Magenta |
| 702 | Cyan |
| 703 | Yellow |

*FIG. 17C* mKeyValueVector: vector<CKeyValueInfo>

| struct CKeyValueInfo | struct CKeyValueInfo | struct CKeyValueInfo |
|---|---|---|
| +eStdNum: 700<br>+sKey: Black<br>+nPosition: 2<br>+sType: %<br>+sDelimiter: %<br>+nInLinePosition: 0 | +eStdNum: 701<br>+sKey: Magenta<br>+nPosition: 2<br>+sType: %<br>+sDelimiter: %<br>+nInLinePosition: 0 | +eStdNum: 820<br>+sKey: Fuser Kit<br>+nPosition: 2<br>+sType: %<br>+sDelimiter: %<br>+nInLinePosition: 0 |

2800

*FIG. 28A* m_LocateValueVector: vector<CLocateValueInfo>

| struct CLocateValueInfo | struct CLocateValueInfo | struct CLocateValueInfo |
|---|---|---|
| +m_bKeyFound: false<br>+m_nCounter: 0<br>+m_bValueObtained: false | +m_bKeyFound: false<br>+m_nCounter: 0<br>+m_bValueObtained: false | +m_bKeyFound: false<br>+m_nCounter: 0<br>+m_bValueObtained: false |

```
line 1:<table cellSpacing="0" width=100% border="0"><tr><td align="right" colSpan="3">
line 2:<font face="Helvetica,Arial,Gill Sans,Sans Serif" size="2">%of Life Remaining</font></td>
line 3:</tr><tr><td><font face="Helvetica,Arial,Gill Sans,Sans Serif" size="2">Black</font></td>
line 4:<td><table cellSpacing="0" cellPadding="0" width="100" border="1"><tbody><tr><td>
line 5:<table height="21" cellSpacing="0" cellPadding="0" width="100" border="0">
line 6:<tbody><tr><td bgColor=#000000"> </td></tr></tbody></table></td></tr></tbody></table>
line 7:</td><td align="right"><font face="Helvetica,Arial,Gill Sans,Sans Serif" size="2">100%</font></td>
line 8:</tr><tr><td><font face="Helvetica,Arial,Gill Sans,Sans Serif" size="2">Cyan</font></td>
line 9:<td><table cellSpacing="0" cellPadding="0" width="100" border="1"><tbody><tr><td>
line10:<table height="21" cellSpacing="0" cellPadding="0" width="100" border="0"><tbody><tr>
line11:<td bgColor="#00ffff"> </td></tr></tbody></table></td></tr></tbody></table></td>
line12:<td align="right"><font face="Helvetica,Arial,Gill Sans,Sans Serif" size="2">100%</font></td>
line13:</tr><tr><td><font face="Helvetica,Arial,Gill Sans, Sans Serif" size="2">Magenta</font></td
line14:<td><table cellSpacing="0" cellPadding="0" width="100" border="1"><tbody><tr><td>
line15:<table height="21" cellSpacing="0" cellPadding="0" width="100" border="0">
```

FIG. 28C

```
line16:<tbody><tr><td bgColor=#ff0ff" </td></tr></tbody></table>
line17:</td><td align="right"><font face="Helvetica,Arial,Gill Sans,Sans Serif" size="2">100%</font></td>
line18:</tr><tr><td><font face="Helvetica,Arial,Gill Sans,Sans Serif" size="2">Yellow</font></td>
line19:<td><table cellSpacing="0" cellPadding="0" width="100" border="1"><tbody><tr><td>
line20:<table height="21" cellSpacing="0" cellPadding="0" width="100" border="0"><tbody><tr>
line21:<td bgColor="#ffff00" </td></tr></tbody></table></td><td><align="right">
line22:<font face="Helvetica,Arial,Gill Sans,Sans Serif" size="2">100%</font></td></tr></tr>
line23:<td colSpan="3"><font size="1"> </font></td></tr><tr><td bgColor="#3366cc" colSpan="3"><b>
line24:<font face="Helvetica,Arial,Gill Sans,Sans Serif" color=#ffffff" size="2">Other Supplies Information
line25:</font></b></td></tr><td><font face="Helvetica,Arial,Gill Sans,Sans Serif" size="2">Transfer
line26:</font></td><td><table cellSpacing="0" cellPadding="0" width="100" border="1"><tbody><tr><td>
line27:<table height="21" cellSpacing="0" cellPadding="0" width="90" border="0"><tbody><tr>
line28:<td bgColor="#000000"> </td></tr></tbody></table></td><td></tr></tbody></table>
line29:</td><td align="right"><font face="Helvetica,Arial,Gill Sans,Sans Serif" size="2">90%</font></td>
line30:</tr></table>
```

*FIG. 28D*

METHOD AND SYSTEM FOR USING VECTORS OF DATA STRUCTURES FOR EXTRACTING INFORMATION FROM WEB PAGES OF REMOTELY MONITORED DEVICES

CROSS-REFERENCE TO RELATED APPLICATIONS

This application is related to commonly owned U.S. Patent Application Ser. No. 60/359,648 filed Feb. 27, 2002 entitled "Architecture of The Remote Monitoring of Devices Through the Local Monitoring Station and Sending to the Central Station in Which the Multiple Vendors are Supported" which is incorporated herein by reference in its entirety. This application is related to the following commonly owned co pending Applications: U.S. patent application Ser. No. 10/225,290 filed Aug. 22, 2002, entitled "Method and System for Monitoring Network Connected Devices with Multiple Protocols"; U.S. patent application Ser. No. 10/068,861, filed Feb. 11, 2002, entitled "Method and Apparatus Utilizing Communication Means Hierarchy to Configure or Monitor an Interface Device"; U.S. patent application Ser. No. 10/142,989, filed May 13, 2002, entitled "Verification Scheme for Email Message Containing Information About Remotely Monitored Devices"; U.S. patent application Ser. No. 09/756,120, filed Jan. 9, 2001, entitled "Method and System of Remote Support of Device Using Email"; U.S. patent application entitled "Method and Apparatus for Modifying Remote Devices monitored by a Monitoring System", filed May 31, 2002; U.S. patent application Ser. No. 09/975,935, filed Oct. 15, 2001, entitled "Method and System for Remote Support of Device Using Email Based Upon Pop3 With Decryption Capability Through Virtual Function"; U.S. patent application Ser. No. 09/953,358, filed Sep. 17, 2001, entitled "Method and System of Remote Support of Device Using Email Through Data Transfer Module"; U.S. patent application Ser. No. 10/162,402, filed Jun. 5, 2002, entitled "Method and System to Use HTTP and Html/xml for Monitoring the Devices"; U.S. patent application Ser. No. 10/157,903 filed May 31, 2002, entitled "Method for Scrambling Information about Network Devices That is Placed in Email Message"; U.S. patent application Ser. No. 10/162,402, filed Jun. 5, 2002, entitled "Method and System to Use Http and Html/xml for Monitoring the Devices"; U.S. patent application Ser. No. 09/921,707, filed Aug. 6, 2001, entitled "Universal Controller in The Wireless Networked Environment"; and U.S. patent application Ser. No. 09/953,359, filed Sep. 17, 2001, entitled "System, Method, and Computer Program Product for Sending Remote Device Configuration Information to a Monitor Using E-Mail"; U.S. Patent Application filed concurrently herewith and entitled "Method and System for using Data Structures to store database information for Multiple Vendors and Model Support for Remotely Monitored Devices", and U.S. Patent Application filed concurrently herewith and entitled "Method and system for using internal data structures for storing information related to remotely monitored devices, the disclosures of all the above applications are incorporated herein by reference in their entirety.

BACKGROUND OF THE INVENTION

1. Field of the Invention

This invention relates to monitoring devices connected to a network. More particularly, it relates to a method and system for using data structure vectors for extracting information from one or more web pages of a monitored device supported by a monitoring system.

2. Discussion of Related Art

As is generally known, computer systems include hardware and software. Software includes a list of instructions that are created to operate and manage hardware components that make up a computer system. Typically, computer systems include a variety of hardware components/devices that interface with one another. The computer system can be a standalone type or a networked type. In a networked typed computer system, a plurality of distinct devices are connected to a network and thus communication between these distinct devices is enabled via the network.

Also, software for operating the hardware devices needs to be configured in order to allow communication between the hardware devices so that the hardware devices are enabled to function cooperatively. Further, in order to facilitate such a communication, it is also desirable for hardware devices to be monitored and the status of each hardware device identified in order to ensure that each hardware device is functioning in an efficient manner.

For the purposes of this patent application, the inventor has determined that a hardware device that is configuring or monitoring the plurality of distinct devices or hardware devices would be referred to as a monitoring device and the hardware devices that are being monitored by the monitoring device would be referred to as "monitored devices".

For hardware devices that are located on a network, it is desirable for these devices to be monitored for maintenance, usage, or other purposes. However, in view of manufacturer differences relating to hardware devices and interfaces, it may be difficult for a monitoring device to communicate with various other devices connected to a network. Such a disadvantage most likely prevents network administrators from obtaining crucial information about the performance and efficiency of the devices connected to the network.

The Simple Network Management Protocol (SNMP) is today a de-facto industry standard for monitoring and management of devices on data communication networks, telecommunication systems and other globally reachable devices. Practically every organization dealing with computers and related devices expects to be able to centrally monitor, diagnose and configure each such device across local and wide area networks. SNMP is the protocol that enables this interaction.

In order for a device to respond to SNMP requests it is desirable to equip the device with the software that enables it to properly interpret an SNMP request, perform the actions required by that request and produce an SNMP reply. The SNMP agent software is typically a subsystem software module residing in a network-entity.

The collection of objects implemented by a system is generally referred to as a Management Information Base (MIB). An MIB may also be a database with information related to the monitoring of devices. Examples of other MIB's include Ethernet MIB, which focuses on Ethernet interfaces; Bridge MIB, which defines objects for the management of 802.ID bridges, to name a few.

Using SNMP for monitoring devices is difficult as private MIB's include values that are hard to decipher without a valid key. A company using SNMP for monitoring various devices, connected to its network, creates a unique identifier/key that is maintained as proprietary information of the company. For most part, the results are displayed as binary or integer values. Thus, using SNMP, results received from the devices that are being monitored ("monitored devices"), fail to provide a user the status of the monitored devices in a user comprehensible manner.

Further, using SNMP, it is difficult for one to obtain detailed information about a monitored device without a valid key or access to a private MIB to decipher the results obtained as binary or integer values.

BRIEF SUMMARY OF THE INVENTION

The system and method of the present invention addresses a solution to the above-identified problems by enabling monitoring of devices that are connected to a network, and extracting information from one or more web pages of a monitored device supported by a monitoring system.

Information about vendors and models supported by the monitoring system are stored in a database. Using the database to determine the vendors and models supported by the monitoring system allows flexibility in changing the supported vendors and models without actually changing the underlying code. Efficiency of the monitoring system is improved by eliminating multiple accesses of the database in order to determine if each of the monitored devices are supported by the monitoring system. By facilitating retrieval of all the information about the vendors and models of monitored devices supported by the monitoring system by performing minimum number of accesses of the database, and preferably, retrieving the desired information in a single access of the database, the efficiency of the monitoring system is improved. The retrieved information is stored in data structures of a database supported by the monitoring system. A Hypertext Transfer Protocol (HTTP) may be used to access information from the monitored devices.

In one aspect, in a communication system having one or more monitored devices communicatively coupled to a monitoring system, a method of obtaining status information of a monitored device includes i) creating a communication session using HTTP protocol with the monitored device; ii) accessing a web page of the monitored device in order to obtain information displayed on the web page; iii) parsing the displayed information using a first and second data structure vectors in order to obtain the status information of the monitored device; and iv) closing the communication session upon parsing all the information displayed on the web page or upon obtaining desired status information. Steps i) through iv) are iterated for multiple web pages of the monitored device.

The parsing step is preferably performed, using first and second data structure vectors to locate and obtain information from the web page of the monitored device, for one line of displayed information at a time. The above method further includes identifying a key from information displayed on the web page, and identifying a value corresponding to the key. The step of identifying the value is preferably performed using a plurality of fields of an element of said first and second data structure vectors. The plurality of fields of the element of the first data structure vector include nPosition, sDelimiter, and nInLinePosition fields; and the plurality of fields of the element of the second data structure vector include nCounter and bValueObtained fields. The step of identifying the key is performed using data from a first field of the first data structure vector; and the step of identifying the corresponding value is performed by using data from a plurality of fields of an element of the first and second data structure vectors. The above method also includes providing a one-to-one correspondence between elements of the first and second data structure vectors, and adding information corresponding to a key and a value to a map having information about the monitored device, if the value corresponding to the key is obtained from a parsed line of information from the web page.

In another aspect, the present invention relates to a method of obtaining information from a monitored device comprising i) accessing the monitored device using an HTTP protocol; ii) retrieving information displayed on a web page of the monitored device; iii) parsing the displayed information using a first and second data structure vectors in order to locate an identifier from the retrieved information; iv) searching for a value corresponding to the identifier from the retrieved information; and iterating steps iii) and iv) for each line of information displayed on the web page or until desired information is obtained from the web page.

In yet another aspect, the present invention provides in a communication system having one or more monitored devices communicatively coupled to a monitoring system, a method of obtaining information from a web page of a monitored device comprising retrieving information displayed on the web page; parsing the displayed information using a first and second data structure vectors, wherein the parsing step is performed in order to locate a key and a corresponding value from the retrieved information; and setting vector iterators corresponding to said first and second data structure vectors to the beginning of said first and second data structure vectors.

In a further aspect, the present invention provides a method of obtaining information from a web page of a monitored device, comprising i) reading information displayed on the web page; ii) parsing the read information; iii) determining a key and corresponding value information, using each element of a first and second data structure vectors, for each line of information displayed on the web page; and iv) removing an element from each of said first and second data structure vectors if a key and a corresponding value information are found for the element.

The present invention also identifies various vendors of monitored devices and the device models that are supported by the monitoring system as described herein. Since various vendors of the monitored devices present information about a monitored device in a vendor-specific manner, the present invention enables identifying the vendor and model of the monitored device to determine the operational status of the monitored device.

BRIEF DESCRIPTION OF THE DRAWINGS

A more complete appreciation of the invention and many of the attendant advantages thereof will be readily obtained as the same becomes better understood by reference of the following detailed description when considered in connection with the accompanying drawings, wherein:

FIG. 14 illustrates an exemplary map data structure used by HTTP_HTML sub-module as illustrated in FIG. 11 of the present invention;

FIG. 15 shows a vector of the reference to the devices created by DeviceFactory and used by the MonitorManager as illustrated in FIG. 13 of the present invention;

FIGS. 17A-17C show table relationship stored in a database to support information collection through the HTTP;

FIG. 28 shows an exemplary schematic of two vectors m_KeyValueVector and m_LocateValueVector and lines from a web page of a monitored device;

DETAILED DESCRIPTION OF EXEMPLARY EMBODIMENTS

Figure 1:
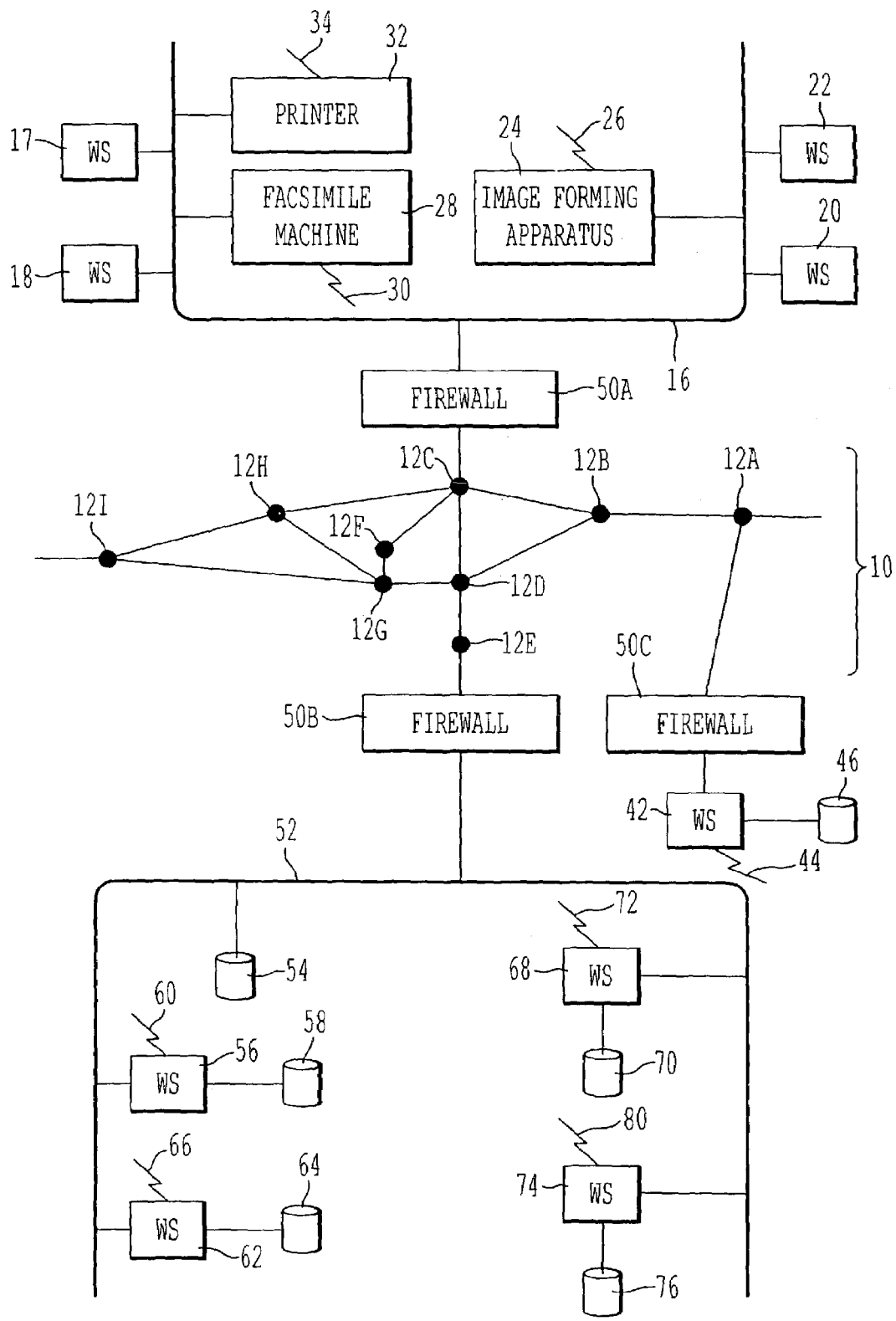
FIG. 1 illustrates three networked business office devices connected to a network of computers and databases through the Internet.

FIG. 1 illustrates a schematic having various devices and computers for monitoring, diagnosing and controlling the operation of the devices. Specifically, FIG. 1 includes a first network 16, such as a Local Area Network (LAN) connected to computer workstations 17, 18, 20 and 22. The workstations can be any type of computers including, e.g., IBM Personal Computer compatible devices, Unix-based computers, Linux-based computers or Apple Macintoshes. Also connected to the network 16 are a digital image forming apparatus 24, a facsimile machine 28, and a printer 32. As would be appreciated by one of ordinary skill in the art, two or more of the components of the digital image forming apparatus 24 and the facsimile machine 28 can be combined into a unified "image forming apparatus." For example, the image forming apparatus 24, facsimile machine 28, and printer 32 and the workstations 17, 18, 20 and 22 may be referred to as machines or monitored devices. In some configurations, one or more workstations may be converted to business office appliances.

One example of such a business office appliance is eCabinet® from Ricoh Corporation. Also, a facsimile server (not illustrated) may be connected to the network 16 and have a telephone, Integrated Services Digital Network (ISDN), cable or wireless connection. Each of the digital image forming apparatus 24, facsimile machine 28, and printer 32 in addition to being connected to the network 16, may also include conventional telephone and/or ISDN and/or cable and/or wireless connections 26, 30 and 34, respectively. As explained below, the monitored devices 24, 28 and 32, respectively, communicate with a remote monitoring, diagnosis, and control station, also referred to as a monitoring device, through, for example, the Internet via the network 16 or by a direct telephone, ISDN, wireless, or cable connection.

In another exemplary business environment, monitored devices may include such devices as multi-function imaging device, scanner, projector, conferencing system and shredder. In another application, the network 16 may be a home network where monitored devices are meters (electricity, gas, water) and appliances such as, for example, microwave oven, washer, dryer, dishwasher, home entertainment system, refrigerator, rice cooker, heater, air condition, water heater, security camera.

In FIG. 1, a wide area network (WAN) (e.g., the Internet or its successor) is generally designated by 10. The WAN 10 can be either a private WAN, a public WAN or a hybrid type. The WAN 10 includes a plurality of interconnected computers and routers designated by 12A-12I. The manner of communicating over a WAN is known through a series of Request for Comments (RFC) documents available from the Internet Engineering Task Force (IETF) at http://www.ietf.org/rfc.html, including RFC 821 entitled "Simple Mail Transfer Protocol"; RFC 822 entitled "Standard for the Format of ARPA Internet Text Message"; RFC 959 entitled "File Transfer Protocol (FTP)"; RFC 2045 entitled "Multipurpose Internet Mail Extensions (MIME) Part One: Format of Internet Message Bodies"; RFC 1894 entitled "An Extensible Message Format for Delivery Status Notifications"; RFC 1939 entitled "Post Office protocol—Version 3"; RFC 2068 "Hypertext Transfer Protocol—HTTP/1.1"; and RFC 2298 entitled "An Extensible Message Format for Message Disposition Notifications." The contents of each of these references are incorporated herein by reference.

Transmission Control Protocol/Internet Protocol (TCP/IP) related communication is described, for example, in the book "TCP/IP Illustrated," Vol. 1, The Protocols, by W. R. Stevens, from Addison-Wesley Publishing Company, 1994, the entire contents of which is incorporated herein by reference. Volumes 1-3 of "Internetworking with TCP/IP" by Comer and Stevens are also incorporated herein by reference in their entirety.

Continuing to refer to FIG. 1, a firewall 50A is connected between the WAN 10 and the network 16. A firewall is a device that allows only authorized computers on one side of the firewall to access a network, computers or individual parts on the other side of the firewall. Firewalls are known and commercially available devices and/or software (e.g., ZoneAlarm from Zone Labs). Similarly, firewalls 50B and 50C separate the WAN 10 from a network 52 and a workstation 42, respectively. Additional details on firewalls can be found in "Firewalls and Internet Security" by W. R. Cheswick, and S. M. Bellovin, 1994, Addison Wesley Publishing, and "Building Internet Firewalls" by D. B. Chapman and E. D. Zwicky, 1995, O'Reilly & Associates, Inc. The entire contents of those two references are incorporated herein by reference.

The network 52 is a conventional network and includes a plurality of workstations 56, 62, 68 and 74. These workstations may be distributively located within different departments (e.g., marketing, manufacturing, design engineering, and customer service departments) within a single company. In addition to the workstations connected via the network 52, a workstation 42 is not directly connected to the network 52 is also provided. Information in a database stored in a disk 46 connected to the workstation 42 may be shared using proper encryption and protocols over the WAN 10 to the workstations connected directly to the network 52. Also, the workstation 42 includes a direct connection to a telephone line and/or an ISDN and/or a cable network and/or a wireless network 44, and the database in disk 46 may be accessed through the telephone line, the ISDN, the cable network or via the wireless network 44. The cable network used by this invention may be implemented using a cable network that is typically used to carry television programming, a cable that provides for high-speed communication of digital data typically used with computers or the like, or any other desired type of cable.

In another embodiment, the workstation 42 can be a laptop computer, a PDA, a palm top computer or a cellular phone with network capability. These devices may be used to access information stored in the database stored in the disk 46.

Information related to the business office machines, business devices or business office appliances 24, 28 and 32, respectively, may be stored in one or more of the databases stored in the disks 46, 54, 58, 64, 70 and 76. Known databases include (1) SQL databases by Microsoft, IBM, Oracle and Sybase (2) other relational databases, and (3) non-relational databases (including object oriented databases from Objectivity, JYD Software Engineering, and Orient Technologies). Each of the customer service, marketing, manufacturing, and engineering departments may have their own database or may share one or more databases. Each of the disks used to store databases is a non-volatile memory such as a hard disk or optical disk. Alternatively, the databases may be stored in any storage device including solid state and/or semiconductor memory devices. For example, disk 64 may be stored with a marketing database, disk 58 may be stored with a manufacturing database, disk 70 may be stored with an engineering database, and disk 76 may be stored with a customer service database. Alternatively, the disks 54 and 46 may be stored with one or more of the databases.

In addition to the workstations 56, 62, 68, 74 and 42 being connected to the WAN 10, these workstations may also include a connection to a telephone line, ISDN, cable, or wireless networks for providing a secure connection to a machine/device being monitored, diagnosed and/or controlled. Additionally, if one of the communication media is not operating properly, one of the others may be automatically used, as a backup, for communication.

A feature of the present invention is the use of a "store-and-forward" mode of communication (e.g., Internet electronic mail, also referred to herein as e-mail) or transmission between a machine and a computer/monitoring system for diagnosing and controlling the machine. Alternatively, the message which is transmitted may be implemented using a mode of communication that makes direct, end-to-end connections (e.g., using a socket connection to the ultimate destination) such as FTP and Hyper Text Transfer Protocol (HTTP).

Figure 2:
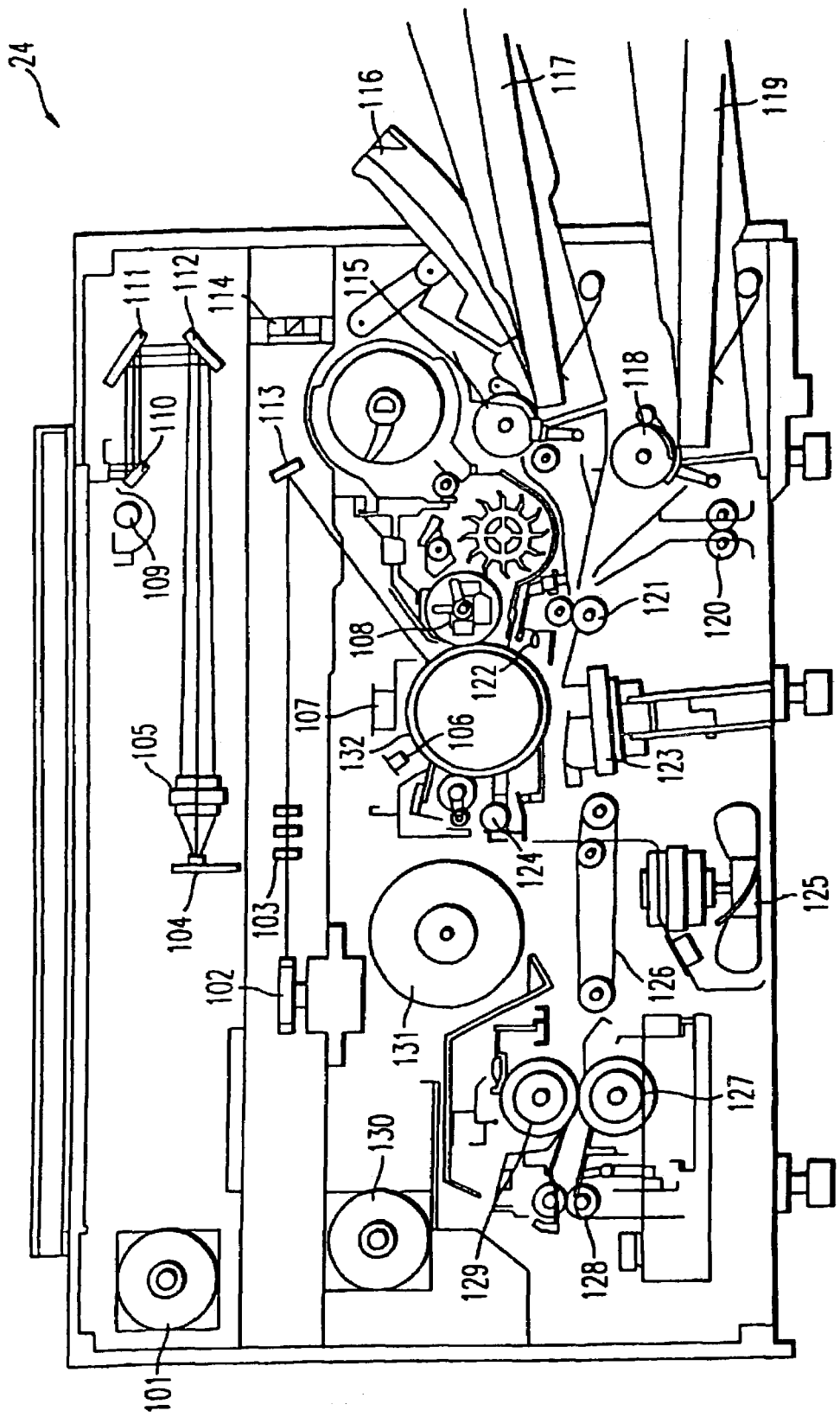
FIG. 2 illustrates the components of a digital image forming apparatus.

FIG. 2 illustrates the mechanical layout of the digital image forming apparatus 24 illustrated in FIG. 1. In FIG. 2, 101 is a fan for the scanner, 102 is a polygonal mirror used with a laser printer, and 103 designates an F θ lens used to collimate light from a laser (not illustrated). Reference numeral 104 designates a sensor for detecting light from the scanner. Reference numeral 105 designates a lens for focusing light from the scanner onto the sensor 104, and reference numeral 106 designates a quenching lamp used to erase images on the photoconductive drum 132. There is a charging corona unit 107 and a developing roller 108. Reference numeral 109 designates a lamp used to illustrate a document to be scanned and 110, 111, and 112 designate mirrors for reflecting light onto the sensor 104. A drum mirror 113 is provided to reflect light to the photoconductive drum 132 originating from the polygon mirror 102. A fan 114 is used to cool the charging area of the digital image forming apparatus, and a first paper feed roller 115 is used for feeding paper from the first paper cassette 117, and a reference numeral 116 designates a manual feed table. Similarly, a second feed paper feed roller 118 is used in conjunction with the second cassette 119. Reference numeral 120 designates a relay roller, 121 designates a registration roller, 122 designates an image density sensor, and 123 designates a transfer/separation corona unit. Reference numeral 124 designates a cleaning unit, 125 designates a vacuum fan, 126 designates a transport belt, 127 designates a pressure roller; and 128 designates an exit roller. A hot roller 129 is used to fix toner onto the paper, 130 designates an exhaust fan, and a main motor 131 is used to drive the digital image forming apparatus 24.

Figure 3:
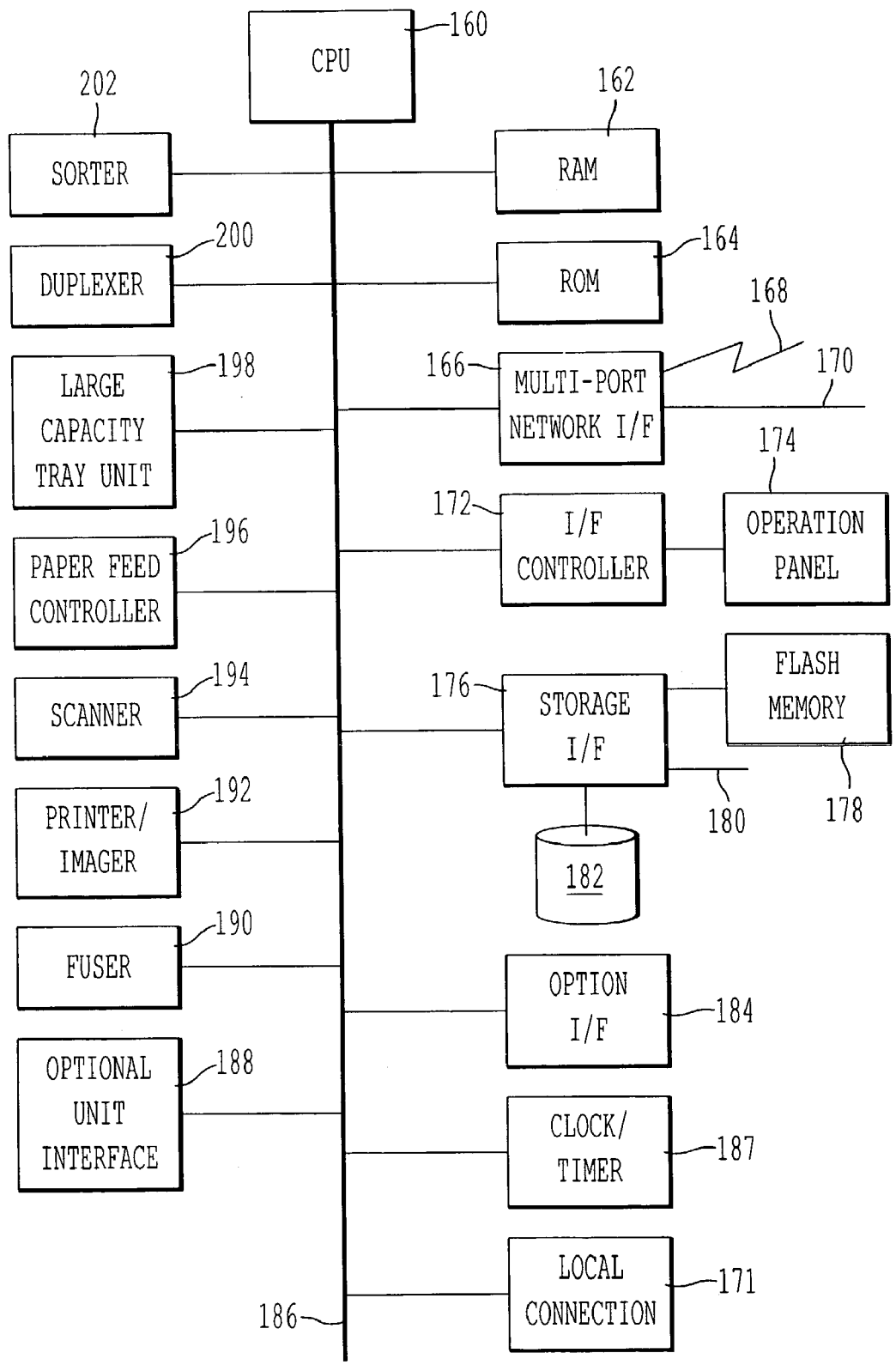
FIG. 3 illustrates the electronic components of the digital image forming apparatus illustrated in FIG. 2.

FIG. 3 is a block diagram illustrating the electronic components of the digital image forming apparatus 24 of FIG. 2, wherein CPU 160 is a microprocessor which acts as a controller of the apparatus. Random access memory (RAM) 162 stores dynamically changing information including operating parameters of the digital image forming apparatus 24. A non-volatile memory (e.g., a read only memory (ROM) 164 or a Flash Memory) stores program code used to run the digital image forming apparatus as well as static-state data, describing the image forming apparatus 24 (e.g., the model number, serial number of the copier, and default parameters).

A multi-port network interface 166 is provided to enable the digital image forming apparatus 24 to communicate with external devices through at least one communication network. Reference number 168 represents a telephone, ISDN, or cable line, and numeral 170 represents another type of network different from the network identified at 168. Additional details of the multi-port network interface are set forth with respect to FIG. 5. An interface controller 172 is used to connect an operation panel 174 to a system bus 186. The operation panel 174 includes standard input and output devices found on a digital image forming apparatus 24 including a copy button, keys to control the operation of the image forming apparatus such as, for example, number of copies, reduction/enlargement, darkness/lightness, etc. Additionally, a liquid crystal display may be included within the operation panel 174 to display parameters and messages of the digital image forming apparatus 24 to a user.

A local connection interface 171 is a connection through local ports such as RS232, the parallel printer port, USB, and IEEE 1394. FireWire (IEEE 1394) is described in Wickelgren, I., "The Facts About "FireWire", IEEE Spectrum, April 1997, Vol. 34, Number 4, pp. 19-25, the entire contents of which are incorporated herein by reference. Preferably, a "reliable" communication protocol is used which includes error detection and retransmission.

A storage interface 176 connects storage devices to the system bus 186. For example, the storage devices include a flash memory 178, which can be substituted by a conventional Electrically Erasable Programmable Read Only Memory (EEPROM), and a disk 182. The disk 182 may be a hard disk, optical disk, and/or a floppy disk drive. Additional memory devices may be connected to the digital image forming apparatus 24 via connection 180. The flash memory 178 is used to store semi-static state data which describes parameters of the digital image forming apparatus 24 which infrequently change over the life of the apparatus 24. Such parameters include, for example, the options and configuration of the digital image forming apparatus. An option interface 184 allows additional hardware such as an external interface to be connected to the digital image forming apparatus 24. A clock/timer 187 is utilized to keep track of both the time and date and also to measure elapsed time.

FIG. 3 also illustrates the various sections making up the digital image forming apparatus 24. Reference numeral 202 designates a sorter and contains sensors and actuators that are used to sort the output of the digital image forming apparatus 24. A duplexer 200 allows performance of a duplex operation. The duplexer 200 includes conventional sensors and actuators. A large capacity tray unit 198 is provided for allowing paper trays holding a large number of sheets. As with the duplexer 200, the tray unit 198 includes conventional sensors and actuators as well.

A paper feed controller 196 is used to control the operation of feeding paper into and through the digital image forming device. A scanner 194 is used to scan images into the digital image forming device-and includes conventional scanning elements such as a light, mirror, etc. Additionally, scanner sensors are used such as a home position sensor to determine that the scanner is in the home position, and a lamp thermistor is used to ensure proper operation of the scanning lamp. A printer/imager 192 prints the output of the digital image forming device, and includes a conventional laser printing mechanism, a toner sensor, and an image density sensor. The fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital image forming device such as an automatic document feeder, a different type of sorter/collator, or other elements which can be added to the digital image forming device.

Figure 4:
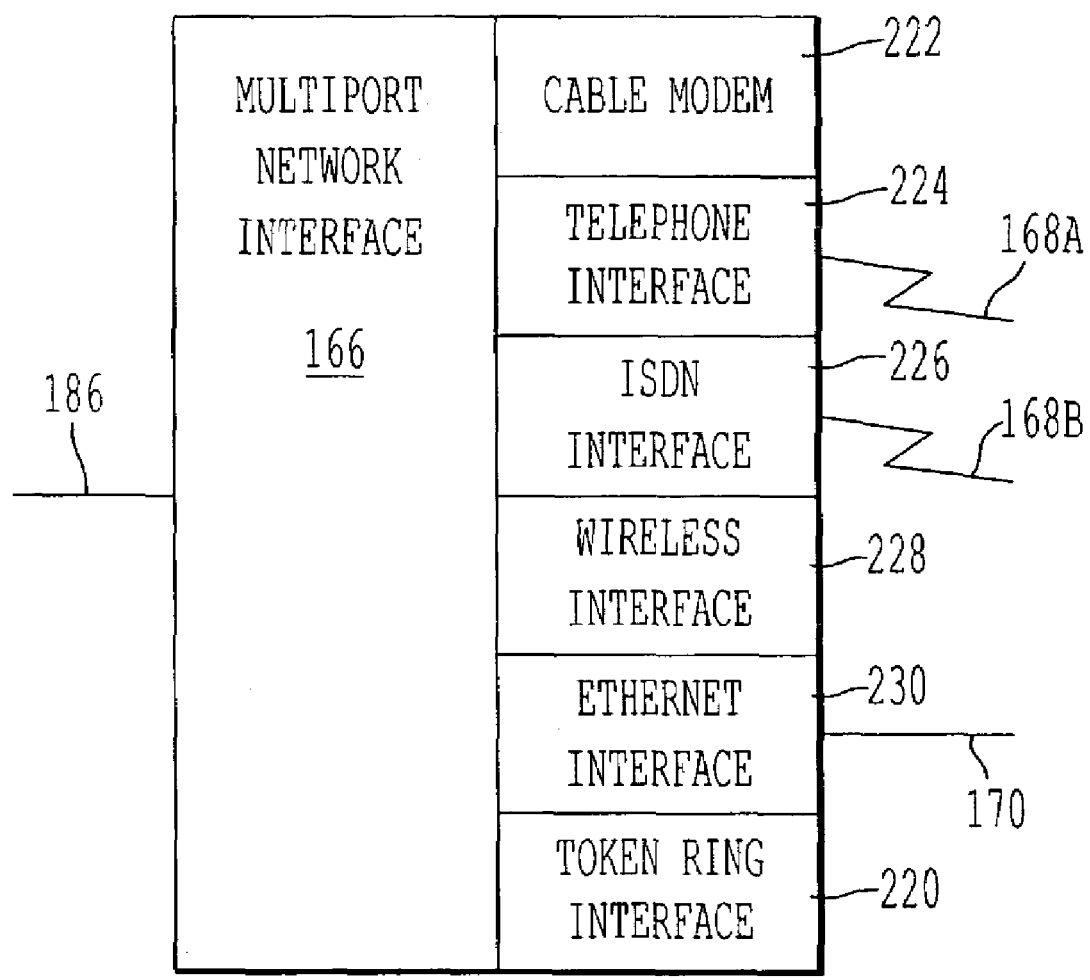
FIG. 4 illustrates details of a multi-port communication interface illustrated in FIG. 3.

FIG. 4 illustrates details of the multi-port network interface 166. The digital image forming device may communicate to external devices through a token ring interface 220, a cable modem unit 222, which has a high speed connection over cable, a conventional telephone interface 224, which connects to a telephone line 168A, an ISDN interface 226, which connects to an ISDN line 168B, a wireless interface 228, or an ethernet interface 230, which connects to a LAN 170. Other interfaces may include, but are not limited to, a Digital Subscriber Line (DSL) (original DSL, concentric DSL, and asymmetric DSL). A single device which connects to both a Local Area Network and a telephone line is commercially available from Intel and is known as Intel Pro 10/100+Modem.

The CPU or other microprocessor or circuitry executes a monitoring process to monitor the state of each of the sensors of the digital image forming device, and a sequencing process is used to execute the instructions of the code used to control and operate the digital image forming device. Additionally, there is (1) a central system control process executed to control the overall operation of the digital image forming device, and (2) a communication process used to assure reliable communication to external devices connected to the digital image forming device. The system control process monitors and controls data storage in a static state memory (e.g., the ROM 164 of FIG. 3), a semi-static memory (e.g., the flash memory 178 or disk 182), or the dynamic state memory (e.g., a volatile or non-volatile memory (e.g., the RAM 162 or the flash memory 178 or disk 182). Additionally, the static state memory may be a device other than the ROM 164 such as a non-volatile memory including either of the flash memory 178 or disk 182.

The above details have been described with respect to a digital image forming device, but the present invention is equally applicable to other business office machines or devices such as an analog copier, a facsimile machine, a scanner, a printer, a facsimile server, projector, conferencing equipment, shredder, or other business office machines, a business office appliance, or other appliances (e.g., a microwave oven, VCR, digital camera, cellular phone, palm top computer). Additionally, the present invention includes other types of devices which operate using store-and-forward or direct connection-based communication. Such devices include metering systems (including gas, water, or electricity metering systems), vending machines, or any mechanical device (e.g., automobiles) that needs to be monitored during operation or remote diagnosis. In addition to monitoring special purpose machines and computers, the invention can be used to monitor, control, and diagnose a general purpose computer that would be the monitored and/or controlled device.

Figure 5:
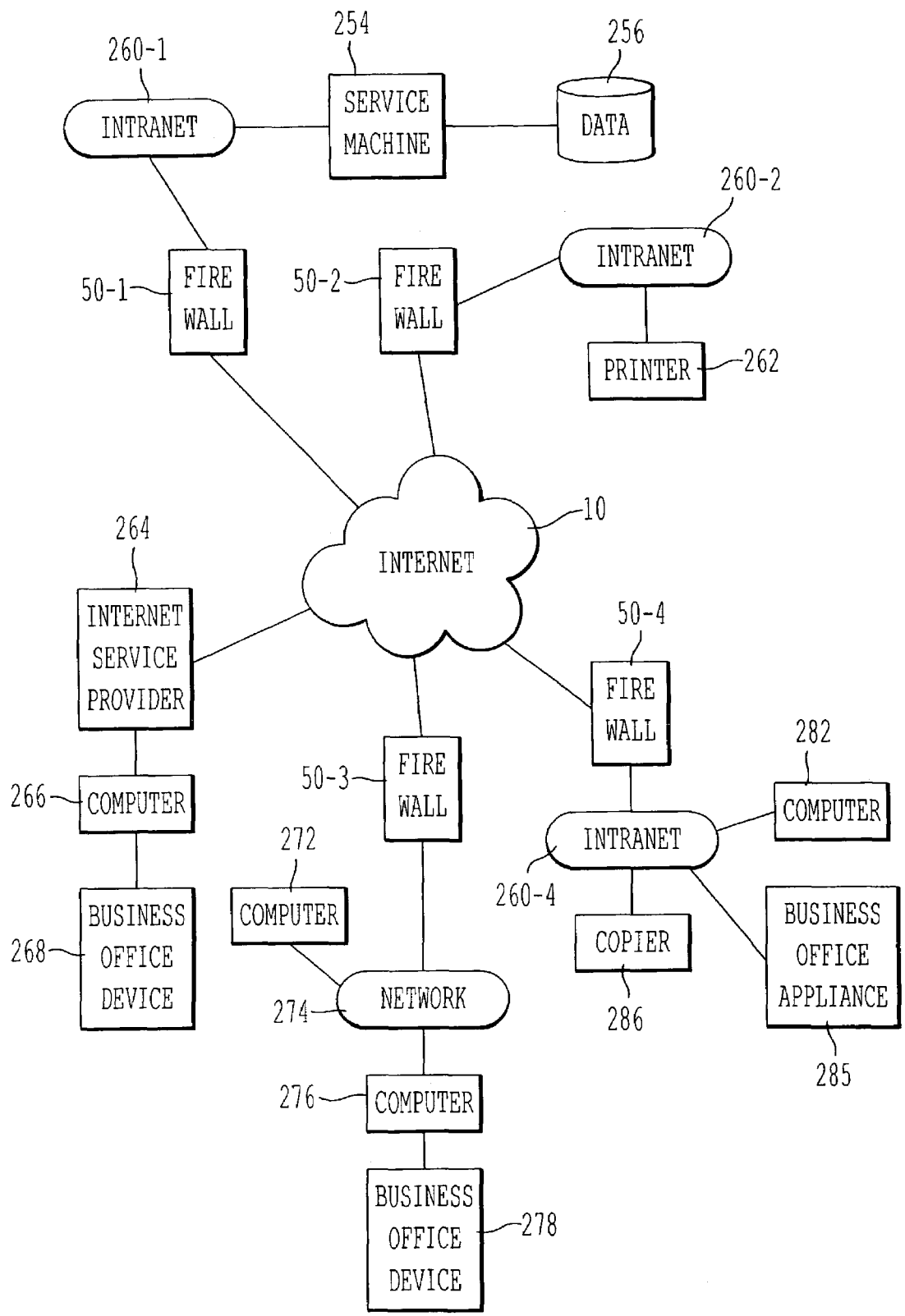
FIG. 5 illustrates an alternative system configuration in which business office devices are either connected directly to the network or connected to a computer which is connected to the network.

FIG. 5 illustrates an alternative system diagram of the present invention in which different devices and subsystems are connected to the WAN 10. However, there is no requirement to have each of these devices or subsystems as part of the invention. Each component or subsystem illustrated in FIG. 5 is individually part of the invention. Further, the elements illustrated in FIG. 1 may be connected to the WAN 10 which is illustrated in FIG. 5. In FIG. 5, there is illustrated a firewall 50-1 connected to an intranet 260-1. A service machine 254 connected to the intranet 260-1 includes therein, or has connected thereto, data 256 that may be stored in a database format. The data 256 includes history, performance, malfunction, and any other information such as statistical information of the operation or failure or set-up of the monitored devices, or configuration information such as which components or optional equipment is included with the monitored devices. The service machine 254 may be implemented as the device or computer which requests the monitored devices to transmit data, or which requests that remote control and/or diagnostic tests be performed on the monitored devices. The service machine 254 may be implemented as any type of device, and is preferably implemented using a computerized device such as a general purpose computer.

Another sub-system of FIG. 5 includes a firewall 50-2, an intranet 260-2, and a printer 262 connected thereto. In this sub-system, the functions of sending and receiving electronic messages by the printer 262 (and similarly by a copier 286) are performed by (1) circuitry, (2) a microprocessor, or (3) any other type of hardware contained within or mounted to the printer 262 (i.e., without using a separate general purpose computer).

An alternate type of sub-system includes the use of an Internet Service Provider 264 which may be any type of Internet Service Provider (ISP), including known commercial companies such as America Online, Earthlink, and Niftyserve. In this sub-system, a computer 266 is connected to the ISP 264 through a digital or analog modem (e.g., a telephone line modem, a cable modem, modems which use any type of wires such as modems used over an Integrated Services Digital Network (ISDN) line or an Asymmetric Digital Subscriber Line (ADSL), modems which use frame relay communication, wireless modems such as a radio frequency modem, a fiber optic modem, or a device which uses infrared light waves). Further, a business office device 268 is connected to the computer 266. As an alternative to the business office device 268 (or any other device illustrated in FIG. 5), a different type of machine may be monitored or controlled such as a digital copier, any type of appliance, security system, or utility meter, such as an electrical, water, or gas utility meter, or any other device discussed herein.

Also illustrated in FIG. 5 is a firewall 50-3 connected to a network 274. The network 274 may be implemented as any type of computer network, (e.g., an ethernet or token ring network). Networking software which may be used to control the network includes any desired networking software including software commercially available from Novell or Microsoft. The network 274 may be implemented as an intranet, if desired. A computer 272 connected to the network 274 may be used to obtain information from a business office device 278 and generate reports such as reports showing problems that occurred in various machines connected to the network, and a monthly usage report of the devices connected to the network 274. In this embodiment, a computer 276 is connected between the business office device 278 and the network 274. This computer receives communications from the network and forwards the appropriate commands or data, or any other information, to the business office device 278.

Communication between the business office device 278 and the computer 276 may be accomplished using wire-based or wireless methods including, but not limited to, radio frequency connections, electrical connections and light connections (e.g., an infrared connection, or a fiber optics connection). Similarly, each of the various networks and intranets illustrated in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless technique which is disclosed in the Bluetooth Specification LOA (available at the World Wide Web site www.bluetooth.com), which is incorporated herein by reference.

Another sub-system illustrated in FIG. 5 includes a firewall 50-4, an intranet 260-4, a computer 282 connected thereto, a business office appliance 285 and a copier 286. The computer 282 may be used to generate reports and request diagnostic or control procedures. These diagnostic and control procedures may be performed with respect to the business office appliance 285 and the copier 286 or any of the other devices illustrated in or used with FIG. 5. While FIG. 5 illustrates a plurality of firewalls, the firewalls are preferable, but optional equipment, and therefore, the invention may be operated without the use of firewalls, if desired. For the monitoring and controlling of the networked equipment, any computers (266, 272 or 282) can be used instead of 254.

Figure 6A:
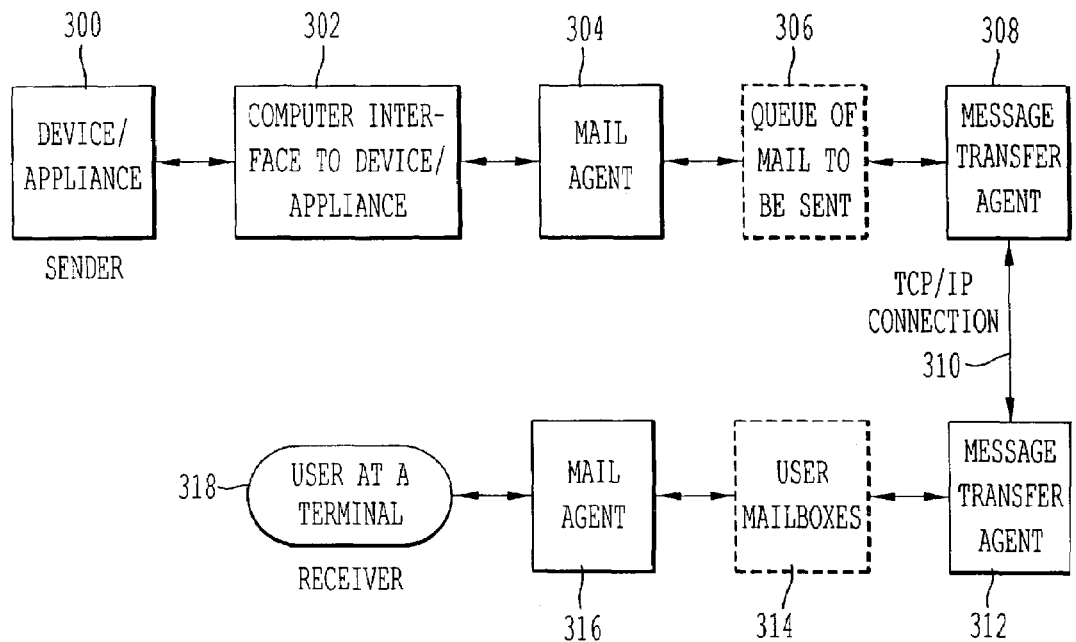
FIG. 6A is a block diagram illustrating a flow of information to and from an application unit using electronic mail.

FIG. 6A illustrates a device/appliance 300 connected to a typical e-mail exchange system which includes components 302, 304, 306, 308, 310, 312, 314, 316, and 318, which may be implemented in a conventional manner, and are adapted from FIG. 28.1 of Stevens, above. A computer interface 302 interfaces with any of the application units or devices/appliances 300 described herein. While FIG. 6A illustrates that the device/appliance 300 is the sender, the sending and receiving functions may be reversed in FIG. 6A. Furthermore, if desired, the user may not be needed to interface with the device/appliance 300 at all. The computer interface 302 then interacts with a mail agent 304. Popular mail agents for Unix include MH, Berkeley Mail, Elm, and Mush. Mail agents for the Windows family of operating systems include Microsoft Outlook and Microsoft Outlook Express. At the request of the computer interface 302, the mail agent 304 creates e-mail messages to be sent and, if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communications using a TCP/IP connection 310. Notably, the communication between the message transfer agents 308 and 312 may occur over any size network (e.g., WAN or LAN). Further, the message transfer agents 308 and 312 may use any communication protocol. In one embodiment the present invention, elements 302 and 304 of FIG. 6A reside in the library to monitor the usage of the application unit.

From the message transfer agent 312, e-mail messages are stored in user mailboxes 314 which are transferred to the mail agent 316 and ultimately transmitted to the user at a terminal 318 which functions as a receiving terminal.

This "store-and-forward" process relieves the sending mail agent 304 from having to wait until a direct connection is established with the mail recipient. Because of network delays, the communication could require a substantial amount of time during which the application would be unresponsive. Such an unresponsiveness is generally unacceptable to users of the application unit. By using e-mail as the store-and-forward process, retransmission attempts after failures occur automatically for a fixed period of time (e.g., three days). In an alternate embodiment, the application can avoid waiting by passing communicating requests to one or more separate threads. Those threads can then control communication with the receiving terminal 318 while the application begins responding to the user interface again. In yet another embodiment in which a user wishes to have communication completed before continuing, direct communication with the receiving terminal is used. Such direct communication can utilize any protocol not blocked by a firewall between the sending and receiving terminals. Examples of such protocols include Telnet, File Transfer Protocol (FTP) and Hyper Text Transfer Protocol (HTTP).

Public WANs, such as the Internet, are generally not considered to be secure. Therefore, if it is desired to keep messages confidential, messages transmitted over the public WANs (and multi-company private WANs) can be encrypted. Encryption mechanisms are known and commercially available which may be used with the present invention. For example, a C++ library function, crypt( ), is available from Sun Microsystems for use with the Unix operating system. Encryption and decryption software packages are known and commercially available and may also be used with this invention. One such package is PGP Virtual Private Network (VPN) available from McAfee.

Figure 6B:
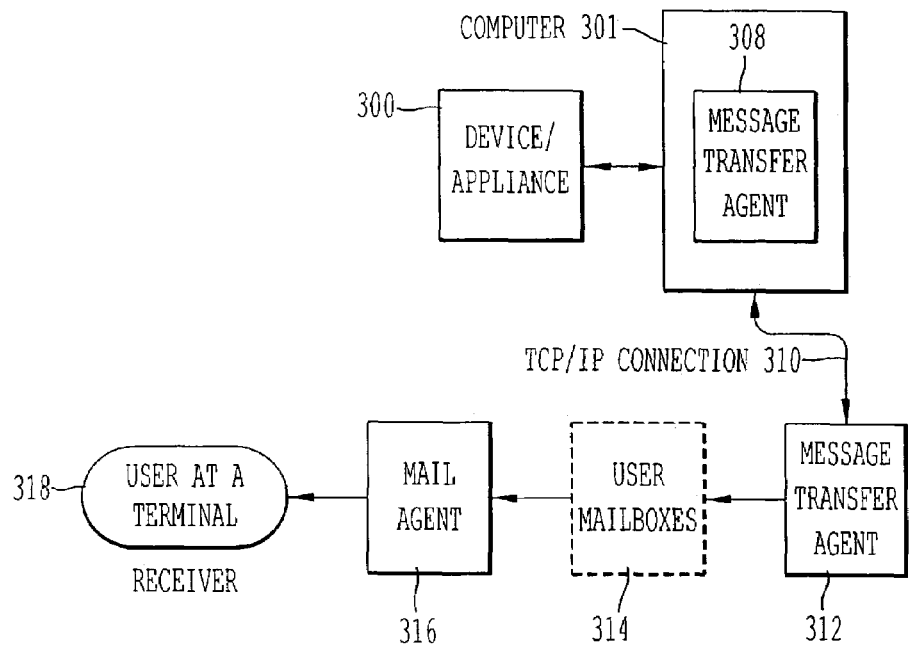
FIG. 6B illustrates an alternative way of communicating using electronic mail in which a computer that is connected to the application unit also serves as a Message Transfer Agent (MTA)

As an alternative to the general structure of FIG. 6A, a single computer may be used which functions as the computer interface 302, the mail agent 304, the mail queue 306 and the message transfer agent 308. As illustrated in FIG. 6B, the device/appliance 300 is connected to a computer 301 which includes the message transfer agent 308.

Figure 6C:
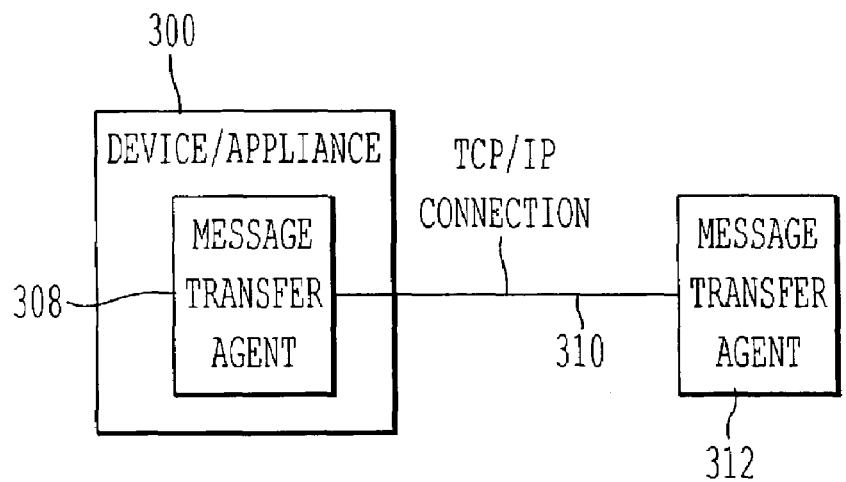
FIG. 6C illustrates an alternative way of communicating using electronic mail in which an application unit includes a message transfer agent for exchanging electronic mail.

A further alternative structure is shown in FIG. 6C in which the message transfer agent 308 is formed as part of the device/appliance 300. Further, the message transfer agent 308 is connected to the message transfer agent 312 by a TCP/IP connection 310. In the embodiment of FIG. 6C, the device/appliance 300 is directly connected to the TCP/IP connection 310 with an e-mail capability. One use of the embodiment of FIG. 6C includes using a facsimile machine with an e-mail capability (e.g., as defined in RFC 2305 (a simple mode of facsimile using Internet mail)) as the device/appliance 300.

Figure 6D:
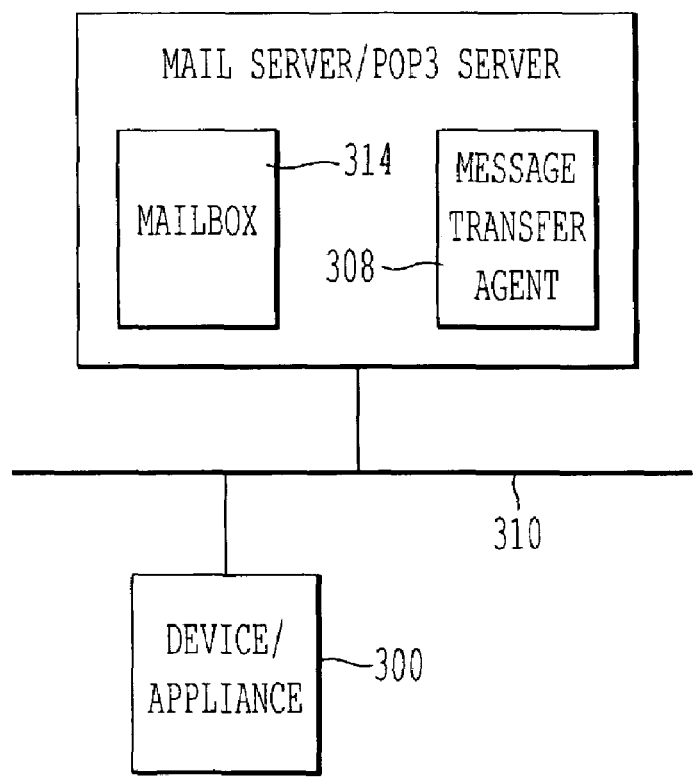
FIG. 6D illustrates an alternative way of communicating using electronic mail in which a mail server acts as a POP3 server to receive mail for an appliance/device and as an Simple Mail Transfer Protocol (SMTP) server to send mail for the appliance/device.

FIG. 6D illustrates a system in which a device/appliance 300 does not by itself have the capability to directly receive e-mail, but has a connection 310 to a mail server/POP3 server including a message transfer agent 308 and a mail box 314 so that the device/appliance 300 uses the POP3 protocol to retrieve received mail from the mail server.

Figure 7:
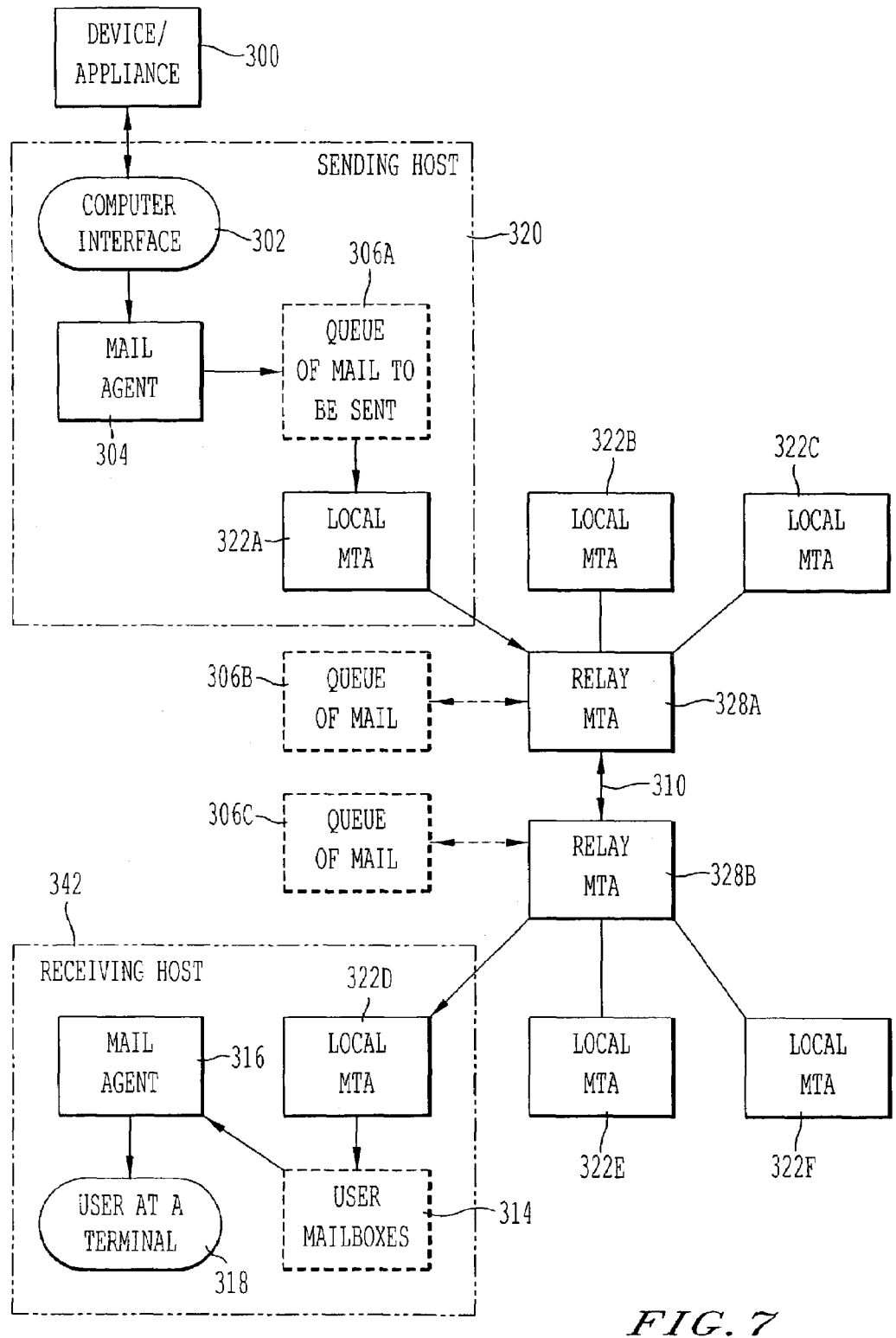
FIG. 7 illustrates an alternative manner of sending messages across the Internet.

FIG. 7 illustrates an alternative implementation of transferring mail and is adapted from FIG. 28.3 of Stevens referenced previously. FIG. 7 illustrates an electronic mail system having a relay system at each end. The arrangement of FIG. 7 allows one system at an organization to act as a mail hub. In FIG. 7, there are four MTAs connected between the two mail agents 304 and 316. These MTAs include local MTA 322A, relay MTA 328A, relay MTA 328B, and local MTA 322D. The most common protocol used for mail messages is SMTP (Simple Mail Transfer Protocol) which may be used with this invention, although any desired mail protocol may be utilized. In FIG. 7, 320 designates a sending host which includes the computer interface 302, the mail agent 304, and the local MTA 322A. The device/appliance 300 is connected to, or alternatively included within, the sending host 320. As another case, the device/appliance 300 and host 320 can be in one machine where the host capability is built into the device/appliance 300. Other local MTAs 322B, 322C, 322E and 322E may also be included. Mail to be transmitted and received may be queued in a queue of mail 306B of the relay MTA 328A. The messages are transferred across the TCP/IP connection 310 (e.g., an Internet connection or a connection across any other type of network).

The transmitted messages are received by the relay MTA 328B and if desired, stored in a queue of mail 306C. The mail is then forwarded to the local MTA 322D of a receiving host 342. The mail may be placed in one or more of the user mailboxes 314 and subsequently forwarded to the mail agent 316, and finally forwarded to the user at a terminal 318. If desired, the mail may be directly forwarded to the terminal without user interaction.

Figure 8:
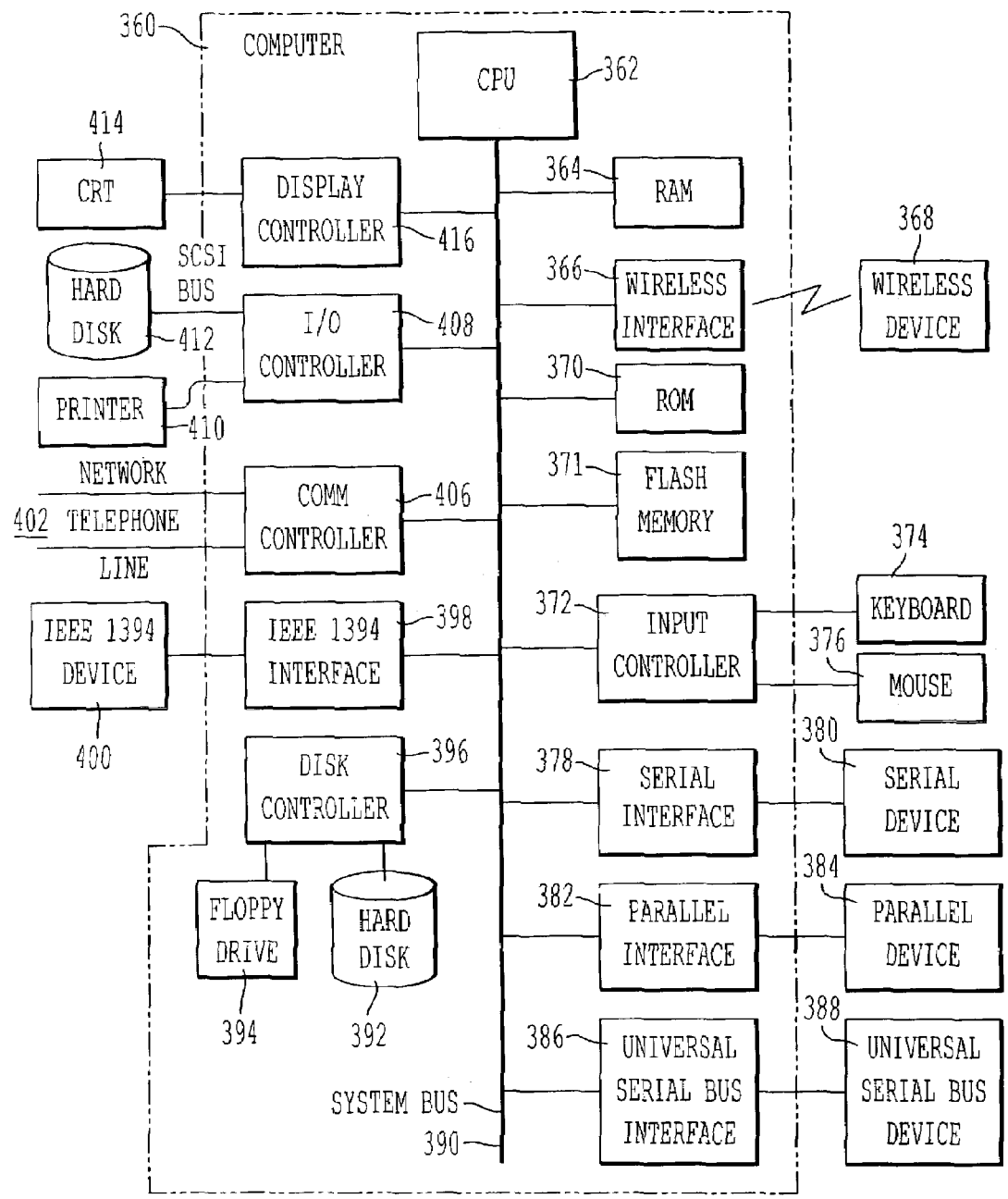
FIG. 8 illustrates an exemplary computer which may be connected to an appliance/device and used to communicate electronic mail messages.

The various computers used in the present invention, including the computers 266 and 276 of FIG. 5, may be implemented as illustrated in FIG. 8. Further, any other computer used in this invention may be implemented in a similar manner to the computer illustrated in FIG. 8, if desired, including the service machine 254, computer 272, and computer 282 of FIG. 5. However, not every element illustrated in FIG. 8 is required in each of those computers.

In FIG. 8, the computer 360 includes a CPU 362 which may be implemented as any type of processor including commercially available microprocessors from companies such as Intel, AMD, Motorola, Hitachi and NEC. There is a working memory such as a RAM 364, and a wireless interface 366 that communicates with a wireless device 368. The communication between the interface 366 and device 368 may use any wireless medium (e.g., radio waves or light waves). The radio waves may be implemented using a spread spectrum technique such as Code Division Multiple Access (CDMA) communication or using a frequency hopping technique such as that disclosed in the Bluetooth specification.

Computer 360 includes a ROM 370 and a flash memory 371, although any other type of non-volatile memory (e.g., Erasable Programmable ROM, or an EEPROM) may be used in addition to or in place of the flash memory 371. An input controller 372 has connected thereto a keyboard 374 and a mouse 376. There is a serial interface 378 connected to a serial device 380. Additionally, a parallel interface 382 is connected to a parallel device 384, a universal serial bus (USB) interface 386 is connected to a universal serial bus device 388, and also there is an IEEE 1394 device 400, commonly referred to as a fire wire device, connected to an IEEE 1394 interface 398. A system bus 390 connects the various elements of the computer 360. A disk controller 396 is connected to a floppy disk drive 394 and a hard disk drive 392. A communication controller 406 allows the computer 360 to communicate with other computers (e.g., by sending e-mail messages) over a telephone line 402 or a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

Figure 9A:
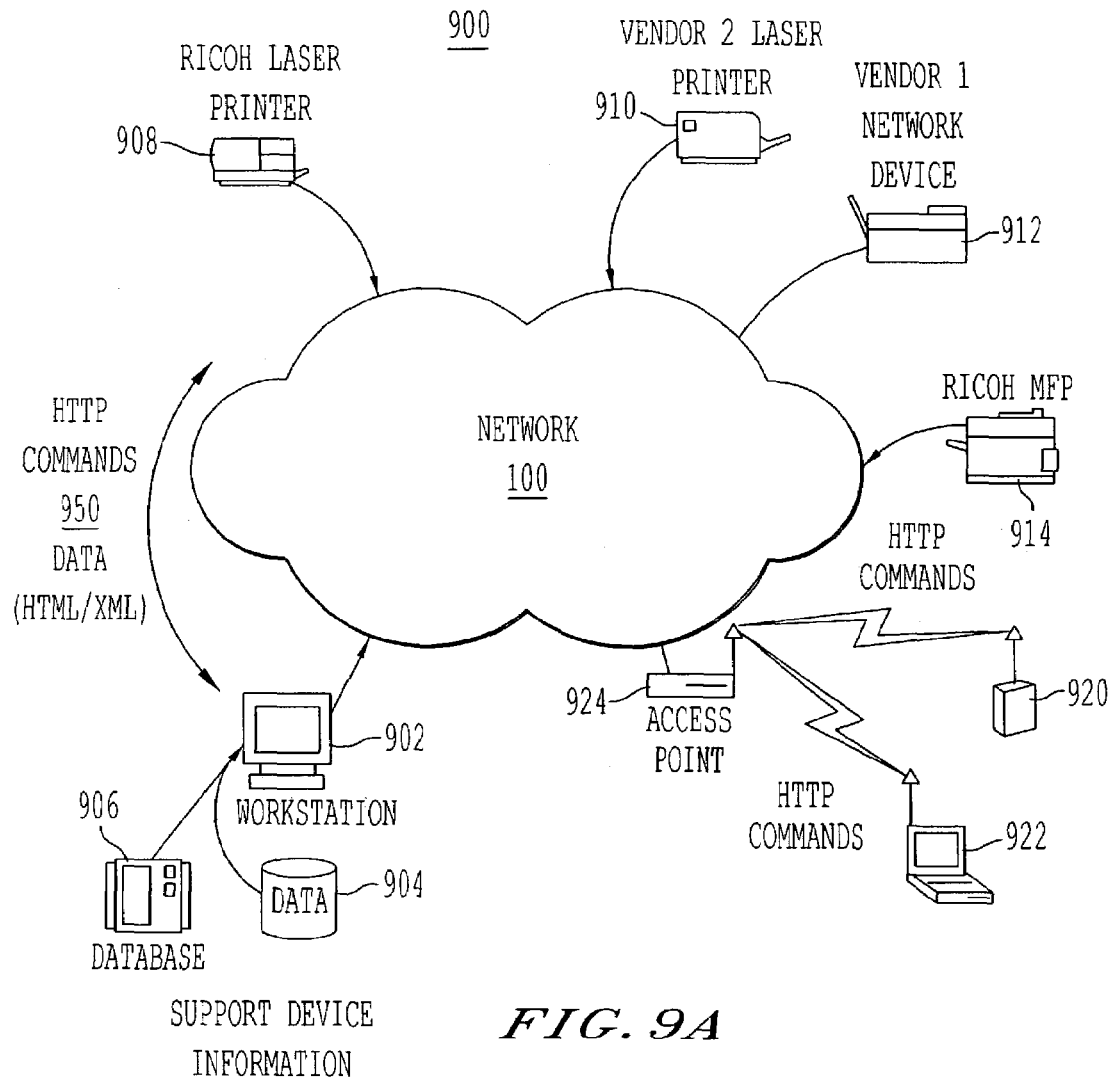
FIG. 9A is a schematic representation of the overall system in accordance with an exemplary embodiment of the present invention.
Figure 10:
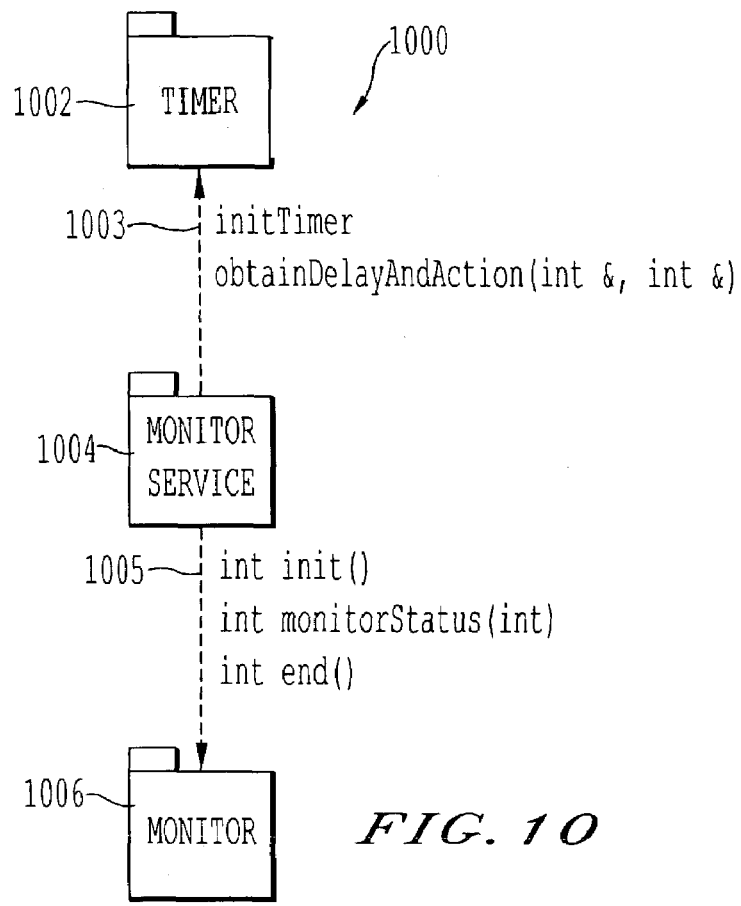
FIG. 10 illustrates modules used in the monitoring of the data and their interface functions in accordance with an exemplary embodiment of the present invention.

Referring now to FIG. 9A, there is shown a schematic representation of the overall system 900 in accordance with an exemplary embodiment of the present invention. System 900 is shown to include a plurality of devices, for example, a laser printer 908, a scanner 910, a network device 912, and a multi-function printer 914, all connected to a network 100. These plurality of devices are generally referred to herein as "monitored devices". The system 900 also includes a workstation/monitoring system 902 (hereinafter referred to as a controller 902), the details of which are illustrated in FIG. 10, connected to the network 100 for monitoring and controlling the monitored devices 908, 910, 912 and 914. Each of the monitored devices 908, 910, 912, and 914 are given a unique address locator. For example, an IP address assigned to a device serves as a unique address locator for the device. Thus, a user at controller 902 is able to access a respective device among the monitored devices 908-914 by accessing the unique IP address assigned to the respective monitored device. It will be appreciated that the present invention is not limited to using IP addresses to uniquely identify devices connected to a network.

The controller 902, upon accessing a device among the monitored devices 908-914, displays a web page assigned to the device. The web page includes detailed information about the operational status of the device including troubleshooting information. For example, controller 902 accesses and displays the web page assigned to the laser printer 908. The web page includes the operational status/details of the laser printer 908 including such details as toner level, indication of paper jam, quantity of print paper in printer trays, etc. Likewise, operational history of the laser printer may also be displayed on the web page. Preferably, unique operational details of the laser printer 908 may be displayed in unique fields on its web page. Likewise, operational status/details of each of the monitored devices 908-914 are displayed on their respective web pages.

It will be appreciated that the controller 902 may be either physically connected or wirelessly coupled to the network 100. For example, a personal digital assistant (PDA) 920 or a laptop computer 922, shown to be wirelessly coupled to the network 100, may also be used as a controller 902. An access point 924 acts as an interface to enable wireless communications between the network 100 and PDA 902 or laptop computer 922. Henceforth, the present invention will be described with the assumption that the controller 902 will be controlling and monitoring the status of the monitored devices connected to the network.

The network 100 facilitates communication between the controller 902 and the monitored devices 908-914 to enable monitoring and control of such monitored devices. The number of devices that are connected to the network is not limiting of the present invention. It will be appreciated that the network 100 may be a local area network (LAN) or a wide area network (WAN). Likewise, the monitored devices 908, 910, 912, and 914 are shown to be merely exemplary.

The controller 902 is communicatively coupled to a storage device 904 and a database 906. The storage device 904 includes a hard disk, optical disk, and/or an external disk drive. The database 906 is communicatively linked to the storage device 904, and includes a Relational Database Management System (RDBMS) for easy search and retrieval of data stored in the storage device 904. The storage device 904 preferably stores detailed information about each of the monitored devices 908-914. For example, detailed information, such as the make, model, and various functions and trouble-shooting details of the laser printer 908, supplied by its manufacturer, are stored in the storage device 904. Also, deviation values about the operational status of the laser printer compared to predetermined reference values may also be stored in the storage device 904. Although the database 906 and the storage device 904 are described to be communicatively coupled to the controller 902, it will be appreciated that the controller 902 may be built with the storage device and the database installed therein. In such a case, the storage device 906 and the database 904 would be depicted as being internal to the controller 902.

The controller 902 is installed with software, the details of which are illustrated in FIG. 10, in order to facilitate monitoring and control of the plurality, of devices 908-914. Hyper Text Transfer Protocol (HTTP) is used by the controller 902 for monitoring the plurality of devices 908-914 and the data received from the plurality of devices 908-914 is presented in the form of HTML or XML formats, or any other web browser languages.

Figure 9B:
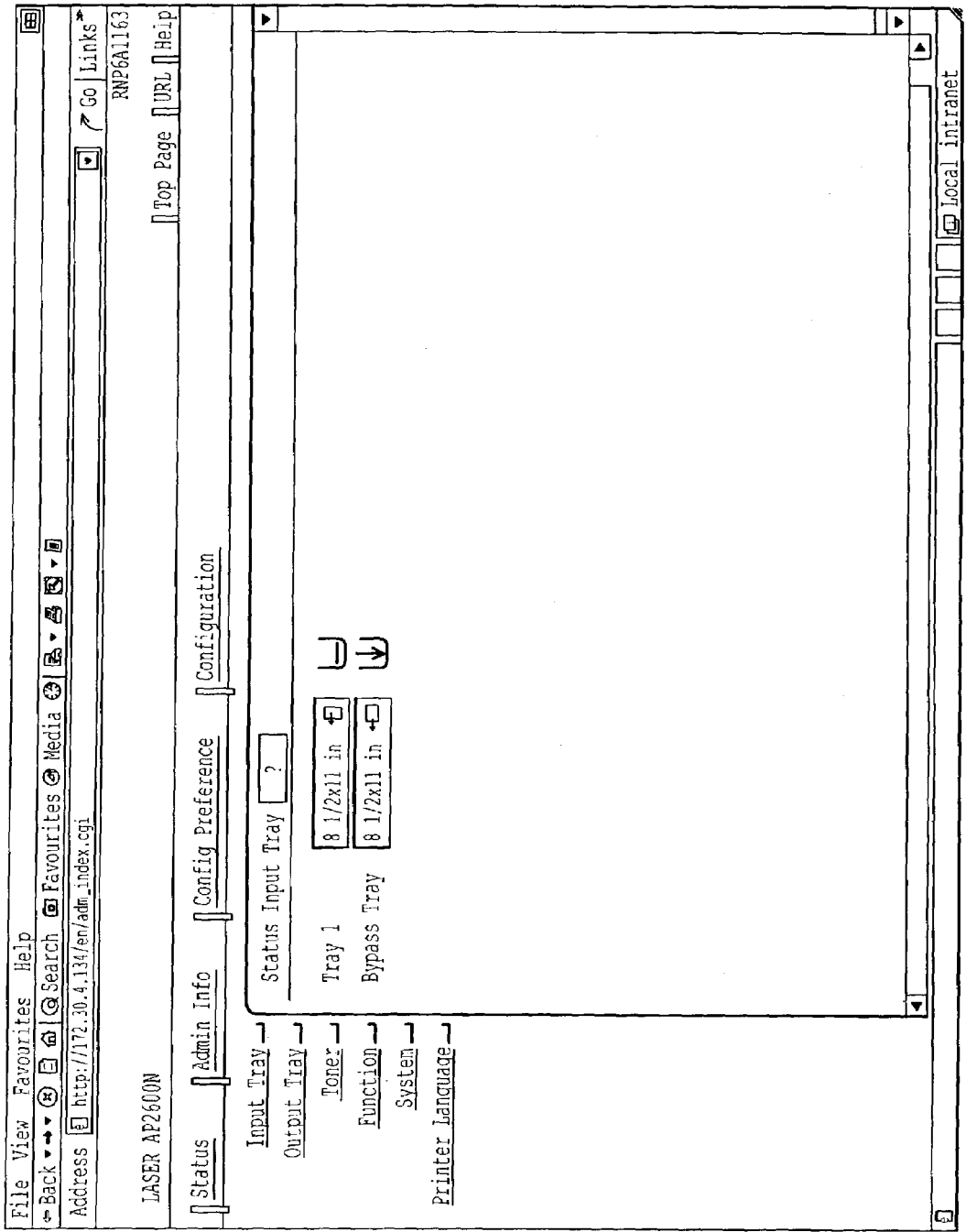
FIG. 9B illustrates an exemplary web page interface for a monitored device in accordance with an exemplary embodiment of the present invention.

Although FIG. 9A illustrates only the imaging devices, the network for communicating information between the monitoring device and the plurality of monitored devices may include the home network where the appliances and meters are connected to the network. It will be appreciated that data collected by the controller/workstation 902 can be sent through e-mail, FTP, or any other communication protocol means to a remote device for further processing. FIG. 9B illustrates an exemplary web page interface for a monitored device in accordance with an exemplary embodiment of the present invention.

Figure 13:
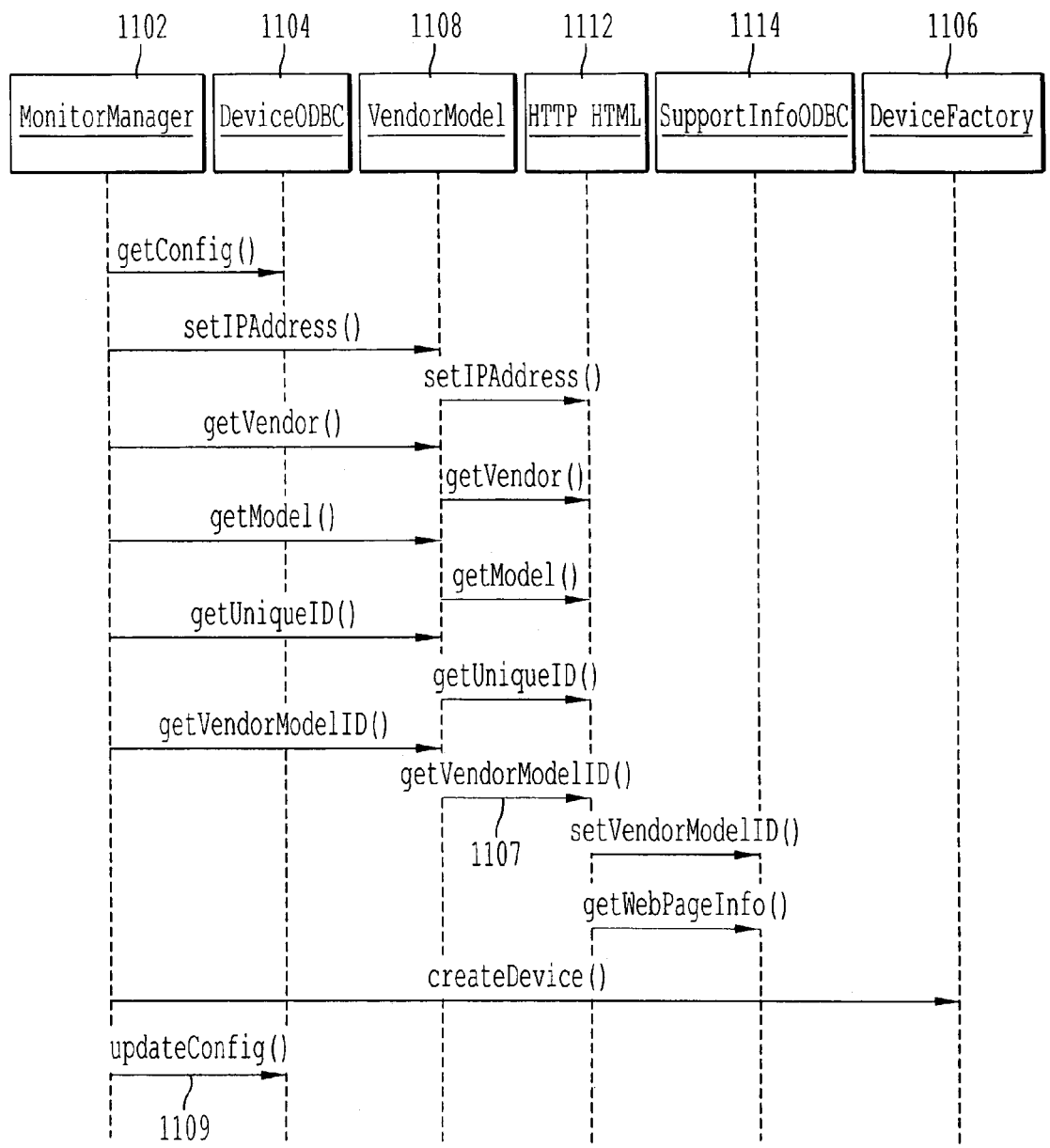
FIG. 13 shows the sequence of the init function of Monitor module 1006 illustrated in FIG. 10 of the present invention.

FIG. 10 illustrates a system 1000 used in the monitoring of the data and their interface functions in accordance with an exemplary embodiment of the present invention. The system 1000 includes a module MonitorService 1004 which is a computer resident program such as Service in NT or Window 2000 and Daemon in the Unix. Also included in system 1000 are a Timer module 1002 and Monitor module 1006. Modules 1002 and 1006 are library functions to be called by the MonitorService 1004. For example, MonitorService 1004 initializes the Timer module 1002 by calling InitTimer 1003 function and obtains delay and action parameters by calling obtainDelayAndAction (int &, int&) function. The init( ) function is also called by the MonitorService 1004 to initialize various modules in the Monitor module 1006 as illustrated in FIG. 13. The init( ) function is initially called to obtain the IP address assigned to a monitored device.

Once the IP address of a monitored device is obtained, such IP address is used by the monitoring system to contact the monitored device to obtain such information as, for example, manufacturer and model information. The functions executed by the system 1000 as described as below:

void initTimer(void)

This function initializes the Timer. In particular, this function triggers the Timer object to get the timing information from the registry.

void obtainDelayAndAction(int & out_nDelay, int & out_nAction)

This function returns the delay time in second for ::Sleep function (need to multiply 1000) and the action indicator.

int init(void)

This function initializes the Monitor. In addition, it would create the devices to be monitored. The return int is the error code in which zero is defined as no error.

int monitorStatus(int in_nAction)

This function monitors the preset information. The return int is the error code in which zero is defined as no error.

int end(void)

This function cleans up the Monitor before closing the objects. The return int is the error code in which zero is defined as no error.

Figure 11A:
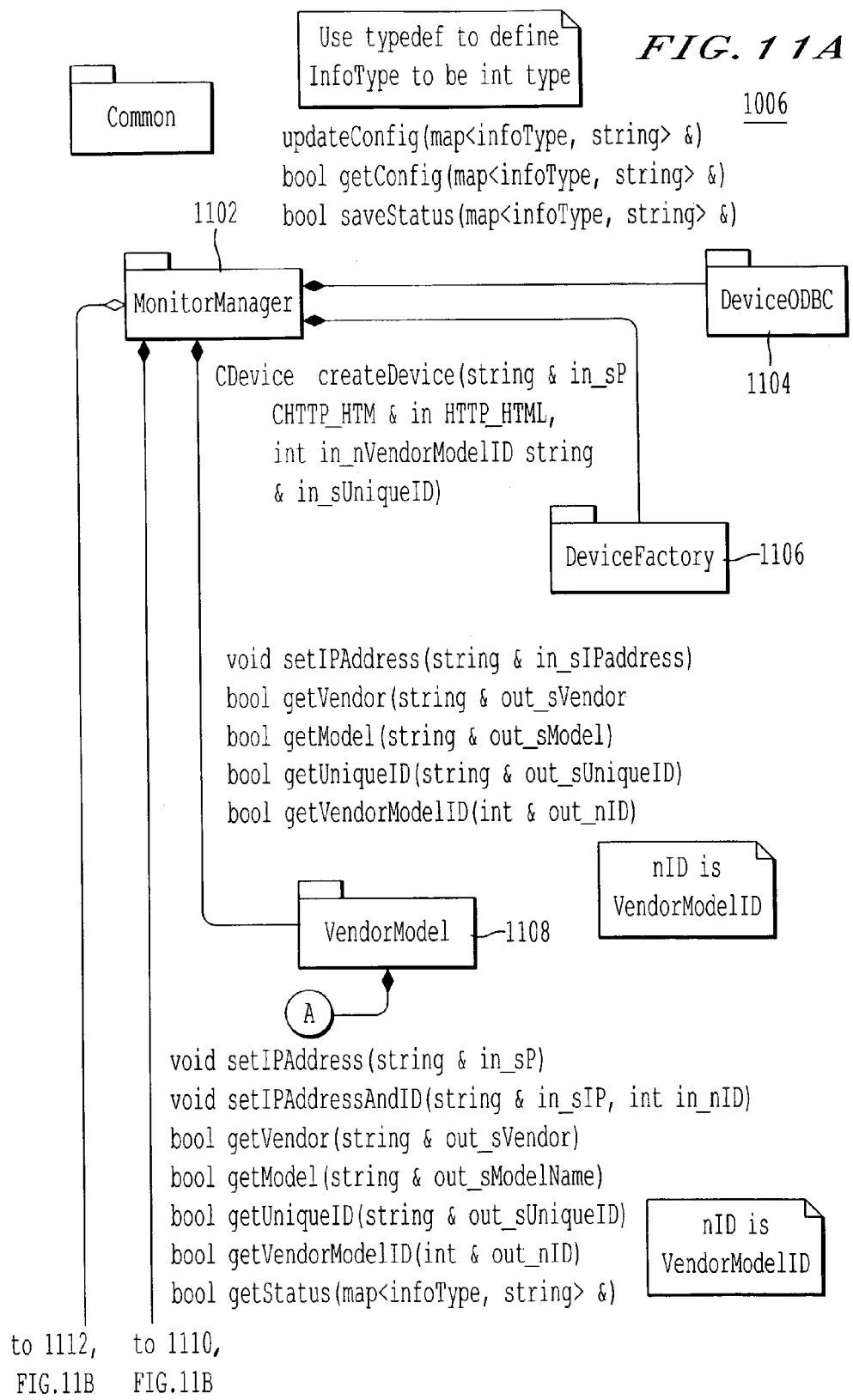
FIG. 11 shows details within the Monitor module and their calling functions between the sub-modules.
Figure 11B:
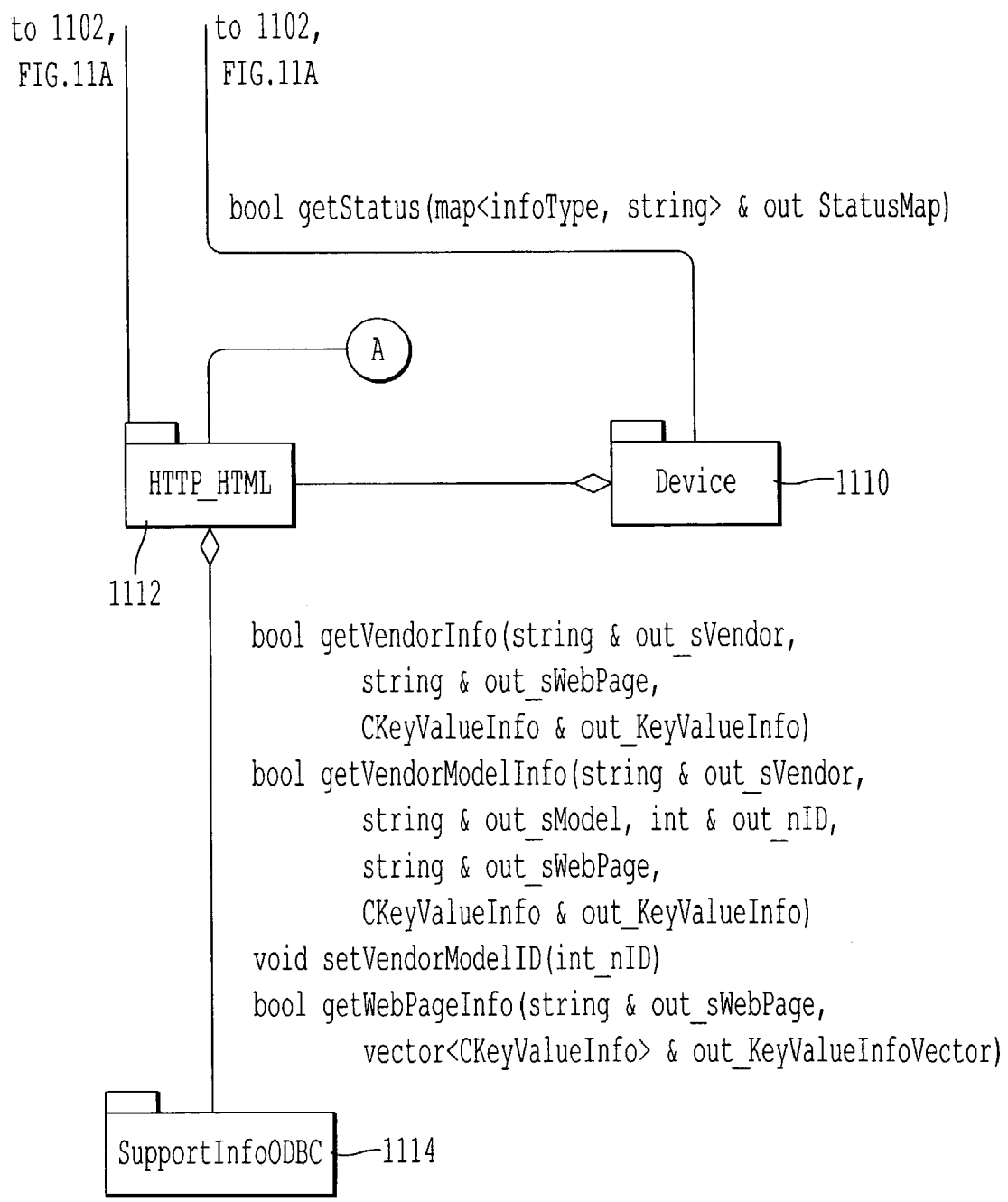

FIG. 11 shows the structural details within the Monitor module 1006 and the calling functions between the sub-modules of the Monitor module 1006. The Monitor module 1006 includes a Monitor manager 1102 that manages other sub-Modules, such as DeviceODBC 1104, DeviceFactory 1106, VendorModel 1108, HTTP_HTML 1112, SupportInfoODBC 1114, Device 1110, to complete the tasks defined by interface functions as illustrated in FIG. 10. Specifically, the DeviceODBC sub-module 1104 and SupportInfoODBC submodule 1114 are accessed to obtain device specific information from a monitored device. The SupportInfoODBC sub-module 1114 is preferably attached to the protocol HTTP_HTML sub-module 1112 as the information obtained by the SupportInfoODBC sub-module 1114 is preferred to be localized to the HTTP_HTML sub-module 1112. The calling functions executed between the sub-modules are defined as below:

Major Interfaces

This section discusses only the major interface between the packages. The following is not the complete listing of the interfaces among the packages. For example, some packages may need to have init functions.

void updateConflg(std::map<infoType, std::string>&)

Before this function is called, the calling function should not replace the manufacturer and model entries if get functions return null string from VendorModel package. This function updates the device information database of the current record in the DeviceODBC. This function is most efficient when the getConfig below is called initially. First, this function checks if IP address is same at the DeviceODBC. If IP address fields are not the same, the record with correct IP address is obtained from the database. Then, the other fields are copied and the record is updated.

bool getConfig(std::map<infoType, std::string>&)

This function obtains the map from ODBC for the device information in the given format. The function returns true if there is data returned, false if there is no more data.

bool saveStatus(std::map<infoType, std::string>&)

This function saves the status information into the ODBC. The function returns true when saving is successful, false otherwise.

void setIPAddress(std::string &)

This function sets the IP address of the device to be contacted. This function is common for VendorModel and HTTP_HTML packages.

bool getVendor(std::string &)

This function gets the manufacturer at the IP address. If the manufacturer is obtained, the function returns true. If the error is detected in the process, the function returns false with null strings. The function is common for VendorModel and HTTP_HTML packages.

bool getModel(std::string &)

This function gets the model of the device. If the model is obtained, the function returns true. If the error is detected in the process, the function returns false with null string. The function is common for VendorModel and HTTP_HTML packages.

bool getUniqueID(std::string & out_sID)

This function returns the unique ID of the device. If the Unique ID is obtained, the function returns true. If the error is detected in the process, the function returns false with null string. The function is common for VendorModel and HTTP_HTML packages.

bool getVendorModelID(int & out_nID)

This function returns the VendorModel ID of the device. If the ID is obtained, the function returns true. If the error is detected in the process, the function returns false. This function is common for VendorModel and HTTP_HTML packages.

CDevice*createDevice(std::string & in_sIP, CHTTP_HTML & in_HTTP_HTML, int & in_nVendorModelID, std::string & in_sUniqueID)

This function creates the device of the specification in the Device Factory. The function returns the pointer to the created device if the creation is successful, 0 otherwise.

bool getStatus(std::map<infoType, std::string>&)

This function obtains status information from a device. The function returns true when the status is returned, false when status could not be obtained. This function is common for Device and HTTP_HTML packages.

void setIPAddressAndID(std::string & in_sIP, int in_nID)

This function sets the IP address and Vendor Model ID.

bool getVendorInfo(std::string & out_sVendor, std::string & out_sWebPage, CKeyValueInfo & out_KeyValueInfo)

This function outputs the string of Vendor name, the web page to obtain the model information from the vendor, CKeyValueInfo structure for model. The function returns true if the data is obtained, false with null strings and null data if no more data is available. When false is returned, the data pointer is reset to the top of the data.

bool getVendorModelInfo(std::string & out_sVendor, std:: string & out_sModel, int & out_nID, std::string & out_sWebPage, CKeyValueInfo & out_KeyValueInfo)

This function outputs the strings of vendor name, model name, the vendor model ID, the web page to obtain the unique ID, and CKeyValueInfo structure for Unique ID. The function returns true if the data is obtained, false with null strings and null data if no more data is available. When false is returned, the data pointer is reset to the top of the data.

void setVendorModelID(int in_nID)

This function sets the VendorModelID value to be used by SupportInfoODBC to get the web page information.

bool getWebPageInfo(std::string & out_sWebPage, CKeyValueInfo & out_KeyValueInfo)

This function outputs the web page and CKeyValueInfo structure for the Vendor Model ID set by the previous function. The function returns true if the information is returned, false with null information if no more data is available. If false is returned, the data pointer is reset to the top of the current Vendor Model ID set. The returned information is stored in the map structure of HTTP_HTML package.

Figure 12:
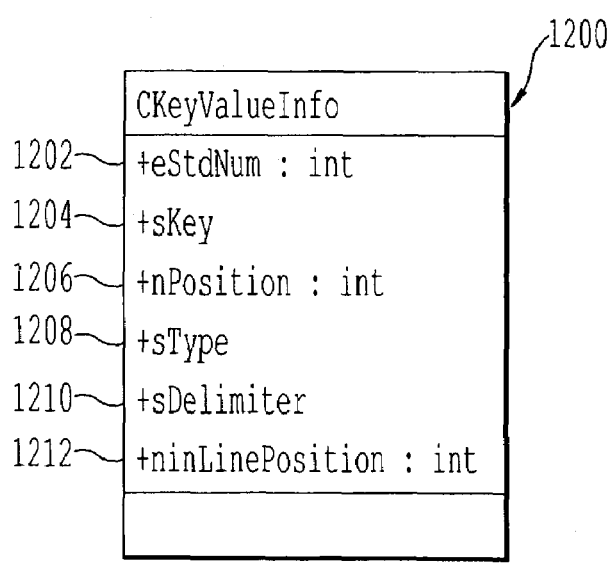
FIG. 12 shows a data structure used by HTTP_HTML submodule and SupportInfoODBC sub-module as illustrated in FIG. 11 of the present invention.

FIG. 12 shows the data structure used by HTTP_HTML sub-module 1112 and SupportInfoODBC sub-module 1114 as illustrated in FIG. 11 to exchange information for retrieval of values associated with key values received by the HTTP_HTML sub-module 1112. Typically, a multitude of vendors use vendor specific identifier and nomenclature to identify key information, displayed on their respective web pages, related to a monitored device. For example, to determine the number of pages printed by a printer device, Hewlett Packard uses "Page Count" feature while Xerox identifies the same using a "Total Sheet Delivered" feature. A feature of the present invention is to overcome the vendor-to-vendor variances and thereby providing a standardized and uniform method of identifying device specific information and extracting the value corresponding to the information by using a data structure/CKeyValueInfo structure 1200 as illustrated in FIG. 12.

The CKeyValueInfo is typically a data structure created to identify value information from information that is received from a monitored device in the form of a data string or a key string. The CKeyValueInfo includes a plurality of fields, each field represented by information illustrated in FIG. 12. The CKeyValueInfo structure 1200 includes an sKey field 1204 that represents a string key, an nPosition field 1206 which is preferably a tag based value in HTML format indicating as to the number of positions in the string where a value information could be located. For example, the Page Count of a printer device, subject to monitoring, may be found at a second position following a key word. sType 1208 represents the type of information one can retrieve from a displayed web page of a monitored device.

When the value, such as, for example, model name of the monitored device, is found within the same data line of the key (Product Name), the nPosition field is "0". sDelimiter 1210 indicates a specific delimiter used to extract the value associated with the key. The CKeyValueInfo indicates how to extract the value information from information received from a monitored device in an HTML format.

FIG. 13 shows the sequence of the init function to describe the calling sequence of Monitor module 1006 as illustrated in FIG. 10. MonitorManager 1102 obtains information about a monitored device and uses IP address assigned to the monitored device to communicate with the monitored device. MonitorManager 1102 accesses DeviceODBC 1104 to obtain configuration information about the monitored device. The configuration information returned to the MonitorManager 1102 includes, for example, an IP address of the monitored device, vendor/manufacturer and model information of the monitored device. Once IP address is obtained, the MonitorManager 1102 sets the IP address to obtain device specific information from the monitored device. The HTTP_HTML 1112 is used to obtain to obtain Vendor, Model, Unique ID, and VendorModel ID from the monitored device.

Once the vendor, model information and unique ID are obtained, the MonitorManager 1102 updates a database with information received from the monitored device. Further, the MonitorManager 1102 creates a software device object through the DeviceFactory 1106. Each device model from a vendor/manufacturer may be assigned a unique identifier, and it is preferred to represent the model from the vendor using the identifier for enhanced efficiencies, as an identifier typically requires no more than 4 bytes.

The methodology of extracting value information such as vendor, model and unique ID from the monitored device is obtained from SupportInfo ODBC 1114 in the form illustrated in FIG. 12. In addition, a specific webpage needs to be accessed is governed by the information residing in the SupportODBC 1114. Once IP address, Vendor Model ID and unique ID are obtained, a software object of the monitored device is created using a DeviceFactory module 1106. Once the software object is created, information in the DeviceODBC is updated so that the vendor, model, and unique ID are set to DeviceODBC database that stores status information of each monitored device. The updates are performed by updateConfig function 1109 by the MonitorManager 1102.

FIG. 14 illustrates an exemplary map data structure 1400 used by HTTP_HTML Package 1112 to retrieve status information of devices that are periodically monitored. The map structure or data structure 1400 is a part of the standard template of C++. However, other languages can have the similar data structure where key and value information is placed into a table-like structure. The first level 1402 of the map structure 1400 includes a Key that is associated with another map structure 1404 where the key from the first level 1402 is associated with a value. The second level map 1404 includes the Web page identified at field 1406 as the key and a vector of CKeyValueInfo as the value identified at field 1408.

The data structure used by the MonitorManager 1102 is identified as below. This data structure reflects the information regarding one monitored device. The data structure contains the e-mail address of the contact person in addition to the telephone number. The following table shows the DeviceInfo structure.

TABLE 1

| Type | Name | Description |
| --- | --- | --- |
| std::string | m_sManufacturer | A string representing the manufacturer of the network printer. |
| std::string | m_sModel | A string representing the model of the network printer. |
| std::string | m_sUniqueID | A string representing the Unique ID of the network printer. This ID may be a serial number or MAC Address or any unique ID obtainable from the network printer. |
| std::string | m_sIPAddress | A string representing the IP address of the network printer. |
| std::string | m_sCompanyName | A string representing the name of the company which owns the network printer. |
| std::string | m_sStreet | A string representing the street address of the company. |
| std::string | m_sCity | A string representing the city where the company is located. |
| std::string | m_sState | A string representing the state where the company is located. |
| std::string | m_sZipCode | A string representing the zip code of the company. |
| std::string | m_sLocation | A string representing the location of the network printer within the company. |
| std::string | m_sContactPerson | A string representing the name of the contact person responsible for the network printer. |
| std::string | m_sPhoneNumber | A string representing the phone number of the contact person. |
| std::string | m_sEMailAddress | A string representing the e-mail address of the contact person. |

FIG. 15 shows a vector 1500 of the reference to the devices created by DeviceFactory 1106 and used by the MonitorManager 1102 as illustrated in FIG. 13 of the present invention. MonitorManager 1102 stores device pointers 1502, 1504 created by DeviceFactory 1106 in the vector so that it can iterate over to obtain the status of a monitored device. Polling of monitored devices is performed over the device object by issuing a getStatus command. Once the status of each of the software objects is obtained, such status is updated through the DeviceODBC 1104.

Figure 16:
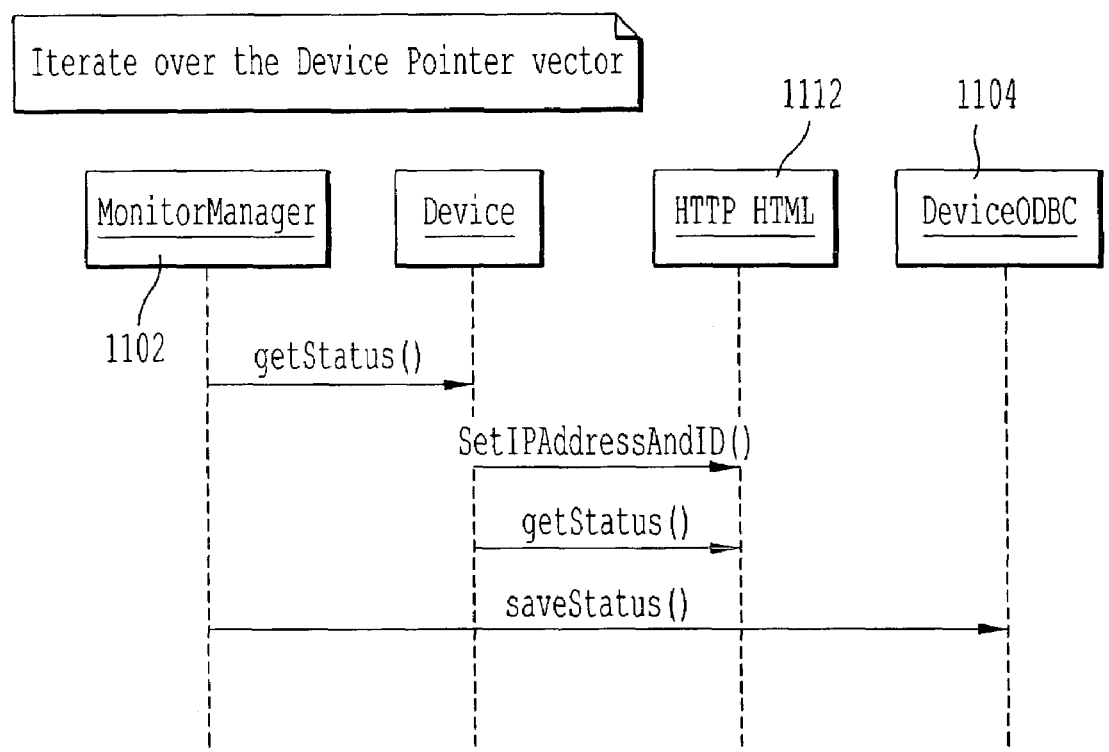
FIG. 16 shows a sequence of the monitorStatus function as illustrated in FIG. 10.

FIG. 16 shows the sequence of the monitorStatus function as illustrated in FIG. 10. MonitorManager 1102 obtains the status of the software device object connected with the physical device through HTTP_HTML 1112 and stores the received status in a database through the DeviceODBC 1104 by the MonitorManager 1102. This process is repeated over all the monitored devices stored in the vector shown in FIG. 15.

Figure 17A:
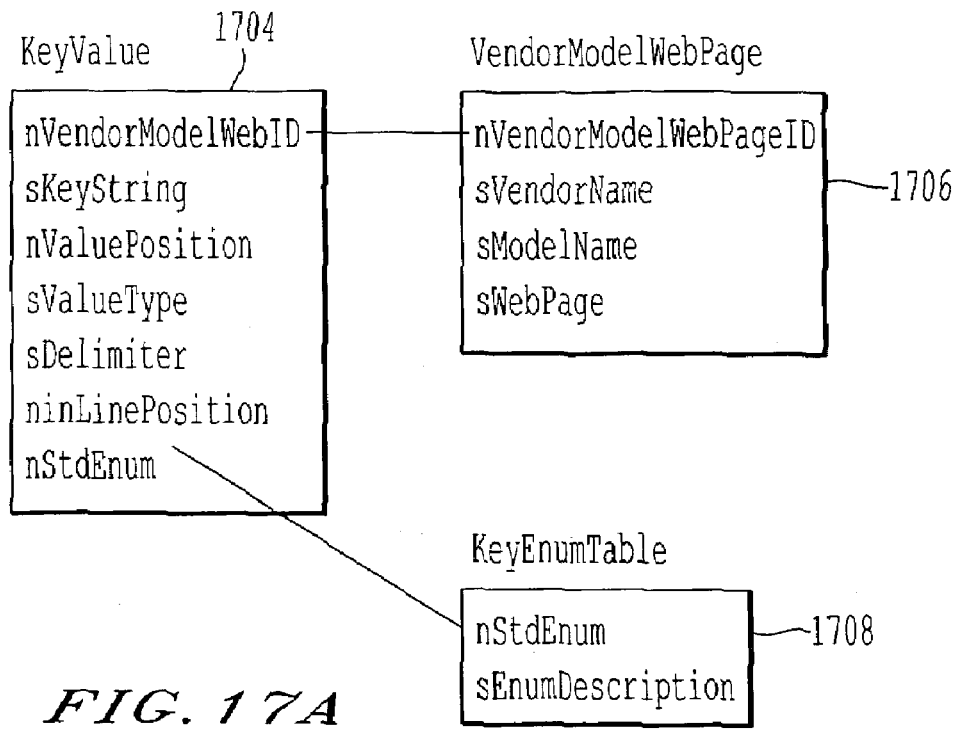
Figure 17B:
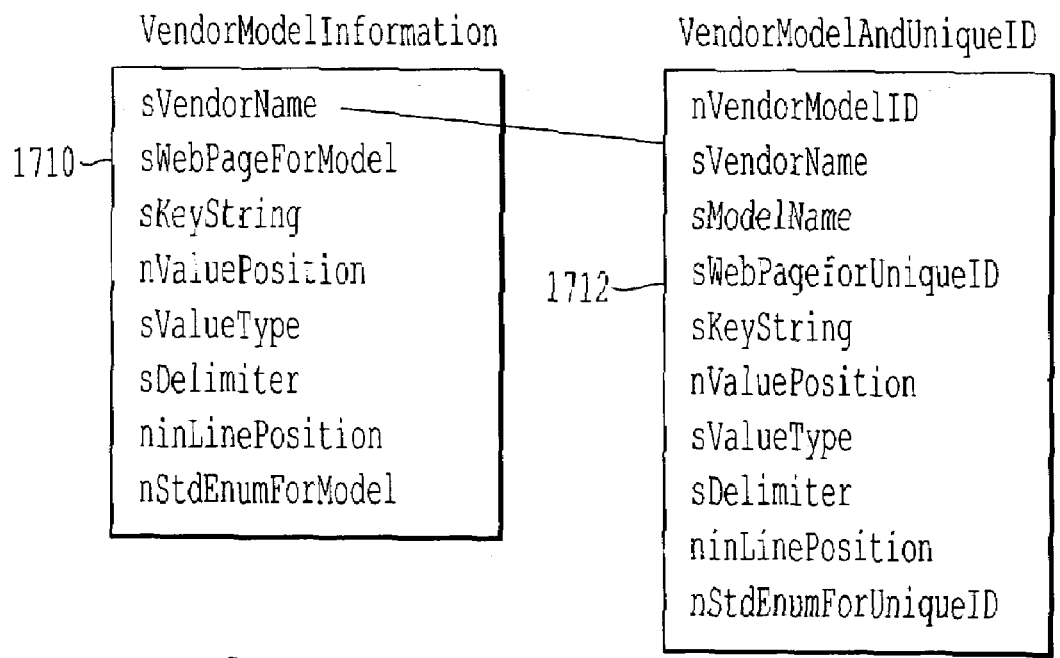

FIGS. 17A-17B illustrate a table structure to support information collection through the HTTP_HTML module 1112 (FIG. 11). The tables illustrated in FIGS. 17A-B are preferably stored in a database which communicates with the monitoring system 902 (FIG. 9) through SupportInfoODBC 1114. Specifically, FIG. 17A shows four tables along with respective database fields. KeyValue table 1704 includes such information as, for example, the web page ID, key string information used to extract the parameter value of interest, value position in the HTML structure, value type, delimiters if the value is located in the same data as the key string, nInLinePosition of the value when the value is located in the same data as the key string, and the standard enumerator for the key string.

VendorModelWebPage table 1706 associates the web page ID to actual web page string. KeyEnumTable 1708 includes the standard enumerations and their description. VendorModelInformation table 1710 includes vendor related information for a monitored device, and VendorModelUniqueID table 1712 includes information that is used to obtain the unique ID from the device.

FIG. 17C shows exemplary data stored within the three tables illustrated in FIGS. 17A-B. IP Address table 1702 is an example of a particular network environment associating the devices with IP addresses. In this example, the first four digits of the web ID is taken from the first four digits of the vendor model ID. In the KeyValue table 1704, Model (101) identified at 1710 and 1712 has two different key strings, "Machine Model" and "Product Name". In addition, the Machine Model and Product Name are located at the different value positions. Machine Model is obtained from the next tagged data in the HTML while Product Name is obtained from the same line. Product Name is separated from the actual model name with a delimiter ':'. Exemplary enum types used by the present invention include the following. The enum types are merely exemplary and therefore should not be construed as limiting the present invention.

infoType (typedef int infoType)

This section describes the definition of the infoType (int). The value range 0 through 99 is assigned to the data type. The value range 100 to 499 is assigned to Device Information. The value range 500 to 1999 is assigned to the common parameters including standard MIB parameters. The range 2000 to 3999 is assigned to Ricoh specific information. The range 4000 to 4999 is assigned to Xerox. The range 5000 to 5999 is assigned to Lexmark. The range 6000 to 6999 is assigned to HP. The values are defined as follows:

infoType{eNotDefine=0, eDeviceInformation=1, eStatusInformation=2, eManufacturer=100, eModel, eUniqueID, eIPAddress, eCompanyName, eStreet, eCity, eState, eZipCode, eLocation, eContactPerson, ePhoneNumber, eEMailAddress, eDateTime=500, eHrDeviceErrors, eLowPaper, eNoPaper, eLowToner, eNoToner, eDoorOpen, eJammed, eOffline, eServiceRequested, ePrtGeneralConfigChanges=600, ePrtLifeCount, ePrtAlertDesc1, ePrtAlertDesc2, ePrtAlertDesc3, ePrtAlertDesc4, ePrtAlertDesc5, eBlack=700, eMagenta, eCyan, eYellow, eTonerCollector-800, eBlackDeveloper=810, eColorDeveloper, eFuser=820, eDrum=830, eTransfer=840, eMaintenanceKit=850, eOilKit=860, eStationInfo1=901, eStationInfo2, eStationInfo3, eStationInfo4, eStationInfo5};

ErrorCode

Figure 18:
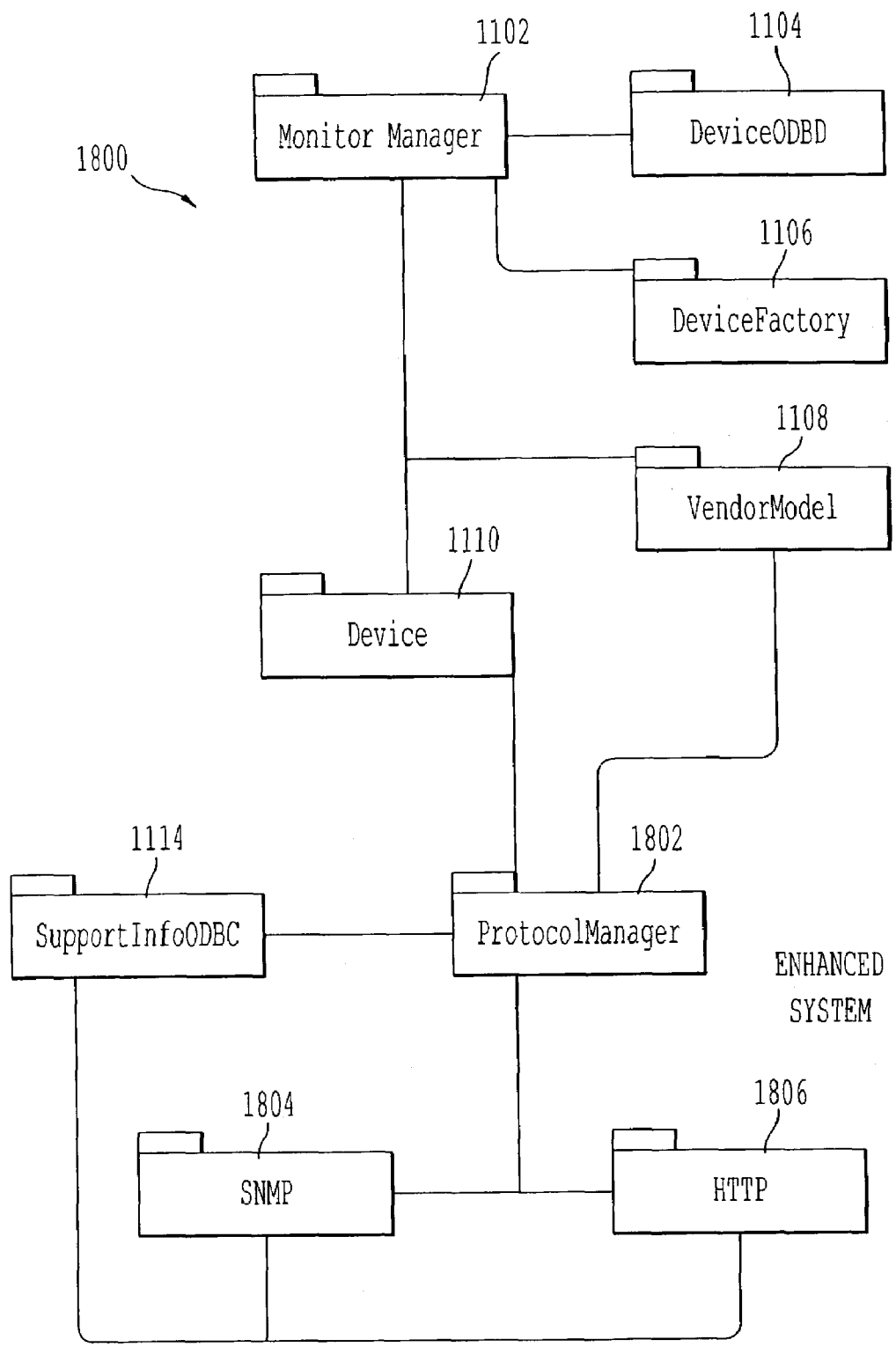
FIG. 18 shows another embodiment of the present invention where multiple protocols are used to collect information from a plurality of monitored devices.

This section describes the error codes defined at this writing. As the project progresses, more error codes can be added. The range 0-99 is reserved. The range 100-199 is for SMTP, 200-299 is for POP3, 300-399 is for Socket, and 400-499 is for HTTP. The other range shall be defined if needed.

enum EerrorCode(eNoError=0, eUnknownError=1, eSendHeloCommandFailed=100, eSendMailCommandFailed, eSendRcptCommandFailed, eSendDataCommandFailed, eSendDataFailed, eSendQuitCommandFailed, eSendUserCommandFailed=200, eSendPassCommandFailed, eSendStatCommandFailed, eSendRetrCommandFailed, eSendDeleCommandFailed, eSendQuitPop3CommandFailed, eCreateSocketFailed=300, eConnectSocketFailed, eBadRequest-400, eUnauthorized, ePaymentRequired, eForbidden, eNotFound, eMethodNotAllowed, eNotAcceptable, eProxyAuthenticationRequired, eRequestTimeOut, eConflict, eGone, eLengthRequired, ePreconditionFailed, eRequestEntityTooLarge, eRequestURITooLarge, eUnsupportedMediaType, eRequestedRangeNotSatisfiable, eExpectationFailed, eInternalServerError=450, eNotImplemented, eBadGateway, eServiceUnavailable, eGatewayTimeOut, eHTTPVersionNotSupported, eMultipleChoices=480, eMovedPermanently, eFound, eSeeOther, eNotModified, eUseProxy, eTemporaryRedirect);

FIG. 18 shows the extension of the current system where multiple protocols are used to collect information from a plurality of monitored devices. An example of such extension is to use both SNMP 1804 and HTTP 1806 protocols to collect the status information of the monitored devices. Multiple protocols allow the monitoring station to collect wider range of the data. In addition, multiple protocols allow more devices to be monitored. For example, some devices may support only one protocol. A protocol manager 1802 performs a selection process to select a protocol, among a given plurality of protocols, that is better configured to retrieve information from the monitored device. For example, to retrieve paper jam status, it was determined that an SNMP protocol would be better suited over HTTP protocol for some vendor's devices. For known devices, such preferences are predetermined and stored in a database, such as SupportInfoODBC 1114. The protocol manager 1802 consults the SupportInfoODBC 1114 to identify the predetermined preferences and appropriately selects the protocol to communicate with a monitored device.

In another embodiment, more than one protocol is used to retrieve information from a monitored device. For example, an HTTP_HTML protocol is first selected to access a monitored device, and device information that is configured to be efficiently retrieved using the HTTP_HTML protocol is obtained. Subsequently, an SNMP protocol is selected to obtain information that was incapable of efficient retrieval using the HTTP_HTML protocol. The selection of protocols is performed by the protocol manager in conjunction with support information stored in the SupportInfoODBC 1114.

Figure 19:
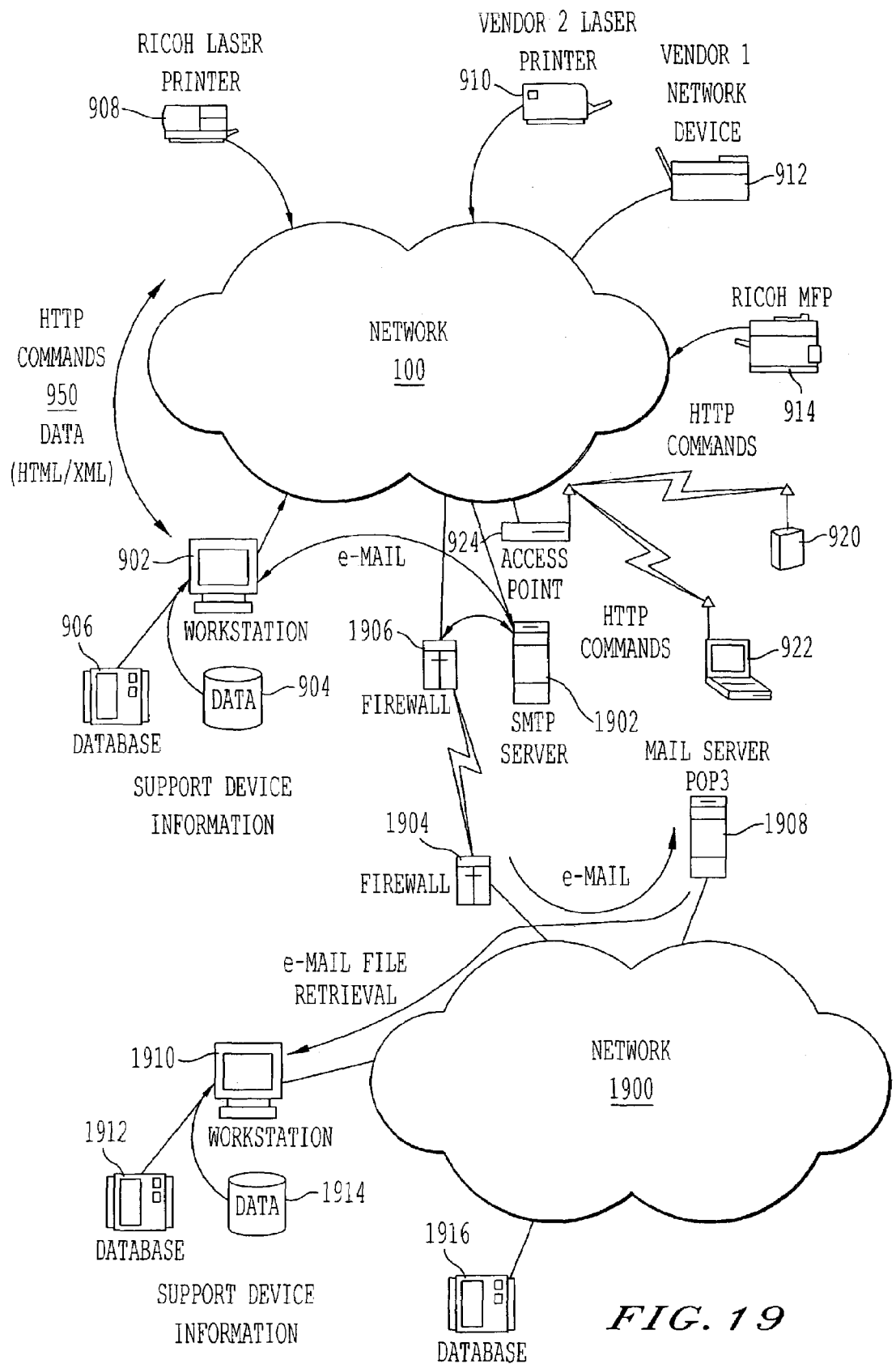
FIG. 19 shows a schematic for e-mailing information about monitored devices to a desired party.

FIG. 19 shows a schematic for e-mailing information about the monitored devices to a desired party. After obtaining the necessary information, the workstation 902 uses the Simple Mail Transfer Protocol (SMTP) Server 1902 to send out the necessary information to the central monitoring workstation 1910 through the Mail Server 1908 that supports the Post Office Protocol Version 3 (POP3) (IETF Networking Group Request For Comments [RFC]: 1939). The workstation 902 uses SMTP (SMTP is defined in IETF RFC 821) and possibly Multipurpose Internet Mail Extensions (MIME) to send e-mails. The workstation 902 generates the mail message that is at and above the Application Layer of the TCP/IP model or the ISO seven-layer model. Alternatively, the workstation 902 may include an SMTP processor to send out the necessary information using e-mail. When e-mail is sent out from the SMTP Server 1902, the e-mail goes through the firewall 1906.

When the e-mails that contain the monitoring information of devices arrive at the firewall 1904 of the network receiving the information, the mail is routed to the Mail Server 1908 with POP3. The central monitoring workstation 1910 periodically accesses the Mail Server 1908 to obtain the arrived e-mail, parse the mail and its contents via POP3 and stores the necessary information in the database 1912. The database 1912 includes additional information related to the characteristics and history of a monitored device. The central monitoring workstation 1910 is capable of performing the analysis of obtained data in order to take the necessary actions. Alternatively, the central monitoring workstation 1910 may contain a mail receiving capability, and the firewall 1904 may route the e-mail directly to the central monitoring workstation 1910.

Figure 20:
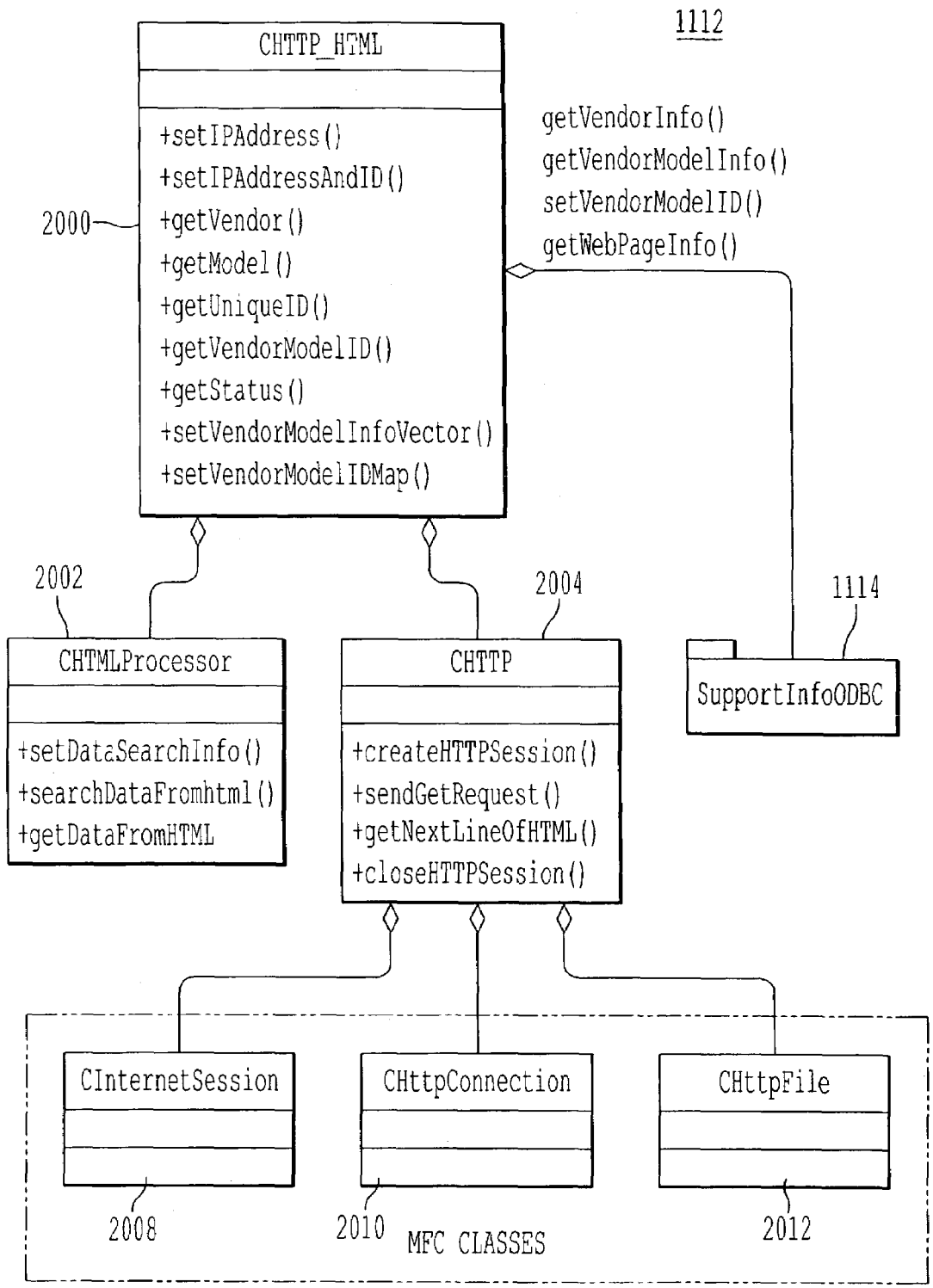
FIG. 20 shows a class diagram for the HTTP_HTML package as shown in FIG. 11.

FIG. 20 shows the class diagram for the HTTP_HTML (1112) package as shown in FIG. 11. The HTTP_HTML (1112) package is responsible for determining the vendor, the model, the unique ID, and the vendor model ID of a device, such as, for example, the network printer 908 (FIG. 9) that is being monitored using the Hypertext Transfer Protocol (HTTP). Once this information is obtained for the network printer, package 1112 is used to obtain the status information from the network printer using HTTP. The CHTTP_HTML (2000) class is the interface for package 1112 to obtain information about the network printer by accessing a web server of the network printer using HTTP. CHTTP_HTML (2000) manages the other classes in the package 1112 to perform this task. The CHTTP (2004) class implements the HTTP protocol. CHTTP (2004) creates an HTTP session with the network printer to obtain information from the web pages of its web server. CHTTP (2002) uses the classes CInternetSession (2008), CHttpConnection (2010), and CHttpFile (2012) of the Microsoft Foundation Class library (MFC) to implement the HTTP protocol. The CHTMLProcessor (2002) class processes the HTML files obtained from the network printers and obtains the desired information from the HTML files. The CHTTP_HTML (2000) class uses the SupportInfoODBC (1114) package to obtain information about the vendors and models of network printers supported by the monitoring system. Although the description in this specification refers to network printers, the system is applicable to any network device such as, for example, copiers, scanners, and fax machines.

The CHTTP_HTML (2000) class determines if a network printer is supported by the system. If the network printer is supported, then CHTTP_HTML (2000) creates an HTTP session with the network printer to obtain information from the network printer's web pages. The public and private functions of CHTTP_HTML (2000) are shown in Table 1. The attributes of CHTTP_HTML (2000) that are used by these functions are shown in Table 2.

TABLE 1

Public and Private Functions of CHTTP_HTML

| | Function Name | Description |
| --- | --- | --- |
| Public | CHTTP_HTML( ) | Constructor |
| | ~CHTTP_HTML( ) | Destructor |
| | bool setIPAddress(std::string& in_sIP) | Sets the IP address of the device to be contacted via HTTP. Creates an HTTP session with the device to determine the vendor, model, vendor model ID and unique ID. |
| | bool setIPAddressAndID(std::string& in_sIP, int in_nID) | Sets the IP address and vendor model ID of the device for which the status information will be obtained. |
| | bool getVendor(std::string& out_sVendor) | Returns the vendor of the device |
| | bool getModel(std::string& out_sModel) | Returns the model of the device |
| | bool getUniqueID(std::string & out_sUniqueID) | Returns the unique identifier of the device |
| | bool getVendorModelID(int& out_nID) | Returns the vendor model ID of the device |
| | bool getStatus(std::map<infoType, std::string>& out_StatusInfo) | Returns the status information of the device. |
| Private | void setVendorModelInfo Vector( ) | Obtains information from the support database to initialize the vector m_VendorModelInfoVector. |
| | void setVendorModelIDMap( ) | Obtains information from the support database to initialize the map m_VendorModelIDMap. |
| | void obtainVendor( ) | Obtains the vendor name for the device |
| | void obtainModel( ) | Obtains the model name for the device |
| | void obtainVendorModelID( ) | Obtains the vendor model ID for the device |
| | void obtainUniqueID( ) | Obtains the unique identifier for the device |
| | void converToAllUpper(std::string& inOut_sString) | Converts the input string to all upper case |

TABLE 2

Attributes of CHTTP_HTML

| Type | Attribute Name | Description |
| --- | --- | --- |
| std::vector<CVendorModelInfo> | m_VendorModelInfoVector | This attribute member is used to determine what vendors are supported by the system. This attribute member also contains information used to obtain model information of the device. It is initialized in setVendorModelInfoVector( ). |
| std::map<std::string, map<std::string, | m_VendorModelIDMap | This attribute member determines what models are supported by the system. This attribute member also |

TABLE 2-continued

Attributes of CHTTP_HTML

| Type | Attribute Name | Description |
| --- | --- | --- |
| CVendorModelID> > | | contains the vendor model ID of the device and information used to obtain the unique ID for a given model of the device. The key for the outer map is the vendor name. The key for the inner map is the model name. It is initialized in setVendorModelIDMap( ). |
| std::map<int, map<std::string, std::vector <CKeyValueInfo> > > | m_VendorModelMap | This attribute member contains information used to obtain the status of the devices that are periodically monitored. |
| std::string | m_sIPAddress | This attribute member represents the IP address of the device in the current HTTP session. |
| std::string | m_sVendor | This attribute member represents the vendor of the device in the current HTTP session. |
| std::string | m_sModel | This attribute member represents the model of the device in the current HTTP session. |
| std::string | m_sUniqueID | This attribute member represents the unique identifier of the device in the current HTTP session. |
| Int | m_nVendorModelID | This attribute member represents the vendor model ID of the device in the current HTTP session. |
| CKeyValueInfo | m_KeyValueInfoForModel | This attribute member is used to obtain the model of the device from the HTML file. |
| CVendorModelID | m_VendorModelID | This attribute member is used to obtain the vendor model ID and the unique ID of the device from the HTML file. |
| CHTTP | m_HTTP | This attribute member is used to obtain an HTTP session with a device. |
| CHTMLProcessor | m_HTMLProcessor | This attribute member processes the HTML file to obtain the desired information. |

The CHTMLProcessor (2002) class parses lines of the HTML file to obtain specific information about the network printer 908 (FIG. 9). The public and private functions of CHTMLProcessor (2002) are shown in Table 3. The attributes of CHTMLProcessor (2002) that are used by these functions are shown in Table 4.

TABLE 3

Public and Private Function of CHTMLProcessor

| | Function Name | Description |
| --- | --- | --- |
| Public | CHTMLProcessor( ) | Constructor |
| | ~CHTMLProcessor( ) | Destructor |
| | void setDataSearchInfo(std::vector<CKeyValueInfo>& in_KeyValueVector) | Sets the data to be obtained from the HTML file |
| | bool searchDataFromHTML(std::string& in_sLineOfHTML) | Searches through the HTML file to obtain the desired status information |
| | void getDataFromHTML(std::map<infoType, std::string>& out_Status) | Get the status information obtained from the device's HTML file |
| Private | bool obtainValueFromCurrentLine(std::string& out_sData, CLocateValueInfo& inOut_LocateValueInfo, CKeyValueInfo& in_KeyValueInfo, std::string& in_sInputLine) | Obtain the status information from the current line |
| | bool obtainValueFromNextLine(std::string& out_sData CLocateValueInfo& inOut_LocateValueInfo, CKeyValueInfo& in_KeyValueInfo, std::string& in_sInputLine) | Obtain status information from the lines following the line where the key of the status information was found |
| | void obtainDataVector(std::vector<std::string>& out_DataVector, std::string& in_sInputString) | Obtain the data elements from a line of the HTML file |
| | bool getValueFromString(std::string& out_sValue, std::string& in_sInputLine, CKeyValueInfo& in_KeyValueInfo) | Obtain the status information from the input string |
| | void removeLineBreaksFromLine(std::string& inOut_sInputLine) | Removes line breaks from the input string |
| | void removeLinksFromLine(std::string& inOut_sInputLine) | Removes link tags from the input string |
| | void getLeadingCharacters(std::string& out_sValue, std::string& inOut_sInputLine) | Obtains leading characters from the input string |
| | void removeLeadingEndTags(std::string& inOut_sInputLine) | Removes leading end tags from the input string |
| | void removeLeadingStartTags(std::string& inOut_sInputLine) | Removes leading end tags from the input string |
| | void removeLeadingWhiteSpaces(std::string& inOut_sInputLine) | Removes leading white spaces from the input string |
| | void removeTrailingWhiteSpaces(std::string& inOut_sInputLine) | Removes trailing white spaces from the input string |

TABLE 3-continued

Public and Private Function of CHTMLProcessor

| Function Name | Description |
|---|---|
| Void changeNBSPToSpace(std::string& inOut_sInputLine) | Replaces non-breaking spaces with a space in the input string |

TABLE 4

Attributes of CHTMLProcessor

| Type | Attribute Name | Description |
|---|---|---|
| std::string | m_sInputLines | This attribute member contains the lines of the HTML file. |
| std::string | m_sPreviousInputLines | This attribute member contains the lines inputted previously from the HTML file. |
| std::vector<CKeyValueInfo> | m_KeyValueVector | This attribute member contains information used to obtain the status information from the HTML file. |
| std::vector<CLocateValueInfo> | m_LocateValueVector | This attribute member contains information used to locate the value of the status information from the HTML file once the key is found. |
| EHTMLState | m_CurrentHTMLState | This attribute member represents the HTML state at the end of the current input line. |
| EHTMLState | m_PreviousHTMLState | This attribute member represents the HTML state at the end of the previous input line. |
| std::vector<std::string> | m_DataVector | This attribute member contains the data values obtained from a line of the HTML file. |
| Bool | m_bIsDataVectorObtained | This attribute member is a flag to determine if the data values were obtained from a line of the HMTL files. This function is set to false in the constructor and searchDataFromHTML( ) and set to true in obtainValueFromNextLine( ). |
| std::map<infoType, std::string> | m_StatusInfo | This attribute member represents the status information obtained from the device's HTML file. |

Figure 21:
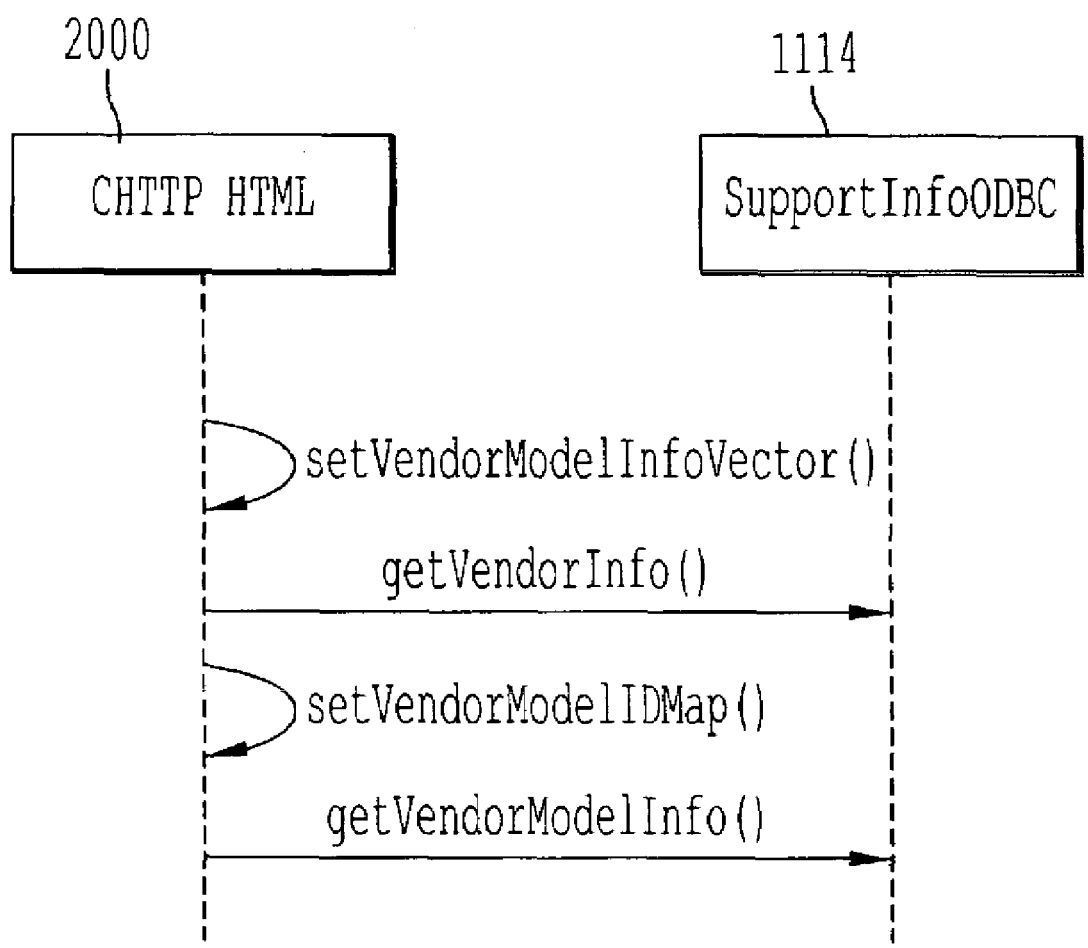
FIG. 21 shows a sequence diagram for executing the init( ) function of CHTTP_HTML as shown in FIG. 20.
Figure 22:
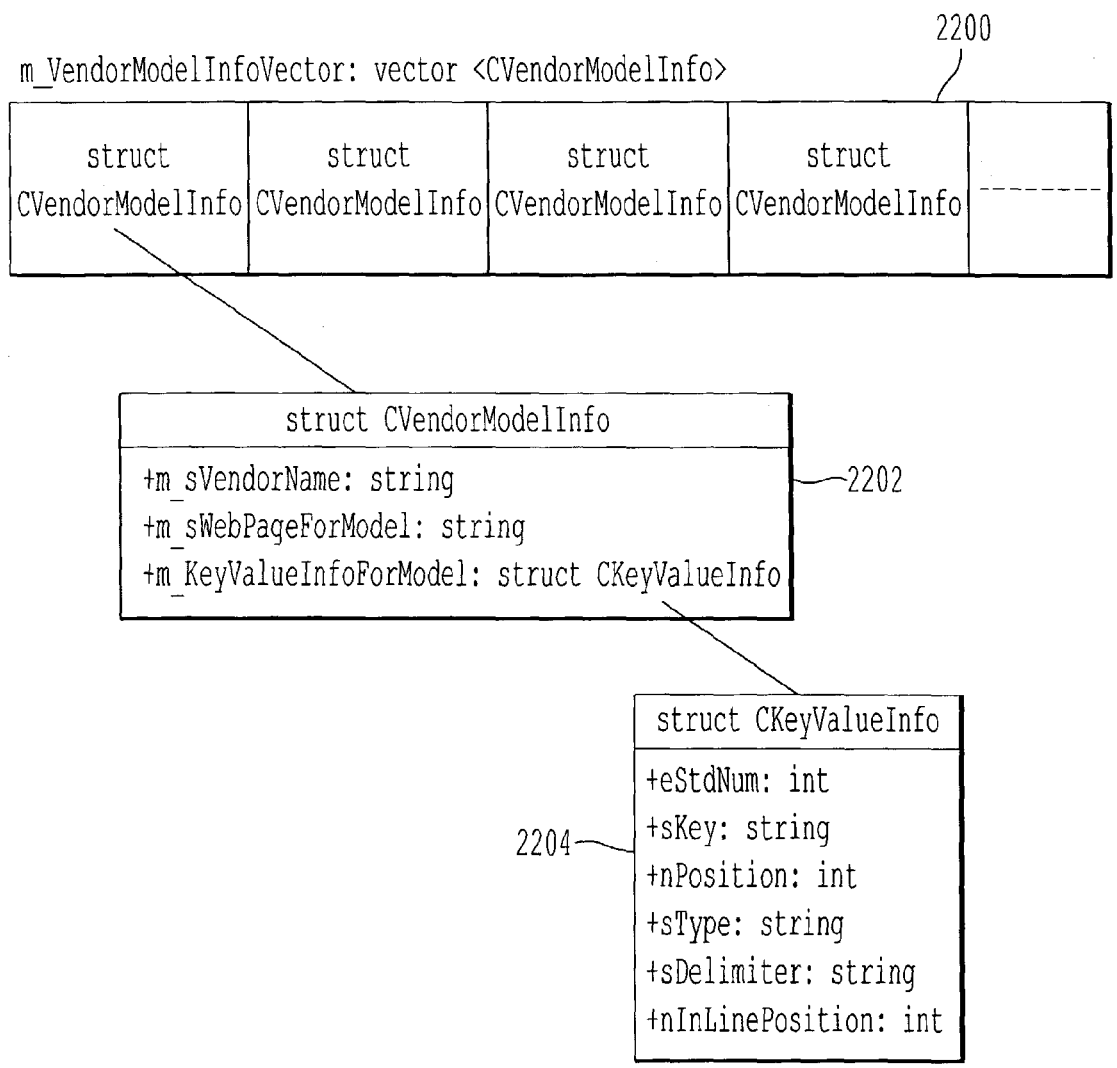
FIG. 22 shows a vector used by the class CHTTP_HTML as shown in FIG. 20.
Figure 23:
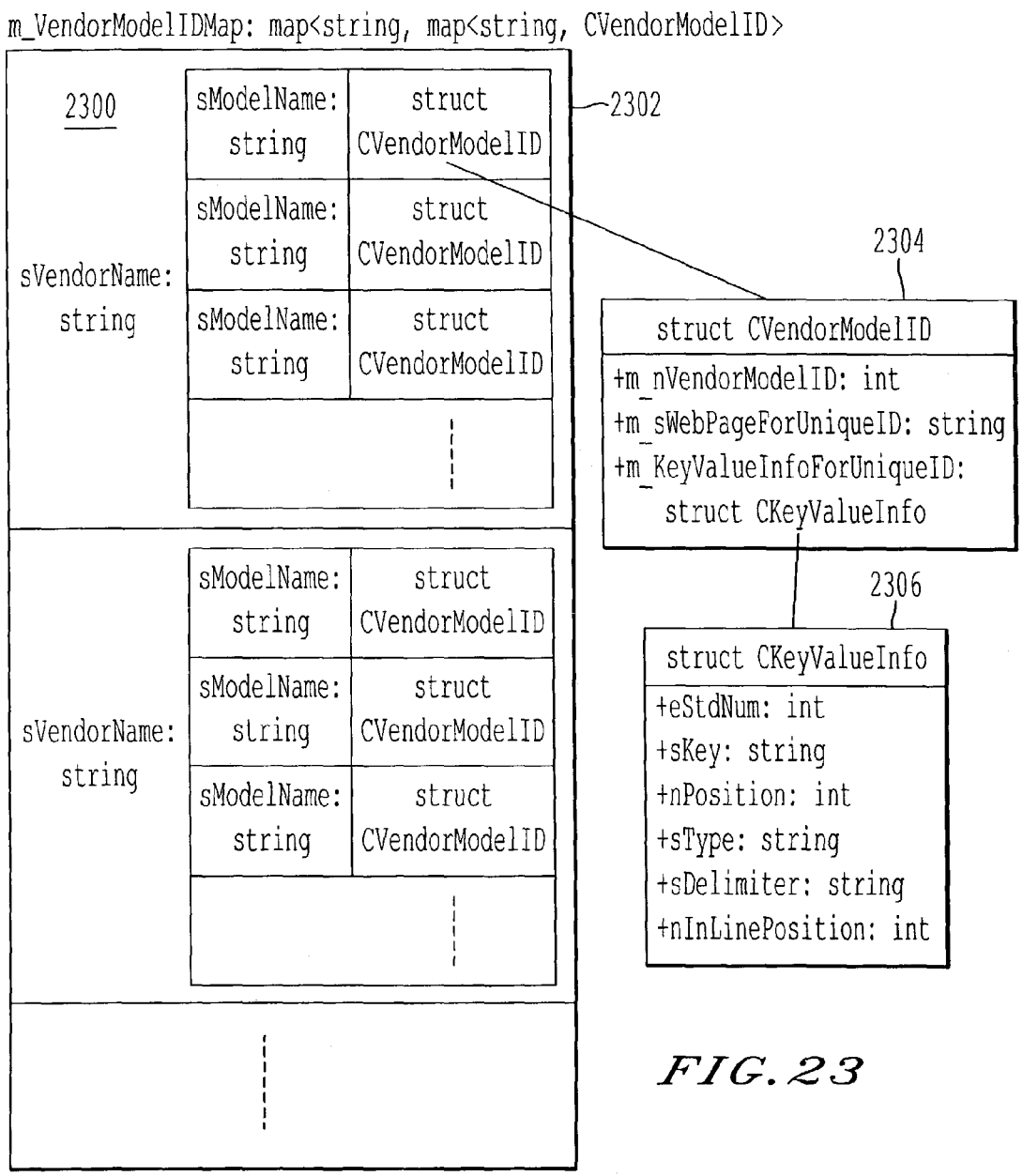
FIG. 23 shows a map used by the class CHTTP_HTML as shown in FIG. 20 to store information about a vendor, model, vendor model ID, and information used to obtain a unique identifier of a monitored device from its web page.

FIG. 21 shows the sequence diagram for executing the init( ) function of CHTTP_HTML (2000). init( ) obtains and maintains information about the vendors and models of network printers supported by the system. init( ) calls the functions setVendorModelInfoVector( ) and setVendorModelID-Map( ) of CHTTP_HTML (2000) to obtain and maintain this information. setVendorModelInfoVector( ) obtains and maintains information about the vendors of network printers supported by the system and information used to obtain the model of the network printers from its web pages.

setVendorModelInfoVector( ) calls getVendorInfo( ) of SupportInfoODBC (1114) to obtain this information from the database. setVendorModelInfoVector( ) stores the information in the vector as shown in FIG. 22. getVendorInfo( ) of SupportInfoODBC (1114) is called multiple times to obtain all the vendors supported by the system. setVendorModelID-Map( ) obtains and maintains information about the vendors, models, vendor model IDs, and information used to obtain the unique identifier of the network printers from its web pages.

setVendorModelIDMap( ) calls getVendorModelInfo( ) of SupportInfoODBC (1114) to obtain this information from the database. setVendorModelIDMap( ) stores the information in the map as shown in FIG. 23. getVendorModelInfo( ) of CSupportInfoODBC (2102) is called multiple times to obtain all the models supported by the system. By storing the information about the vendors and models of the network printers supported by the system, the need to periodically open and close the database to determine if a network printer is supported is prevented. The database is opened and closed once for obtaining all the information about the vendors and models supported by the system. By checking the information stored in the system's own structure, the system can determine if a particular network printer is supported.

FIG. 22 shows the vector, m_VendorModelInfoVector (2200), used by the class CHTTP_HTML (2000) to store information about vendors of the network printers supported by the system, and information used to obtain the model of the network printers from its web pages. m_VendorModelInfoVector (2200) includes the struct CVendorModelInfo (2202). The struct CVendorModelInfo (2202) includes a string for the name of the vendor of the network printer, a string for the web page of the network printer where the name of the model can be found, and a struct CKeyValueInfo (2204) that contains information used to obtain the name of the model from the web page. The struct CKeyValueInfo (2204) is described in FIG. 12. As the system uses an entry from the vector, m_VendorModelInfoVector (2200), the system will try to access the web page corresponding to the struct CVendorModelInfo (2202). If the system is able to access the web page, then the vendor of the network printer is determined to be the vendor name in the struct CVendorModelInfo (2202).

The model name of the network printer is obtained from the web page using the information in the struct CKeyValueInfo (2204) of the struct CVendorModelInfo (2202). If the model name is obtained from the web page, it preferably would be checked with the map m_VendorModelIDMap described below at FIG. 23 to determine if the model is supported. If the system cannot access the web page or if the model name cannot be obtained from the web page, the system will go to the next elements in the vector until the vendor can be determined and the model name can be obtained. If the system goes through the entire vector without determining the vendor and obtaining the model name, then it is determined that the network printer is not supported by the system. The vector may have multiple entries having the same vendor name. This is possible since the vendor may have different families of network printers in which each family has a different web page where the model name can be found. Also, the vendor may have different network devices (i.e. scanners, fax machines) in which each network device has a different web page where the model name can be found.

FIG. 23 shows a map, m_VendorModelIDMap (2300), used by the class CHTTP_HTML (2000) to store information about the vendor, model, vendor model ID, and information used to obtain the unique identifier of the network printers from its web pages. The key of m_VendorModelIDMap (2300) is a string that represents the name of the vendor. The value of m_VendorModelIDMap (2300) is another map (2302) structure. The key of the map (2302) is a string that represents the name of the model. The value of the map (2302) is the struct CVendorModelID (2304). The struct CVendorModelID (2304) includes an integer for the vendor model ID, a string for the web page of the network printer where the unique identifier can be found, and a struct CKeyValueInfo (2306) that includes information used to obtain the unique identifier from the web page. Further details of the struct CKeyValueInfo (2306) are described in FIG. 12. The system uses this map after the vendor name and the model name has been obtained using the information in the vector m_VendorModelInfoVector as described above. The vendor name will be used as the key to obtain the map (2302) from m_VendorModelIDMap (2300). The model name will be used as the key to obtain the struct CVendorModelID (2304) from the map (2302). The vendor model ID associated with the network printer is obtained from the m_nVendorModelID member of struct CVendorModelID (2304). The system accesses the web page of the network printer corresponding to the m_sWebPageForUniqueID member of the struct CVendorModelID (2304). If the system can successfully access the web page, then the unique ID of the network printer is obtained from the web page using the information in the struct CKeyValueInfo (2306) of the struct CVendorModelInfo (2304). If the system cannot access the web page or the unique ID cannot be obtained from the web page, a unique ID will be generated for the network printer using a random number generator. If the model name cannot be found as a key in the map (2302), then it is determined that the model is not supported by the system.

The vector m_VendorModelInfoVector (2200) and the map m_VendorModelIDMap (2300) are the internal structures of the system used to represent the information in the database. The vector m_VendorModelInfoVector (2200) represents the VendorModelInformation table of the support database and the map m_VendorModelIDMap (2300) represents the VendorModelAndUniqueIDs table of the support database. By storing the information from the support database in these internal structures, the system will be more efficient since it does not need to access the database periodically to obtain the desired information.

Figure 24:
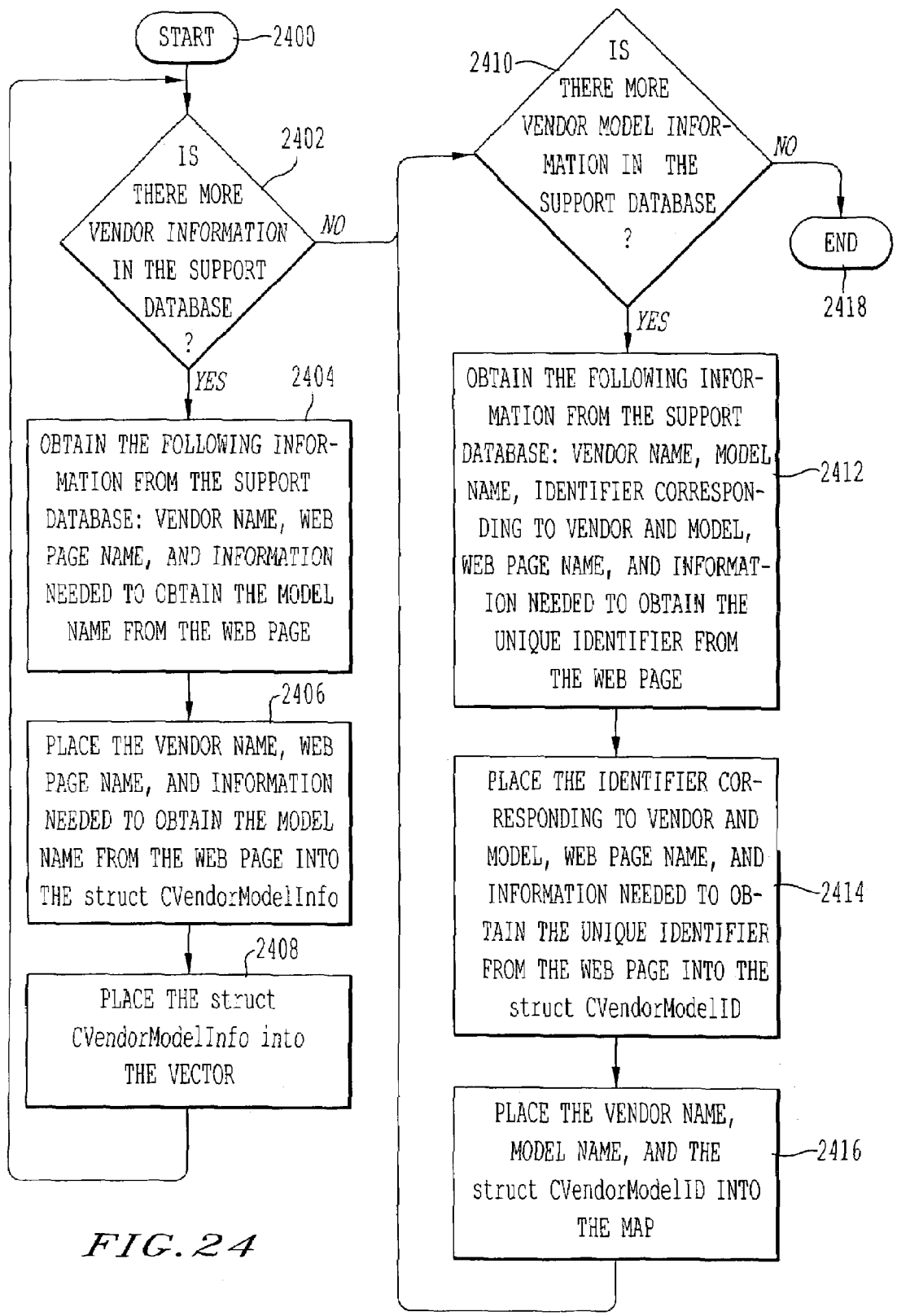
FIG. 24 shows a flow chart for executing the init( ) function of CHTTP_HTML as shown in FIG. 20.

FIG. 24 shows the flowchart for executing the init( ) function of CHTTP_HTML. In step 2402, the system determines if there is any more vendor information in the support database. If there is more information, then in step 2404, the vendor name, the web page where the model name is located, and information used to obtain the model name from the web page are obtained. This information is stored in the struct CVendorModelInfo (2202) in step 2406 and then pushed into the vector (2200), as shown in FIG. 22, in step 2408. Then the system goes back to step 2402 to see if there is more vendor information in the support database. If there is no more vendor information in the support database, then the system executes step 2410 to determine if there is any more vendor model information in the support database. If there is more vendor model information, then in step 2412, the vendor name, the model name, the vendor model ID, the web page where the unique identifier is located, and information used to obtain the unique identifier from the web page are obtained. The vendor model ID, the web page where the unique identifier is located, and information used to obtain the unique identifier from the web page are stored in the struct CVendorModelID in step 2414. The model name and the struct CVendorModelID are added to the map (2302) as shown in FIG. 23, and the vendor name and the map (2302) are added to the map m_VendorModelIDMap (2300), as shown in FIG. 23, in step 2416. Then the system goes back to step 2410 to determine if there is more vendor model information in the support database. If there is no more vendor information in the support database, the init( ) function is completed.

Figure 25:
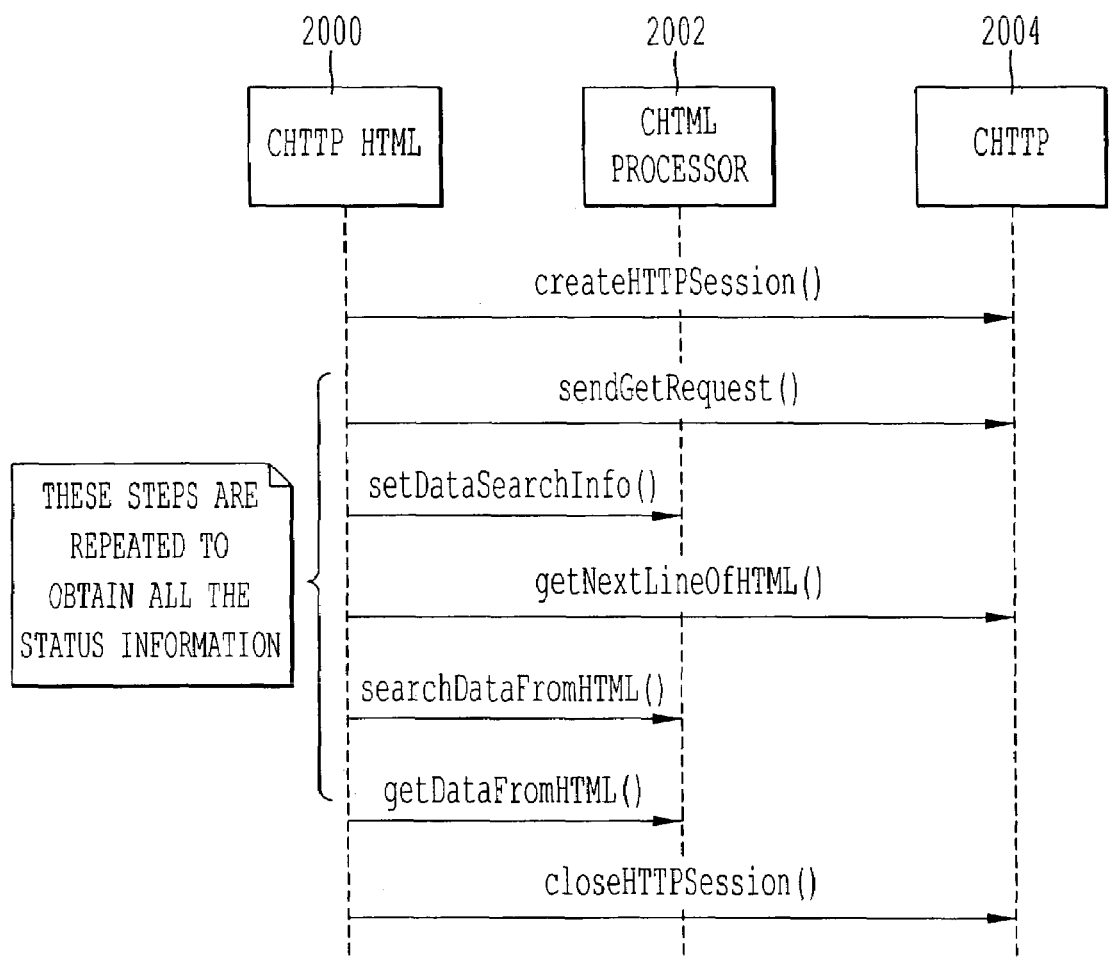
FIG. 25 shows a sequence diagram for executing the getStatus( ) function of CHTTP_HTML as shown in FIG. 20.

FIG. 25 shows the sequence diagram for executing the getStatus( ) function of CHTTP_HTML (2000). This function obtains the status information from the web pages of the network printers. The status information obtained depends upon the vendor and model of the network printer so that the type of status information obtained from one network printer may differ from that of another network printer. CHTTP_HTML contains a map (1400) structure as shown in FIG. 14 that contains information about what status information to obtain from the network printer of a specific vendor and model. The map (1400) contains information about how to obtain the status information from the web pages of the network printer. CHTTP_HTML (2000) creates an HTTP session with the network printer by calling createHTTPSession( ) of CHTTP (2004). Once the HTTP session is created, an HTTP GET request is sent to the network printer to access a web page when CHTTP_HTML (2000) calls sendGetRequest( ) of CHTTP (2004). If the GET request is successful, CHTTP_HTML (2000) calls setDataSearchInfo( ) of CHTMLProcessor (2002) to provide CHTMLProcessor (2002) with information about how to obtain the status information from the web page of the network printer. CHTTP_HTML (2000) calls getNextLineOfHTML( )of CHTTP (2004) to obtain a line from the web page of the network printer. CHTTP_HTML (2000) passes this line of the web page into the function searchDataFromHTML( ) of CHTMLProcessor (2002).

CHTMLProcessor (2002) will obtain any status information from this line if it exists. CHTTP_HTML (2000) will continue to call getNextLineOfHTML( ) of CHTTP (2004) followed by searchDataFromHTML( )of CHTMLProcessor (2002) until the end of the web page is reached or all the status information is obtained from the web page. CHTTP_HTML (2000) will call getDataFromHTML( ) of CHTMLProcessor (2002) to get the status information obtained from the web page. Since the status information of a network printer may exist on multiple web pages, the call sequence from sendGetRequest( ) of CHTTP (2004) to getDataFromHTML( ) of CHTMLProcessor (2002) is repeated for each web page of the network printer that contains status information. After all the status information is obtained, CHTTP_HTML (2000) calls closeHTTPSession( ) of CHTTP (2004) to close the HTTP session with the network printer.

Figure 26A:
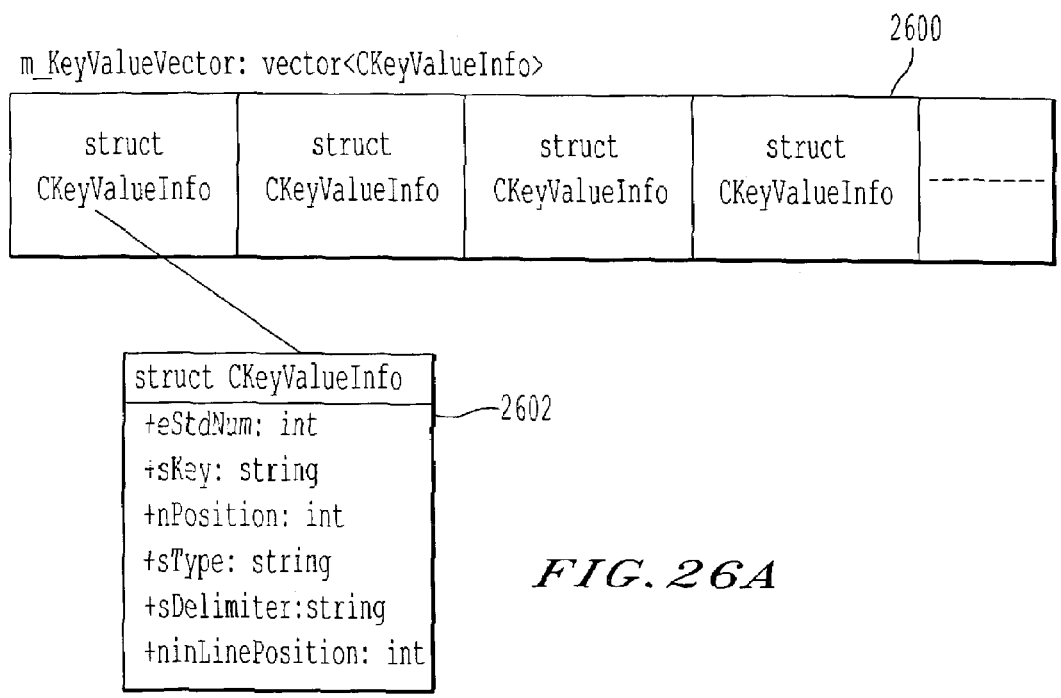
FIG. 26 shows vectors used by the class CHTMLProcessor as shown in FIG. 20 to obtain information from a web page of a monitored device.
Figure 26B:
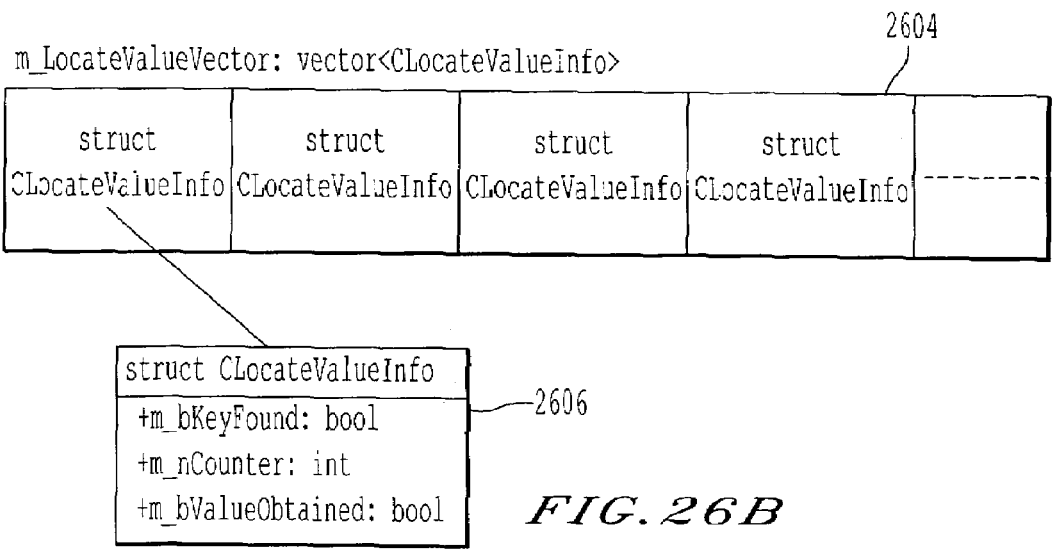

FIG. 26 shows the vectors m_KeyValueVector (2600) and m_LocateValueVector (2604) used by the class CHTMLProcessor to obtain information from the web page of a network printer. The vector, m_KeyValueVector (2600), contains the struct CKeyValueInfo (2602). The struct CKeyValueInfo (2602) contains information used to locate and obtain information from the web page of the network printer. The struct CKeyValueInfo (2602) is described in greater detail in FIG. 12. The sKey member of struct CKeyValueInfo (2602) is used to locate the key for the information on the web page. The nPosition, sDelimiter, and nInLinePosition members of struct CKeyValueInfo (2602) are used to locate and obtain the value of the information on the web page. nPosition, sDelimiter, and nInLinePosition give the location of the value of the information with respect to sKey on the web page. The vector, m_LocateValueVector (2604), contains the struct CLocateValueInfo (2606). The struct CLocateValueInfo (2606) contains information about the state of finding the information on the web page. The m_bKeyFound of the struct CLocateValueInfo (2606) determines whether the key has been found. The m_bValueObtained of the struct CLocateValueInfo (2606) determines whether the value has been obtained. The m_nCounter of the struct CLocateValueInfo (2606) is used to determine the current data location with respect to the key in searching for the value of the information. There is a one to one correspondence between the two vectors. Thus, a struct CKeyValueInfo in m_KeyValueVector (2600) corresponds to a struct CLocateValueInfo in m_LocateValueVector (2604). Both vectors have the same number of elements. The vectors are used together to obtain information about the network printer from its web page.

Figure 27A:
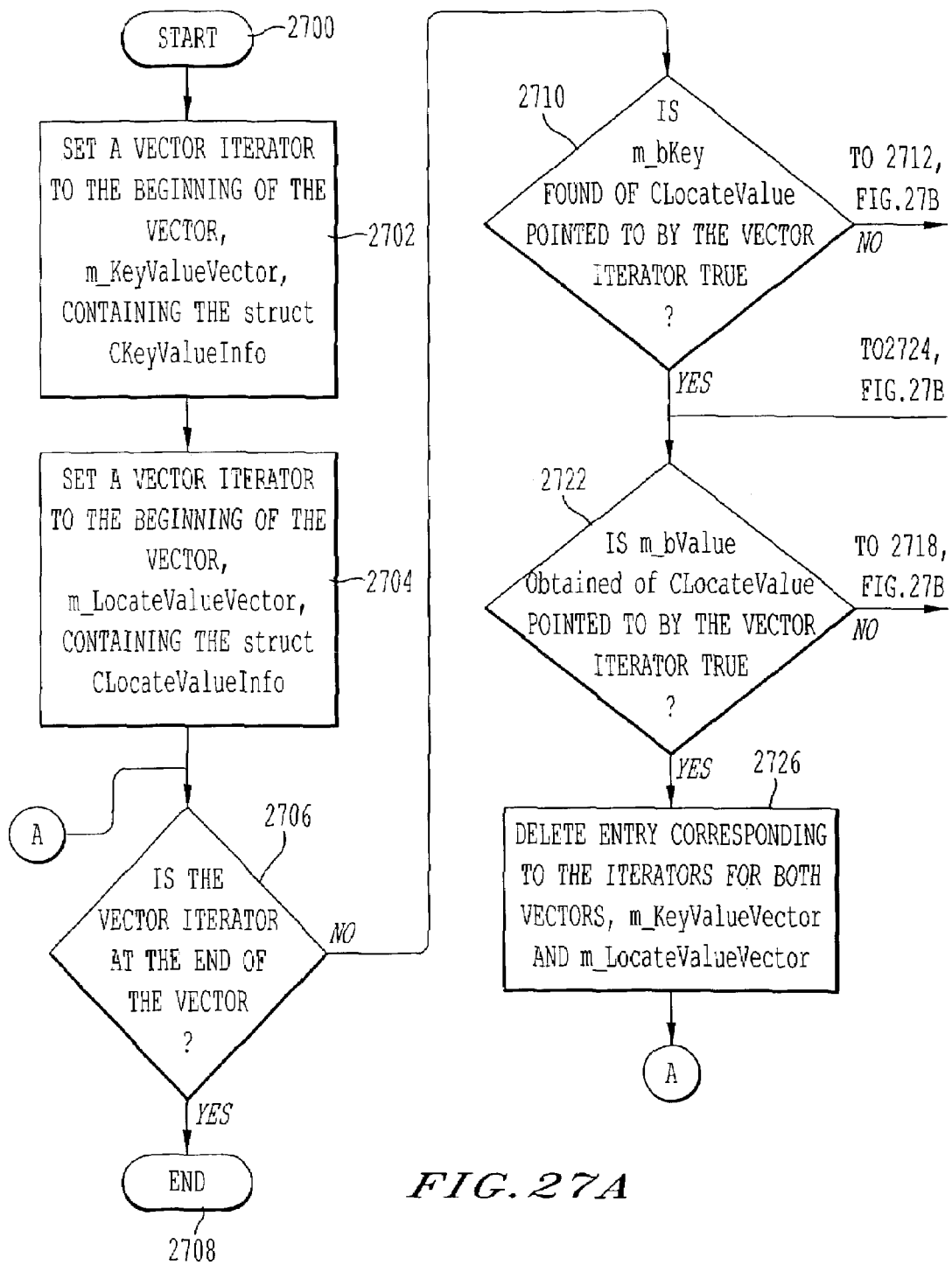
FIG. 27 shows a flow chart for executing the searchDataFromHTML( ) function of CHTMLProcessor as shown in FIG. 20.
Figure 27B:
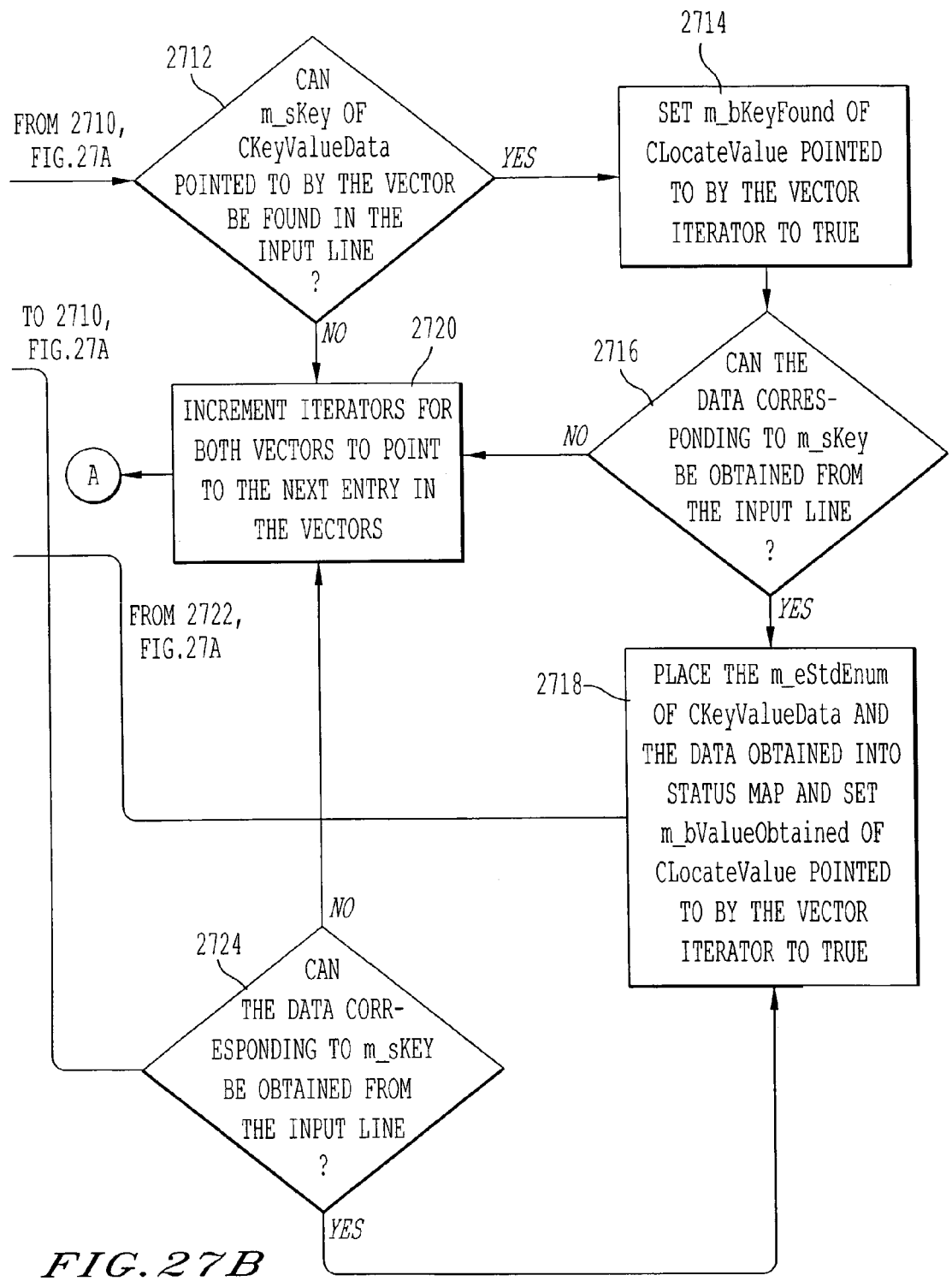

FIG. 27 shows a flowchart for executing the searchDataFromHTML( ) function of CHTMLProcessor 2002 (FIG. 20). A line from the web page of a network printer is passed into this function. Each line is searched for the keys and values of the information desired of the network printer. In steps 2702 and 2704, vector iterators corresponding to the vectors m_KeyValueVector and m_LocateValueVector are set to the beginning of the vectors. A vector iterator points to an element in a vector. In step 2706, one of the vector iterators is checked to see it is at the end of the vector. Since both vectors are of the same size, only one vector iterator need probably be checked. If the vector iterator is at the end of the vector, then the searchDataFromHTML( ) function is done in step 2708.

In step 2710, the m_bKeyFound member of CLocateValueInfo pointed to by the vector iterator for m_LocateValueVector is checked to determine if it is true. m_bKeyFound member of CLocateValueInfo determines if the sKey member of CKeyValueInfo pointed to by the vector iterator for m_KeyValueVector has been found in a previous line of the web page. If m_bKeyFound is not true, then step 2712 is performed. In step 2712, the sKey member of CKeyValueInfo pointed to by the vector iterator for m_KeyValueVector is checked to determine if sKey exists in the line of the web page passed into the function. If sKey is not found in the line of the web page, then in step 2720, the vector iterators for m_KeyValueVector and m_LocateValueVector are incremented to point to the next element in the vectors and the system goes on to perform step 2706.

If sKey is found in the line of the web page in step 2712, then in step 2714, the m_bKeyFound member of CLocateValueInfo pointed to by the vector iterator for m_LocateValueVector is set to be true. Next, the nPosition, sDelimiter, and nInLinePosition members of CKeyValueInfo pointed to by the vector iterator for m_KeyValueVector are used to obtain the value corresponding to sKey from the line of the web page in step 2716. If the value cannot be obtained from the current line of the web page, the m_nCounter of CLocateValueInfo is updated. m_nCounter keeps track of the data position from sKey in the web page, and subsequently the vector iterators for m_KeyValueVector and m_LocateValueVector are incremented to point to the next element in the vectors as identified in step 2720. If the value is obtained from the line of the web page, then in step 2718, the eStdEnum member of CKeyValueInfo corresponding to sKey and the value obtained are added to the map that contains all the information about the network printer. Also, m_bValueObtained member of CLocateValueInfo is set to be true prior to performing step 2722.

If the m_bKeyFound member of CLocateValueInfo pointed to by the vector iterator for m_LocateValueVector is true in step 2710, then step 2722 is performed. The m_bValueObtained member of CLocateValueInfo pointed to by the vector iterator for m_LocateValueVector is checked to see if it is true in step 2722. m_bValueObtained member of CLocateValueInfo indicates if the value corresponding to sKey of CKeyValueInfo has been obtained from the line of the web page. If m_bValueObtained of CLocateValueInfo is false, then step 2724 is performed. The nPosition, sDelimiter, and nInLinePosition members of CKeyValueInfo and m_nCounter of CLocateValueInfo are used to obtain the value corresponding to sKey from the line of the web page in step 2724. If the value corresponding to sKey cannot be obtained from the line of the web page, the m_nCounter of CLocateValueInfo is updated and step 2720 is processed next. However, if the value corresponding to sKey can be obtained, then step 2718 is processed next. Steps 2720 and 2718 are described above and therefore will not be repeated herein.

If the m_bValueObtained member of CLocateValueInfo in step 2722 is true, then the elements corresponding to the iterators are removed from m_KeyValueVector and m_LocateValueVector in step 2726 and subsequently step 2706 is performed.

As described above, the use of the two vectors to obtain the information allows all the data to be searched for in each line of the web page rather than searching the entire web page one data at a time. This eliminates the need to read the same web page from the network printer for each information that needs to be obtained from the web page.

FIG. 28 shows an exemplary schematic of the two vectors m_KeyValueVector (2800) and m_LocateValueVector (2802) and lines from a web page (2804) of a network printer. The lines of the web page (2804) are read in one line at a time from the network printer. The data elements that can be obtained from the lines are indicated in bold face. It will be appreciated that the information in the HTML tags of the web page do not contain the desired information about the network printers. It is the data elements from where the key and value of the information are to be obtained. For each line of the web page, each of the elements of the vectors m_KeyValueVector (2800) and m_LocateValueVector (2802) are used by the system to determine the key and value information. For the first line of the web page in this example, if m_bKeyFound for the first element in m_LocateValueVector (2802) is false, then the system searches for the string sKey of the first element in m_KeyValueVector (2800) in the first line. That is, the system will search for "Black" in the first line. Whether the system finds "Black" in the first line or not, the system goes to the next element in m_KeyValueVector (2800) and m_LocateValueVector (2802) and repeats the same steps for the next elements. All the elements in the vectors m_KeyValueVector (2800) and m_LocateValueVector (2802) would be checked to determine if sKey member of the struct CKeyValueInfo can be found in the first line.

In the exemplary schematic of FIG. 28, it is not until line 3 of the web page (2804) that sKey, "Black" of the first element of m_KeyValueVector (2800) is found. Since sKey has been found, m_bKeyFound of the first element of m_LocateValueVector (2802) is set to true. The system then tries to obtain the value corresponding to sKey using nposition, sDelimiter, and nInLinePosition of the first element of m_KeyValueVector (2800). nPosition is 2 for the first element of m_KeyValueVector (2800). This means that the value of the information is 2 data elements away from sKey, "Black". m_nCounter of the first element of m_LocateValueVector (2802) keeps track of the number of data elements encountered. Since there are no data elements after "Black", m_nCounter remains 0. The remaining two elements of the vectors are checked to see if the keys can be found. In line 4, since m_bKeyFound of the first element of m_LocateValueVector (2802) is true, the data elements are searched for in the line. Since no data elements are found, m_nCounter of the first element of m_LocateValueVector (2802) remains 0. Again the remaining two elements of the vectors are checked to see if the keys can be found.

One would note that, it is not until line 6 of the web page (2804) of FIG. 28 that another data element " " is found. m_nCounter of the first element of m_LocateValueVector (2802) is incremented to 1. Since nposition is 2 for the first element of m_KeyValueVector (2800), the value of the information is not been reached. Again the remaining two elements of the vectors are checked to see if the keys can be found. In line 7 of the web page (2804) another data element "100%" is found. m_nCounter of the first element of m_LocateValueVector (2802) is incremented to 2. Since nPosition is 2 for the first element of m_KeyValueVector (2800), the value of the information is reached. With a value of "%" for sDelimiter and 0 for nInLinePosition for the first element of m_KeyValueVector (2800), the value corresponds to the string before "%". Thus, the value of the information is 100. Since the value of the information is obtained, the first element in each vector are removed from the vector leaving only two elements. The remaining two elements of the vectors are checked to see if the keys can be found. This process is repeated for each line of the web page (2804) until all the values for the information can be found. Using the two vectors allow all the information to be searched in each line of the web page irrespective of the vector containing one or more element.

Figure 29:
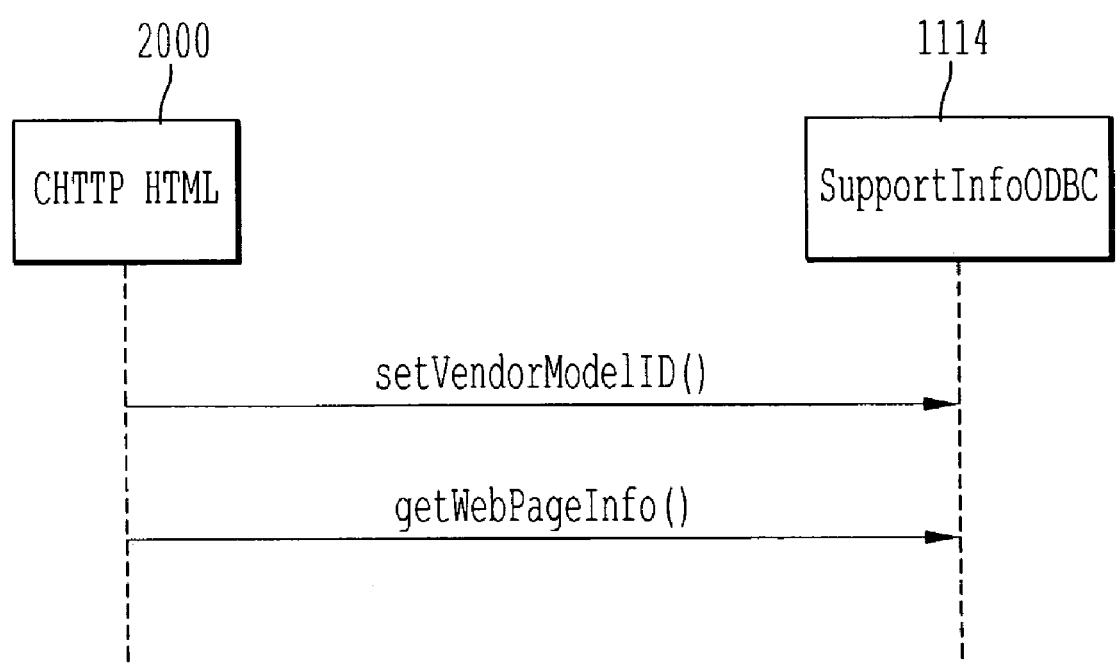
FIG. 29 shows a sequence diagram for executing the getVendorModelID( ) function of CHTTP_HTML as shown in FIG. 20.

FIG. 29 shows a sequence diagram for executing the getVendorModelID( ) of CHTTP_HTML (2000). This function returns the vendor model ID of the network printer. This function also populates the map structure m_VendorModelMap of CHTTP_HTML (2000) as described in FIG. 15. The map structure contains all the network printers that will be monitored for its status information. This map structure provides information about the web pages of an accessed network printer and information about what to extract from those web pages. CHTTP_HTML (2000) calls setVendorModelID( ) of SupportInfoODBC (1114) package. This function sets up the SupportInfoODBC (1114) package to access information only related to a specific vendor and model of the network printer. CHTTP_HTML (2000) calls getWebPageInfo( ) of SupportInfoODBC (1114) package. This function returns the web page and a vector of CKeyValueInfo. The CKeyValueInfo provides information needed to extract status information from the web page. The web page and vector of CKeyValueInfo are placed into the map structure m_VendorModelMap. CHTTP_HTML (2000) calls getWebPageInfo( ) of SupportInfoODBC (1114) package multiple times until it returns false, in order to obtain all the information used to extract the status information from the web pages of a specific vendor and model of the network printer.

Figure 30:
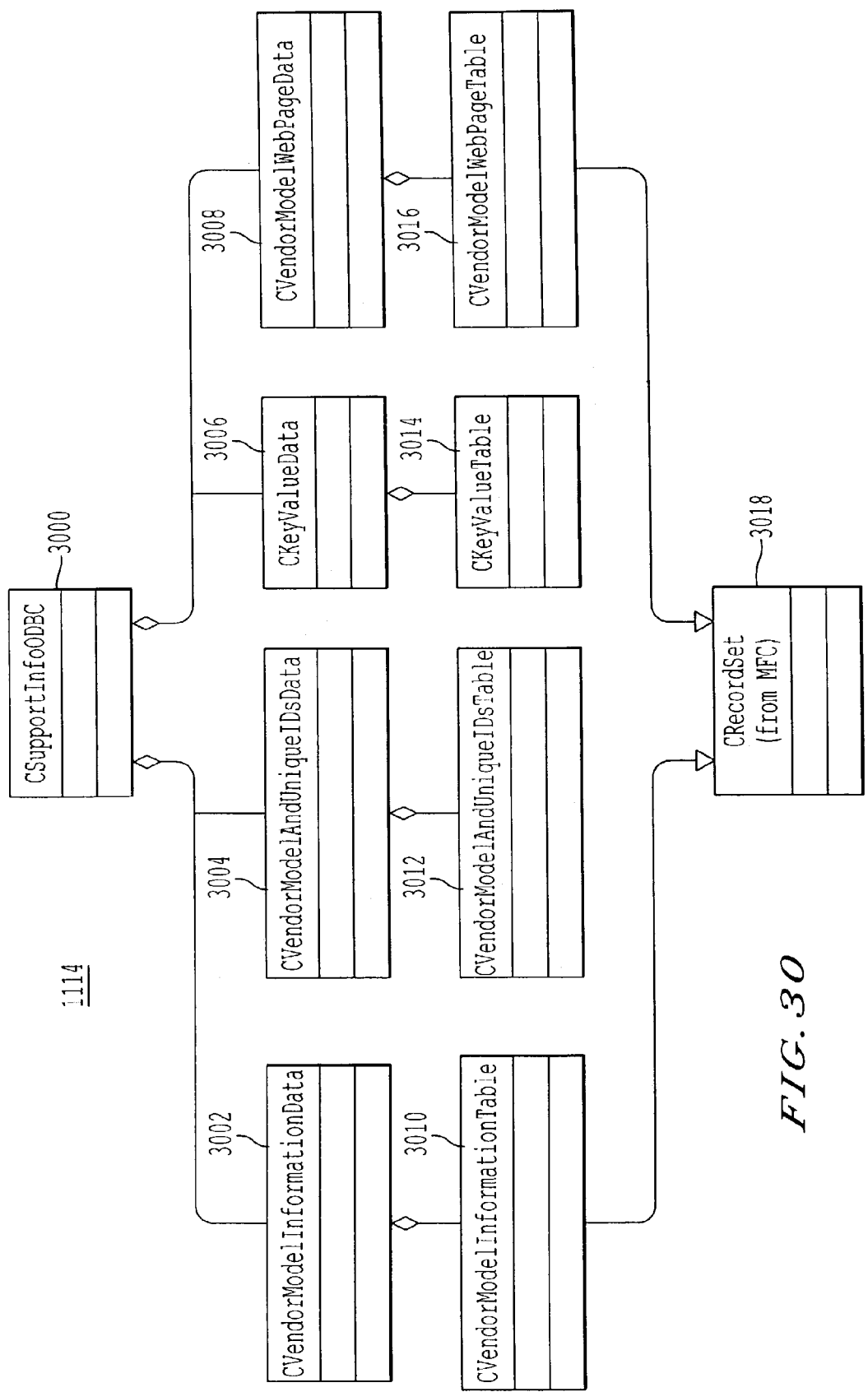
FIG. 30 shows the class diagram of the SupportInfoODBC package as shown in FIG. 11.

FIG. 30 shows the class diagram of the SupportInfoODBC (1114) package as shown in FIG. 11. This package accesses the database to obtain information about the vendors and models of network printers supported by the system. SupportInfoODBC package obtains information from the database used to obtain information from the network printers' web pages. The CSupportInfoODBC (3000) class is the interface for this package and manages the other classes in this package to perform the following tasks. The CVendorModelInformationData (3002) class obtains information from the database used to determine the vendor and model of the network printer from one of its web pages. The CVendorModelAndUniqueIDsData (3004) class obtains information from the database used to determine the unique identifier of the network printer from one of its web pages. The CKeyValueData (3006) class obtains information from the database used to obtain the status information from the web pages of the network printer. The CVendorModelWebPageData (3008) class obtains information from the database that determines what web pages are associated with the vendor and model of the network printers. The CVendorModelInformationTable (3010) class provides an interface to the table (VendorModelInformation table) in the support database that contains information used to determine the vendor and model of the network printer from one of its web pages. The CVendorModelAndUniqueIDsTable (3012) class provides an interface to the table (VendorModelAndUniqueIDs table) in the support database that contains information used to determine the unique identifier of the network printer from one of its web pages. The CKeyValueTable (3014) class provides an interface to the table (KeyValue table) in the support database that contains information used to obtain the status information from the web pages of the network printer. The CVendorModelWebPageTable (3016) class provides an interface to the table (VendorModelWebPage table) in the support database that contains information to determine what web pages are associated with the vendor and model of the network printers. CVendorModelInformationTable (3010), CVendorModelAndUniqueIDsTable (3012), CKeyValueTable (3014), and CVendorModelWebPageTable (3016) are all classes derived from CRecordset (3018) of the Microsoft Foundation Class (MFC) library.

Figure 31:
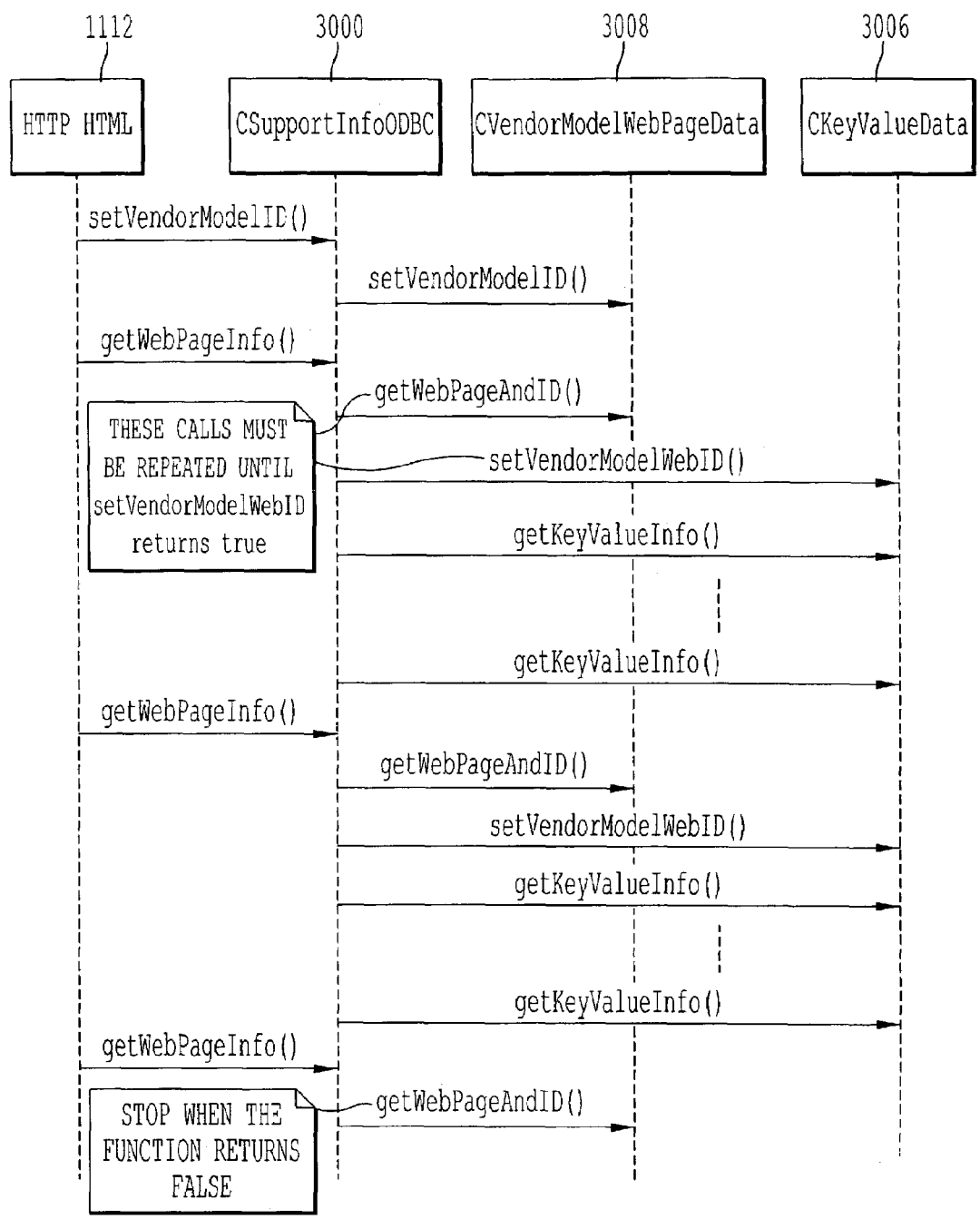
FIG. 31 shows the sequence diagram for executing the getVendorModelID( ) function of the HTTP_HTML package as shown in FIG. 20.

FIG. 31 shows the sequence diagram for executing the getVendorModelID( ) of the HTTP_HTML (1112) package. This sequence of function calls populates the table structure of the HTTP_HTML (1112) package described in FIG. 14. This table structure is used to obtain status information for specific vendors and models of network printers. This sequence of function calls in the sequence diagram is used to change the information that is stored in the database to an internal structure in the system. The information in the database may not be organized in a manner for the system to easily use the data. This is because the requirements of the database differs from that of the system. Therefore, it is preferred to access the information from the tables of the database and store the data in an internal structure that is convenient for the system to use. The sequence diagram of FIG. 31 is a method for changing the information obtained from database to an internal structure.

In FIG. 31, HTTP_HTML (1112) calls setVendorModelID( ) of CSupportInfoODBC (3000). Then CSupportInfoODBC (3000) calls setVendorModelID( ) of CVendorModelWebPageData (3008). This function obtains from the database all the web pages associated with a vendor and model of the network printer. HTTP_HTML (3000) calls getWebPageInfo( ) of CSupportInfoODBC (3000). Then CSupportInfoODBC (3000) calls getWebPageAndID( ) of CVendorModelWebPageData (3008) to obtain a web page associated with the vendor and model of the network printer. CSupportInfoODBC (3000) calls setVendorModelWebID( ) of CKeyValueData (3006) to access the table in the database that contains all the status information that can be obtained from a specific web page of the network printer. CSupportInfoODBC (3000) calls getKeyValueInfo( ) of CKeyValueData (3006) to obtain information used to obtain the status information from the web page of the network printer. CSupportInfoODBC (3000) calls getKeyValueInfo( ) of CKeyValueData (3006) multiple times to get all the information used to obtain all the status information associated with the web page of the network printer. The sequence of calling getWebPageInfo( ) of CSupportInfoODBC (3000), getWebPageAndID( ) of CVendorModelWebPageData (3008), and setVendorModelWebID( ) and getKeyValueInfo( ) of CKeyValueData (3006) is repeated until getWebPageAndID( ) returns false. This calling sequence changes information obtained from two tables (KeyValue table and VendorModelWebPage table) of the support database into information that can be stored in an internal table structure used to obtain all the status information from the web pages of a network printer of a specific vendor and model.

Figure 32:
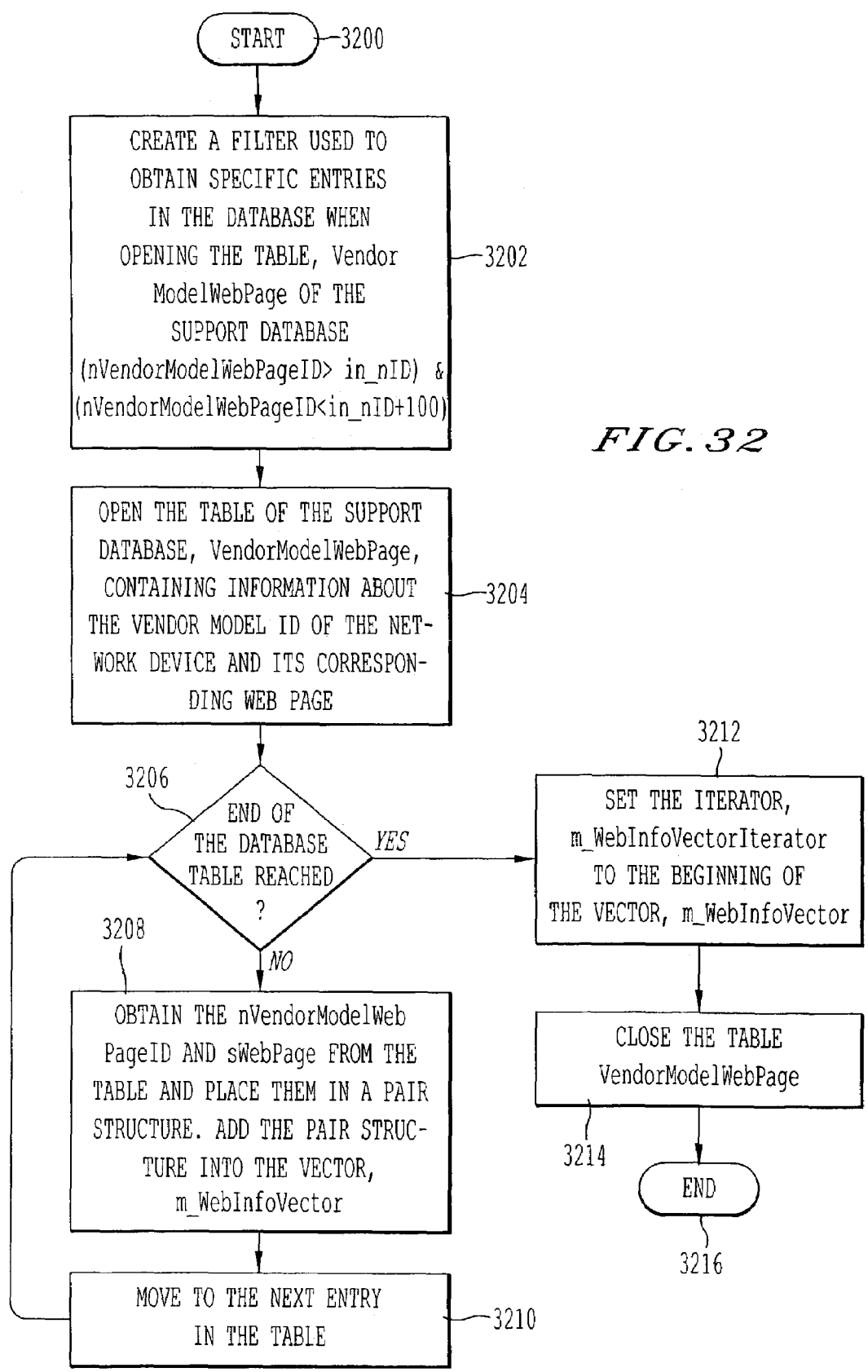
FIG. 32 shows a flow chart for executing the setVendorModelID( ) of the CSupportInfoODBC shown in FIG. 31.

FIG. 32 shows a flowchart for executing the setVendorModelID( ) of CSupportInfoODBC. setVendorModelID( ) obtains all the web pages associated with a specific vendor and model of a network printer and its corresponding vendor model IDs from the table, VendorModelWebPage, of the support database and places it into a vector. In step 3202 a filter is specified corresponding to the range of vendor model IDs. The range of vendor model IDs corresponds to the web pages associated with a specific vendor and model of a network printer. By setting the filter, a table in the database preferably contains those entries in the table that satisfy the filter when it is opened. So all entries that have vendor model ID within the range of the vendor model ID of the filter will be included in the table. In step 3204, the table of the support database is opened. In step 3206, the system checks if the end of the table of the database is reached. If the end of the table is not reached, then the vendor model ID and the corresponding web page is placed into a pair structure and the pair structure is placed into a vector in step 3208. If the end of the table is reached, the system performs the tasks set forth in step 3212 as described below. In step 3210, the system moves to the next entry in the table of the database and then refers to step 3206 for iteration.

In step 3212, an iterator for the vector containing the pairs of vendor model ID and web page is set to the beginning of the vector. In step 3214, the table of the database is closed and the execution of setVendorModelID( ) is completed in step 3216. The vector is used in getWebPageInfo( ) of CSupportInfoODBC as described in FIG. 33.

Figure 33:
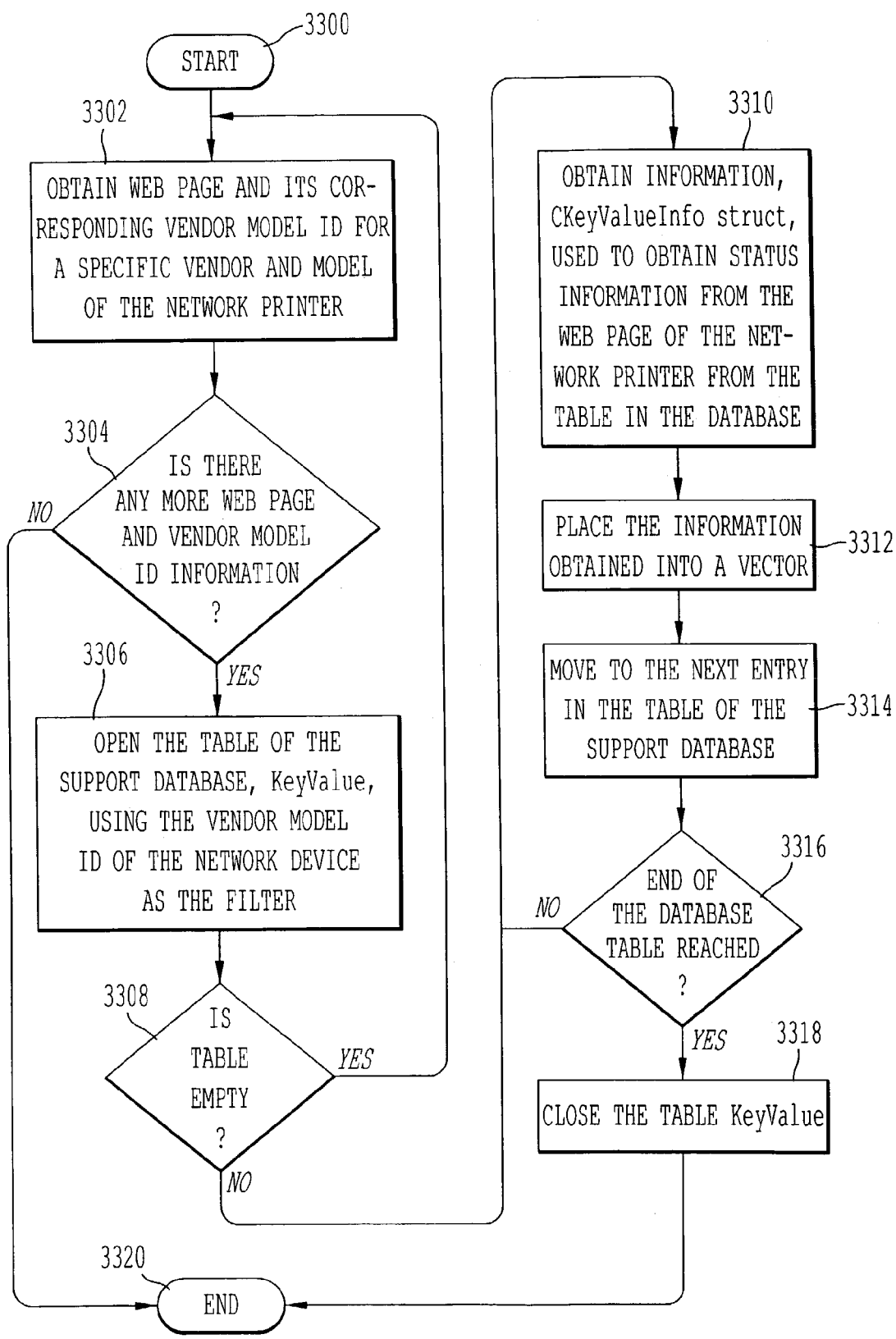
FIG. 33 shows a flow chart for executing the getWebPageInfo( ) of CSupportInfoODBC shown in FIG. 31.

FIG. 33 shows the flowchart for executing the getWebPageInfo( ) of CSupportInfoODBC. This function returns the web page of a given vendor and model of a network printer and status information that can be obtained from the web page. In step 3302, the web page and the vendor model ID for a specific vendor and model of the network printer are obtained from the vector as described in FIG. 32. In step 3304, the system determines if there are any more web pages and vendor model IDs for the network printer. If no more web pages or vendor model IDs remain, then execution of the getWebPageInfo( ) of CSupportInfoODBC is completed in step 3320. However, if more web pages or vendor model IDs are present, then the table, KeyValue, of the support database is opened using the vendor model ID of the network printer as the filter in step 3306. The filter is set to the vendor model ID so that when the table of the database is opened, only those entries in the table with the same vendor model ID exist in the table. Step 3308 checks to determine if the table is empty. If it is, step 3302 is subsequently executed. However, if the table is not empty, step 3310 is executed.

In step 3310 of FIG. 33, information about status information that need to be extracted from the web page of the network printer is obtained from the table, VendorModelWebPage, of the support database. The information is placed into the vector in step 3312, and the system moves to the next entry in the table of the database in step 3314. The system determines if it is at the end of the table of the database in step 3316. If it is not, the system executes step 3310. However, if the end of the table of the database is reached, the table of the database is closed in step 3318 and getWebPageInfo( ) of CSupportInfoODBC is completed in step 3320.

The present invention enables monitoring of the various devices in a multi-vendor environment and further facilitates retrieving and displaying detailed information in a user-comprehensible or user-friendly manner even without having specific private management information base (MIB) information. In addition, the stored monitored information can be sent out through FTP or e-mail as described in co-pending applications that are incorporated herein by reference.

Although the present invention is shown to include a few devices, that require monitoring, connected to network, it will be appreciated that more than a few devices may be connected to the network without deviating from the spirit and scope of the invention. Also, the present invention may also be applied in a home environment where various devices need to be monitored and controlled.

The present invention enables the monitoring of the various devices in a multi-vendor environment and further facilitates retrieving and displaying detailed information in a user-comprehensible or user-friendly manner even without having specific private management information base (MIB) information.

The controller of the present invention may be conveniently implemented using a conventional general purpose digital computer or a microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMS, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. In a communication system having one or more monitored devices communicatively coupled to a monitoring system, a method of obtaining status information of a monitored device, comprising:

creating a communication session using an HTTP protocol with the monitored device;

accessing a web page of the monitored device in order to obtain information in the web page;

parsing a line of the information using first and second data structure vectors in an attempt to obtain the status information of the monitored device, the first and second data structure vectors having a same number of elements;

removing corresponding elements from the first and second data structure vectors when the status information is obtained in the parsing step; and closing the communication session upon parsing all the lines in the web page or upon obtaining all desired status information.

2. The method as in claim 1, further comprising:
iterating the creating, accessing, parsing, removing, and closing steps for multiple web pages of the monitored device.

3. The method as in claim 1, wherein: the parsing step is performed, using first and second data structure vectors to locate and obtain information from the web page of the monitored device, for one line of information at a time.

4. The method as in claim 1, further comprising:
identifying a key from information in the web page; and
identifying a value corresponding to the key.

5. The method as in claim 4, wherein the step of identifying the value is performed using a plurality of fields of an element of said first and second data structure vectors.

6. The method as in claim 5, wherein:
the plurality of fields of the element of said first data structure vector include nPosition, sDelimiter, and nInLinePosition fields; and
the plurality of fields of the element of said second data structure vector include nCounter and bValueObtained fields.

7. The method as in claim 4, wherein:
the step of identifying the key is performed using data from a first field of said first data structure vector; and
the step of identifying the corresponding value is performed by using data from a plurality of fields of an element of said first and second data structure vectors.

8. The method as in claim 1, further comprising:
providing a one-to-one correspondence between elements of said first and second data structure vectors.

9. The method as in claim 8, further comprising:
adding information corresponding to a key and a value to a map having information about the monitored device, if the value corresponding to the key is obtained from a parsed line of information from the web page.

10. A method of obtaining information from a web page of a monitored device, comprising:
reading information in the web page;
parsing the read information;
determining a key and corresponding value information, using each element of first and second data structure vectors, for each line of information in the web page, the first and second data structure vectors having a same number of elements; and
removing an element from each of said first and second data structure vectors if a key and a corresponding value information are found for the element.

11. The method as in claim 10, further comprising:
iterating the parsing, determining, and removing steps for each line of information in the web page until all values of information defined by the elements of the first and second data structure are obtained.

12. The method as in claim 11, further comprising:
determining key and value information for all elements of said first and second data structure vectors.

13. The method as in claim 11, further comprising:
providing a one-to-one correspondence between said first and second data structure vectors.

14. The method as in claim 13, further comprising:
adding information corresponding to the key and a corresponding value to a map having information about the monitored device if the corresponding value is obtained from the parsed information.

15. In a communication system having one or more monitored devices communicatively coupled to a monitoring system, a monitoring computer including a processor configured to obtain status information of a monitored device, the monitoring computer comprising:
means for creating a communication session using an HTTP protocol with the monitored device;
means for accessing a web page of the monitored device in order to obtain information in the web page;
means for parsing a line of the information using first and second data structure vectors to attempt to obtain the status information of the monitored device, the first and second data structure vectors having a same number of elements;
means for removing corresponding elements from the first and second data structure vectors when the status information is obtained by the means for parsing; and
means for closing the communication session upon parsing all the lines in the web page or upon obtaining all desired status information.

16. A monitoring computer having a processor configured to obtain information from a web page of a monitored device, the monitoring computer comprising:
means for reading information in a web page of the monitored device;
means for parsing the read information;
means for determining a key and corresponding value information, using each element of first and second data structure vectors, for each line of information in the web page, the first and second data structure vectors having a same number of elements; and
means for removing an element from each of said first and second data structure vectors if a key and a corresponding value information are found for the element.

17. A computer program product having a computer readable medium for obtaining information from a monitored device, comprising:
instructions for reading information in a web page of the monitored device;
instructions for parsing the read information;
instructions for determining a key and corresponding value information, using each element of first and second data structure vectors, for each line of information in the web page, the first and second data structure vectors having a same number of elements; and
instructions for removing an element from each of said first and second data structure vectors if a key and a corresponding value information are found for the element.

18. A method of obtaining status information of a device, comprising:
creating a communication session using an HTTP protocol with the device;
accessing a web page of the device in order to obtain information in a web page of the device;
parsing a line of information obtained from the web page using first and second data structure vectors, the first and second data structure vectors having a same number of elements;
removing corresponding elements from the first and second data structures when the status information is obtained in the parsing step; and
closing the communication session upon parsing all the lines in the web page or upon obtaining all desired status information.

* * * * *